(12) United States Patent
Nag et al.

(10) Patent No.: US 10,949,263 B2
(45) Date of Patent: Mar. 16, 2021

(54) COMPUTATIONALLY EFFICIENT REINFORCEMENT-LEARNING-BASED APPLICATION MANAGER

(71) Applicant: VMware, Inc., Palo Alto, CA (US)

(72) Inventors: Dev Nag, Palo Alto, CA (US); Yanislav Yankov, Palo Alto, CA (US); Dongni Wang, Palo Alto, CA (US); Gregory T. Burk, Colorado Springs, CO (US); Nicholas Mark Grant Stephen, Paris (FR)

(73) Assignee: VMware, Inc., Palo Alto, CA (US)

( * ) Notice: Subject to any disclaimer, the term of this patent is extended or adjusted under 35 U.S.C. 154(b) by 35 days.

(21) Appl. No.: 16/518,717

(22) Filed: Jul. 22, 2019

(65) Prior Publication Data

US 2020/0065156 A1    Feb. 27, 2020

Related U.S. Application Data

(63) Continuation-in-part of application No. 16/261,253, filed on Jan. 29, 2019, now Pat. No. 10,802,864.

(60) Provisional application No. 62/723,388, filed on Aug. 27, 2018.

(51) Int. Cl.
*G06F 9/50* (2006.01)
*G06N 20/00* (2019.01)
*G06N 3/02* (2006.01)

(52) U.S. Cl.
CPC ............ *G06F 9/5077* (2013.01); *G06N 3/02* (2013.01); *G06N 20/00* (2019.01)

(58) Field of Classification Search
USPC ............................................................ 718/1
See application file for complete search history.

(56) References Cited

U.S. PATENT DOCUMENTS

| 10,802,864 | B2 * | 10/2020 | Nag | .................... G06F 9/45558 |
|---|---|---|---|---|
| 2020/0065701 | A1 * | 2/2020 | Nag | ......................... G06N 5/02 |
| 2020/0065702 | A1 * | 2/2020 | Nag | ...................... G06N 5/043 |
| 2020/0065703 | A1 * | 2/2020 | Nag | ...................... G06F 9/542 |

* cited by examiner

*Primary Examiner* — John Q Chavis

(57) ABSTRACT

The current document is directed to automated reinforcement-learning-based application managers that obtain increased computational efficiency by reusing learned models and by using human-management experience to truncate state and observation vectors. Learned models of managed environments that receive component-associated inputs can be partially or completely reused for similar environments. Human managers and administrators generally use only a subset of the available metrics in managing an application, and that subset can be used as an initial subset of metrics for learning an optimal or near-optimal control policy by an automated reinforcement-learning-based application manager.

20 Claims, 65 Drawing Sheets

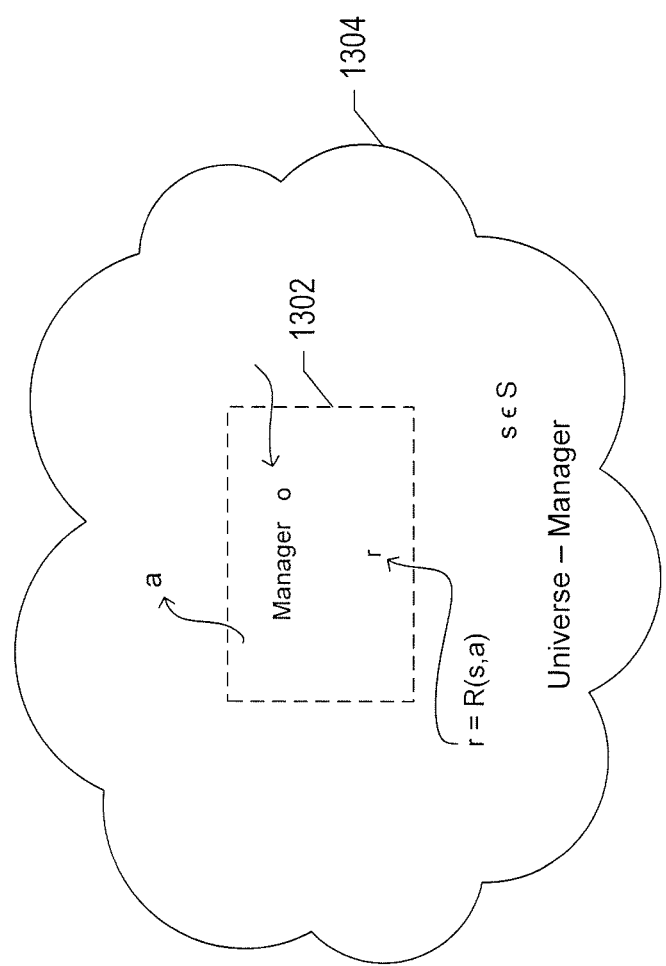

$$R_4 = r_5 + \gamma r_6 + \gamma^2 r_7 + \gamma^3 r_8 \ldots \gamma^{T-5} r_T$$

where $0 \leq \gamma \leq 1$ $$R_t = \sum_{k=0}^{T} \gamma^k r_{t+k+1}$$

$$V^\pi(s) = E\{R_t | s_t = s, \pi\}$$

$$Q^\pi(s,a) = E\{R_t | s_t = s, a_t = a, \pi\}$$

$\pi^*$ is optimal $\Rightarrow \forall s \in S$ and $\pi \in \Pi$, $V^{\pi^*}(s) \geq V^\pi(s)$

FIG. 17

π-(b) = ε-greedy method where a' is randomly selected from
{a' | π(b,a') = avgmax π(b,a) } with a probability of 1-ε and randomly
a∈A   select from A with a probability of ε

$U_\pi() = \{\ \}$ $U_Q() = Q(b,a) \leftarrow Q(b,a) + \alpha\ [r+\gamma Q(b',a') - Q(b,a)]$

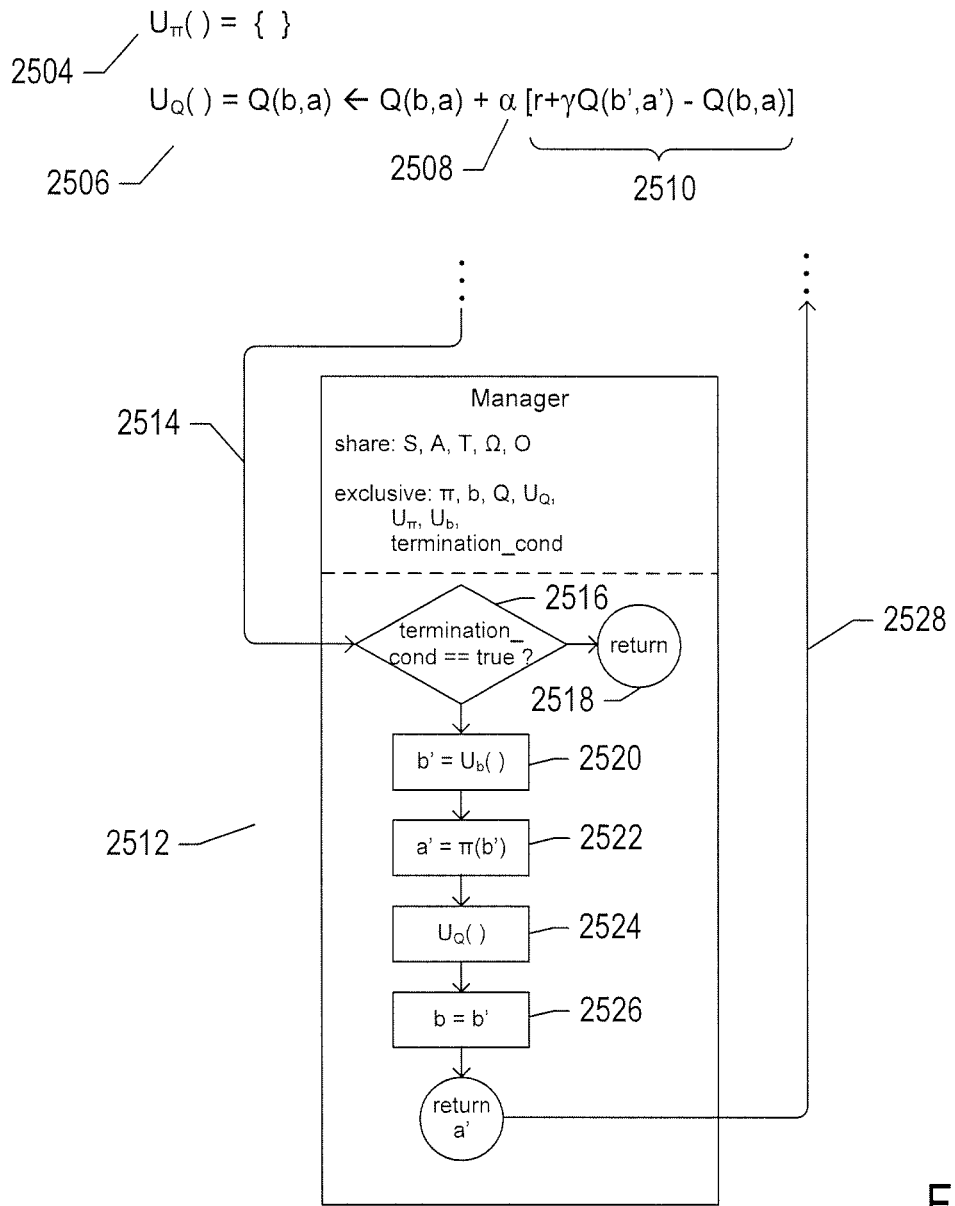

FIG. 25

$Q_t(b,a)$ is a function of n parameters, $\theta_t$ $\theta_{t+1} = \theta_t + \alpha[Q_t(b,a) - Q_t^E(b,a)]\ \nabla_{\theta t} Q_t(b,a)$, where $Q_t^E(b,a)$ is an estimate of $Q_t(b,a)$ based on r, $\gamma Q(b',A')$, etc.

addVirtualServer ("Rochester", data_center4, , memory:20GB, processors:48, storage:6TB)

— 2730

Actions

| 635 | addServers | DataCenter | 4 | addVirtualServer |
|---|---|---|---|---|

| 635 | 1 | constInteger | number of servers |
|---|---|---|---|
| 635 | 1 | constInteger | number of servers |
| 635 | 1 | constInteger | number of servers |
| 635 | 1 | constInteger | number of servers |

| 635 | 1 | 1 |
|---|---|---|

— 2732

— 2734

| addServer |
|---|
| Rochester |
| 4 |
| 1 |
| 20 |
| 48 |
| 6000 |

⟶ addServers (1, 20, 48, 6000) sent to "Rochester.4"

— 2736

{635, "Rochester", 4, 20, 48, 6000}

2802 — $V^\pi(s) = E_\pi\{Rt \mid s_t = s\} = E_\pi\{\sum_{k=0}^{\infty} \gamma^k r_{t+k+1} \mid s_t = s\}$ 2804 — $Q^\pi(s,a) = E_\pi\{Rt \mid s_t = s_1 a_t = a\} = E_\pi\{\sum_{k=0}^{\infty} \gamma^k r_{t+k+1} \mid s_t = s_1 a_t = a\}$ 2805 — $P_{ss'}^a = Pr\{s_{t+1} = s' \mid s_t = s_1 a_t = a\}$ 2806 — $R_{ss'}^a = E\{r_{t+1} \mid s_t = s_1 a_t = a_1 s_{t+1} = s'\}$ 2807 — $V^\pi(s) = \sum_a \pi(s,a) \sum_{s'} P_{ss'}[R_{ss'} + \gamma V^\pi(s')]$ 2808 $\begin{cases} V^*(s) = \max_\pi V^\pi(s) \\ Q^*(s,a) = \max_\pi Q^\pi(s,a) \\ Q^*(s,a) = E\{r_{t+1} \gamma V^*(s_{t+1}) \mid s_t = s_1 a_t = a\} \end{cases}$ 2809 $\begin{cases} \pi(s): r = rand(\,); \\ \quad \begin{cases} r < \epsilon, a = \underset{a \in A}{avgmax}\, Q(s,a) \\ otherwise,\ randomly\ select\ a\ from\ A \end{cases} \end{cases}$

FIG. 28

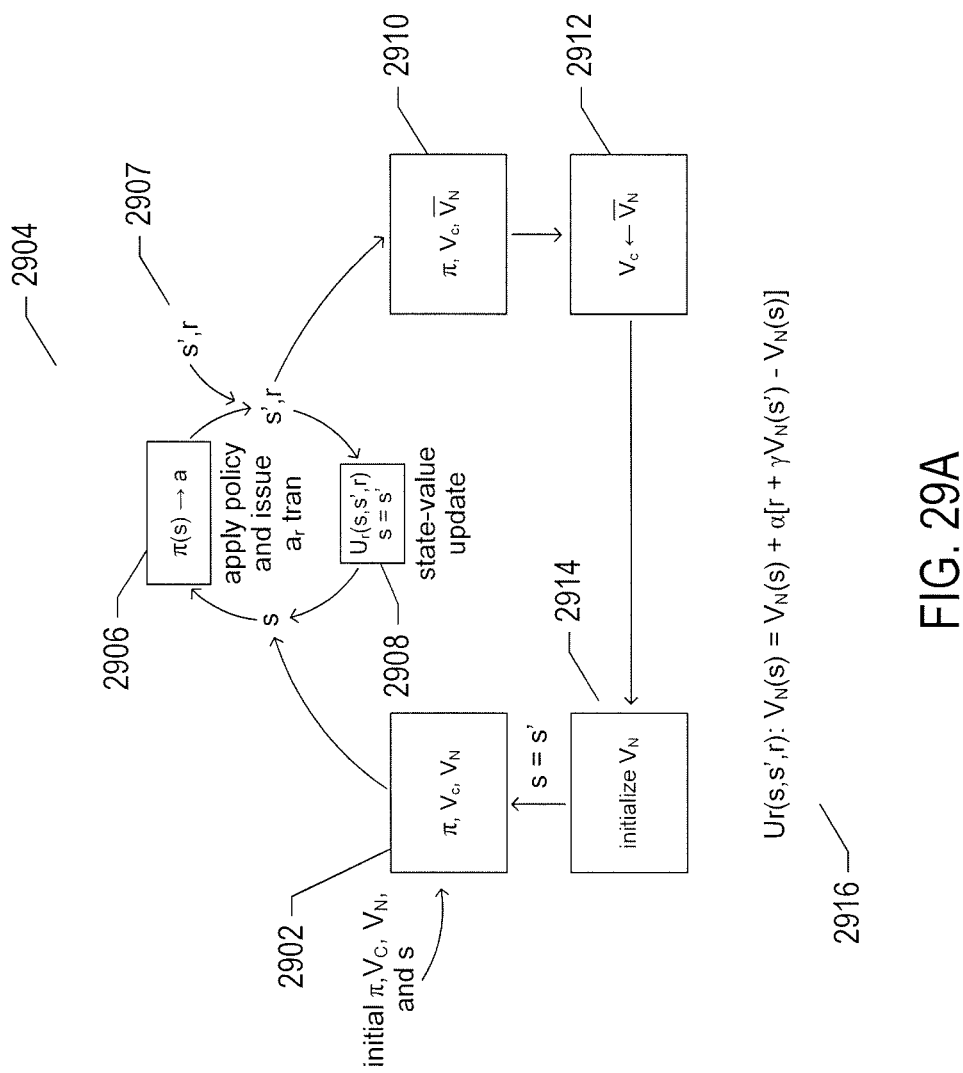

```
typedef vector<node> Layer;
typedef double(*ActivationFunction)(double x);    } 3302
class node;
typedef node* NodePtr;

class node
{
   private:          — 3306
       double output;              — 3307
       ActivationFunction g;
       vector<double> weights;     — 3308
       vector<NodePtr> inputs;     — 3309
   public:
       void activate();  — 3310
       void setOutput(double out){output = out;};  } 3312
       double getOutput() { return output;};
};

class neuralNet
{
   private:          — 3316
       int numLayers;
       vector<Layer> layers;       — 3318
   public:
       void f(vector<double> x, vector<double>& y);
};
                                    — 3320
void node::activate()
{
   int j;
   double sum = weights[0] * -1;

for (j = 0; j < inputs.getDimension(); j++)
      sum += inputs[j]->getOutput() * weights[j+1];
   output = g(sum);
} void neuralNet::f(vector<double> x, vector<double>& y)
{
   int i, j;
                                                          — 3326
   for (j = 0; j < layers[0].getDimension(); j++) layers[0][j].setOutput(x[j]);

for (i = 1; i < numLayers; i++)
      for (j = 0; j < layers[i].getDimension(); j++)  } 3327
         layers[0][j].activate();
                                                  — 3328
   for (j = 0; j < layers[numLayers - 1].getDimension(); j++)
      y[j] = layers[numLayers - 1][j].getOutput();
}
```

FIG. 33

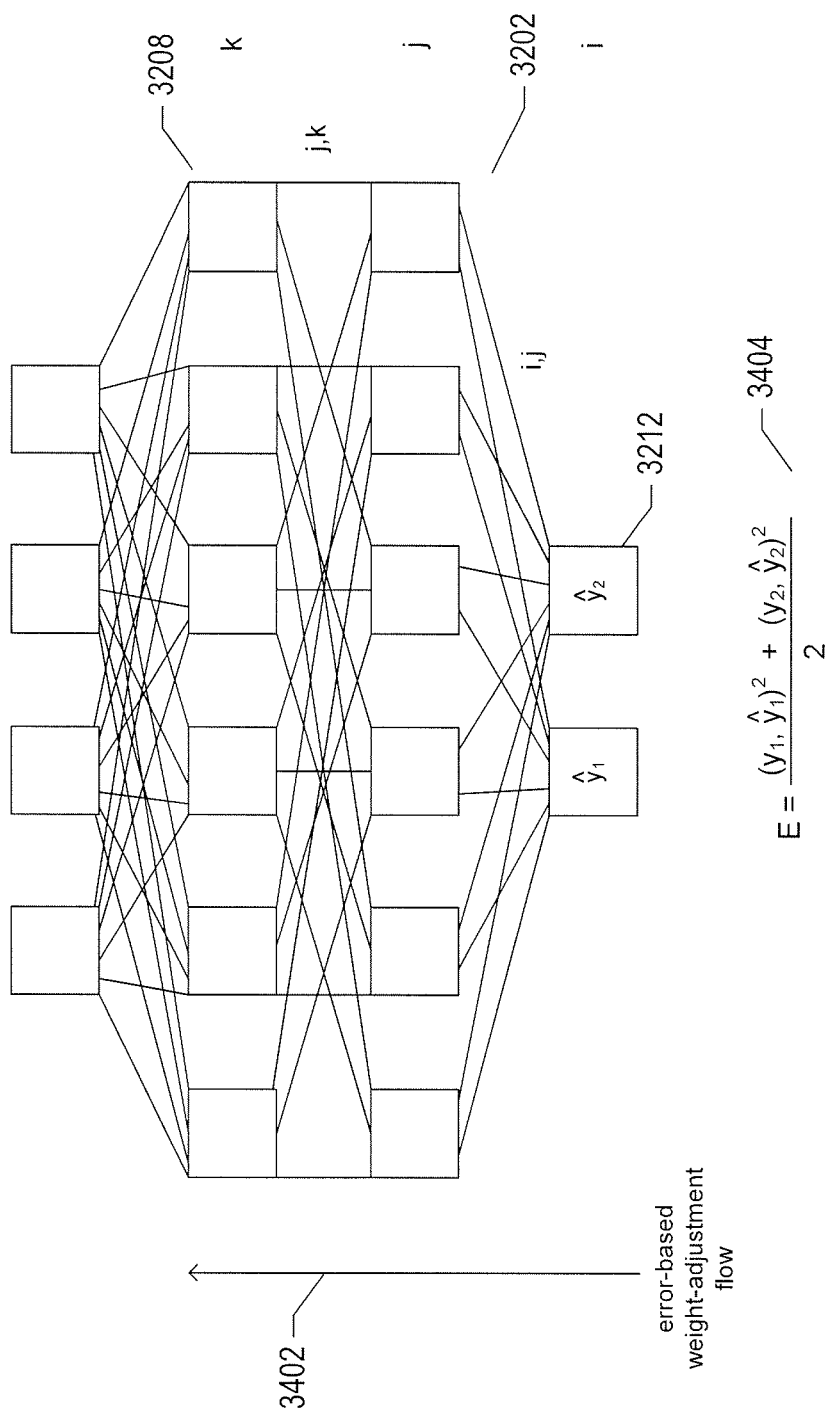

$$E = \frac{1}{2}\Big(\text{length}\big(y - \hat{f}(x)\big)\Big)^2$$

$$= \frac{1}{2}\big(y - \hat{f}(x)\big) \cdot \big(y - \hat{f}(x)\big)$$

$$= \frac{1}{2}\sum_i \big(y_i - \hat{f}(x)_i\big)^2$$

$$= \frac{1}{2}\sum_i (y_i - a_i)^2, \text{where } i \in \text{output nodes}$$

$\Big\}$ 3502

$$\frac{\partial E}{\partial w_{i,j}} = \frac{\partial}{\partial w_{i,j}}\left(\frac{1}{2}\sum_k (y_k - a_k)^2\right), \text{where } k \in \text{output nodes}$$

$$= -(y_i - a_i)\frac{\partial a_i}{\partial w_{i,j}}$$

$$= -\left(y_i - g\left(\sum_j a_i w_{i,j}\right)\right)\frac{\partial}{\partial w_{i,j}} g\left(\sum_j a_i w_{i,j}\right)$$

$$= -\left(y_i - g\left(\sum_j a_i w_{i,j}\right)\right) g'\left(\sum_j a_i w_{i,j}\right)\frac{\partial}{\partial w_{i,j}}\left(\sum_j a_i w_{i,j}\right)$$

$$= -\left(y_i - g\left(\sum_j a_i w_{i,j}\right)\right) g'\left(\sum_j a_i w_{i,j}\right) a_j$$

$\Big\}$ 3504

$$g(x) = \frac{1}{1 + e^{-x}}$$

$$\frac{d}{dx}g(x) = -(1 + e^{-x})^{-2}(-e^{-x})$$

$$= \frac{e^{-x}}{(1 + e^{-x})^2} = \frac{1 + e^{-x} - 1}{(1 + e^{-x})^2} = \frac{1}{1 + e^{-x}} - \frac{1}{(1 + e^{-x})^2}$$

$$= \left(\frac{1}{1 + e^{-x}}\right)\left(1 - \frac{1}{1 + e^{-x}}\right)$$

$$= g(x)(1 - g(x))$$

$\Big\}$ 3506

$$\frac{\partial E}{\partial w_{i,j}} = -(y_i - a_i)(a_i(1 - a_i))a_j$$

$$= -a_j \Delta_i$$

$\Big\}$ 3508

$$w'_{i,j} = w_{i,j} + r(a_j \Delta_i) \quad \text{— 3510}$$

FIG. 35A $$\frac{\partial E}{\partial w_{j,k}} = -\sum_i (y_i - a_i) \frac{\partial a_i}{\partial w_{j,k}}$$

$$= -\sum_i (y_i - a_i) \frac{\partial}{\partial w_{j,k}} g\left(\sum_j a_j w_{i,j}\right)$$

$$= -\sum_i (y_i - a_i) g'\left(\sum_j a_j w_{i,j}\right) \frac{\partial}{\partial w_{j,k}} \left(\sum_j a_j w_{i,j}\right)$$

$$= -\sum_i (y_i - a_i) (a_i(1 - a_i)) w_{i,j} \frac{\partial a_j}{\partial w_{j,k}}$$

$$= -\sum_i \Delta_i w_{i,j} \frac{\partial a_j}{\partial w_{j,k}}$$

$$= -\sum_i \Delta_i w_{i,j} \frac{\partial}{\partial w_{j,k}} g\left(\sum_k a_k w_{j,k}\right)$$

$$= -\sum_i \Delta_i w_{i,j} g'\left(\sum_k a_k w_{j,k}\right) \frac{\partial}{\partial w_{j,k}} \left(\sum_k a_k w_{j,k}\right)$$

$$= -\sum_i \Delta_i w_{i,j} g'\left(\sum_k a_k w_{j,k}\right) a_k$$

$$= -\sum_i \Delta_i w_{i,j} \left(a_j(1 - a_j)\right) a_k$$

$$= -\sum_i \Delta_i w_{i,j} \Delta_j a_k$$

$$= -a_k \Delta_{i,j}$$

$$w_{j,k} = w_{j,k} + r(a_k \Delta_{i,j})$$

FIG. 35B

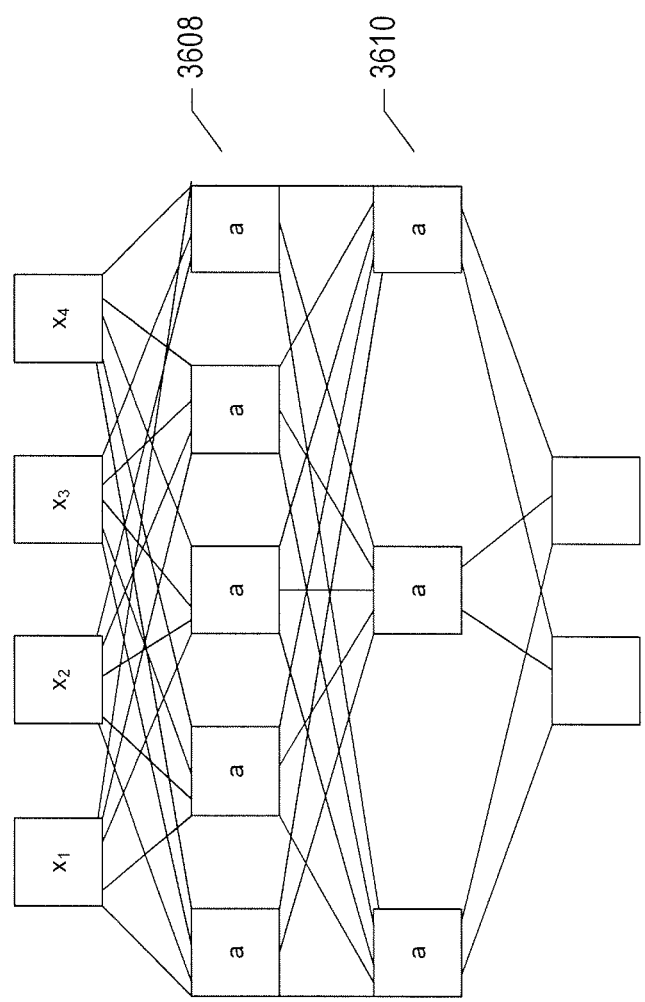

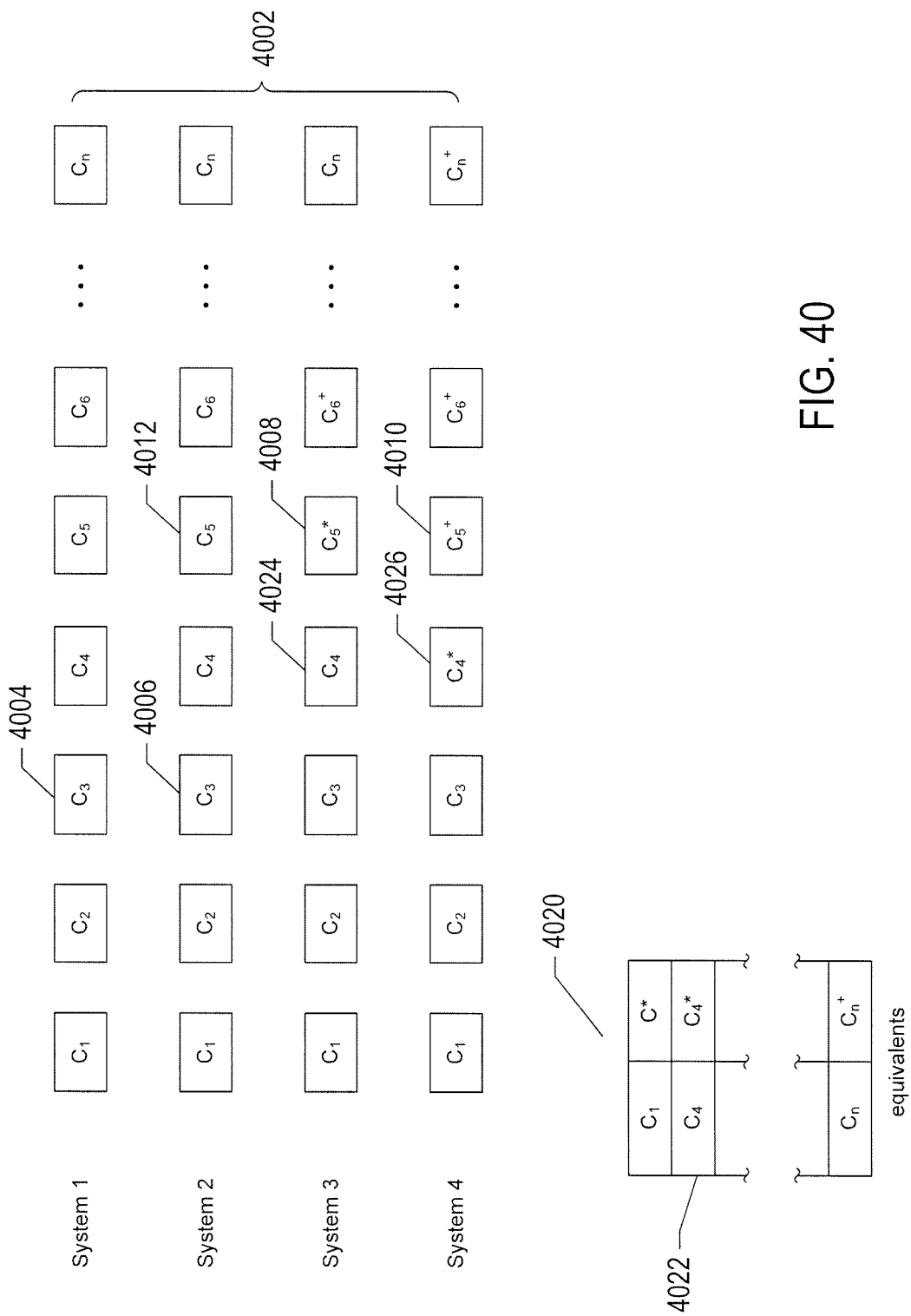

COMPUTATIONALLY EFFICIENT REINFORCEMENT-LEARNING-BASED APPLICATION MANAGER

CROSS-REFERENCE TO RELATED APPLICATIONS

This application is a continuation-in-part of application Ser. No. 16/261,253, filed Jan. 29, 2019, which claim the benefit of Provisional Application No. 62/723,388, filed Aug. 27, 2018.

TECHNICAL FIELD

The current document is directed to standalone, networked, and distributed computer systems, to system management and, in particular, to an automated reinforcement-learning-based application manager that obtains increased computational efficiency by reusing learned models and by using human-management experience to truncate state and observation vectors.

BACKGROUND

During the past seven decades, electronic computing has evolved from primitive, vacuum-tube-based computer systems, initially developed during the 1940s, to modern electronic computing systems in which large numbers of multi-processor servers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. However, despite all of these advances, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed, and as general hardware and software technologies continue to advance, the current trend towards ever-larger and more complex distributed computing systems appears likely to continue well into the future.

As the complexity of distributed computing systems has increased, the management and administration of distributed computing systems has, in turn, become increasingly complex, involving greater computational overheads and significant inefficiencies and deficiencies. In fact, many desired management-and-administration functionalities are becoming sufficiently complex to render traditional approaches to the design and implementation of automated management and administration systems impractical, from a time and cost standpoint, and even from a feasibility standpoint. Therefore, designers and developers of various types of automated management and control systems related to distributed computing systems are seeking alternative design-and-implementation methodologies, including machine-learning-based approaches. The application of machine-learning technologies to the management of complex computational environments is still in early stages, but promises to expand the practically achievable feature sets of automated administration-and-management systems, decrease development costs, and provide a basis for more effective optimization Of course, administration-and-management control systems developed for distributed computer systems can often be applied to administer and manage standalone computer systems and individual, networked computer systems.

SUMMARY

The current document is directed to automated reinforcement-learning-based application managers that obtain increased computational efficiency by reusing learned models and by using human-management experience to truncate state and observation vectors. Learned models of managed environments that receive component-associated inputs can be partially or completely reused for similar environments. Human managers and administrators generally use only a subset of the available metrics in managing an application, and that subset can be used as an initial subset of metrics for learning an optimal or near-optimal control policy by an automated reinforcement-learning-based application manager.

BRIEF DESCRIPTION OF THE DRAWINGS

In FIG. 9, three different physical data centers 902-904 are shown below planes representing the cloud-director layer of abstraction 906-908.

FIG. 13 summarizes the reinforcement-learning-based approach to control.

FIG. 17 provides additional details about the operation of the manager, environment, and universe.

FIG. 25 illustrates one implementation of a reinforcement-learning-based application manager that employs state/action-space exploration via the above-discussed ϵ-greedy policy.

FIGS. 27A-B illustrate one example of a data representation of actions and metrics.

FIG. 28 provides numerous expressions that indicate a generic implementation of several different types of value functions and an ϵ-greedy policy.

FIGS. 29A-B illustrate two different types of reinforcement-learning control-and-learning schemes that provide bases for three different reinforcement-learning-based application managers.

FIG. 33 provides a concise pseudocode illustration of the implementation of a simple feed-forward neural network.

FIG. 34, using the same illustration conventions as used in FIG. 32, illustrates back propagation of errors through the neural network during training.

FIGS. 35A-B show the details of the weight-adjustment calculations carried out during back propagation.

FIGS. 36A-I illustrate one iteration of the neural-network-training process.

FIG. 40 illustrates four different systems managed by a reinforcement-learning-based application manager and an equivalents table.

DETAILED DESCRIPTION

Figure 1:
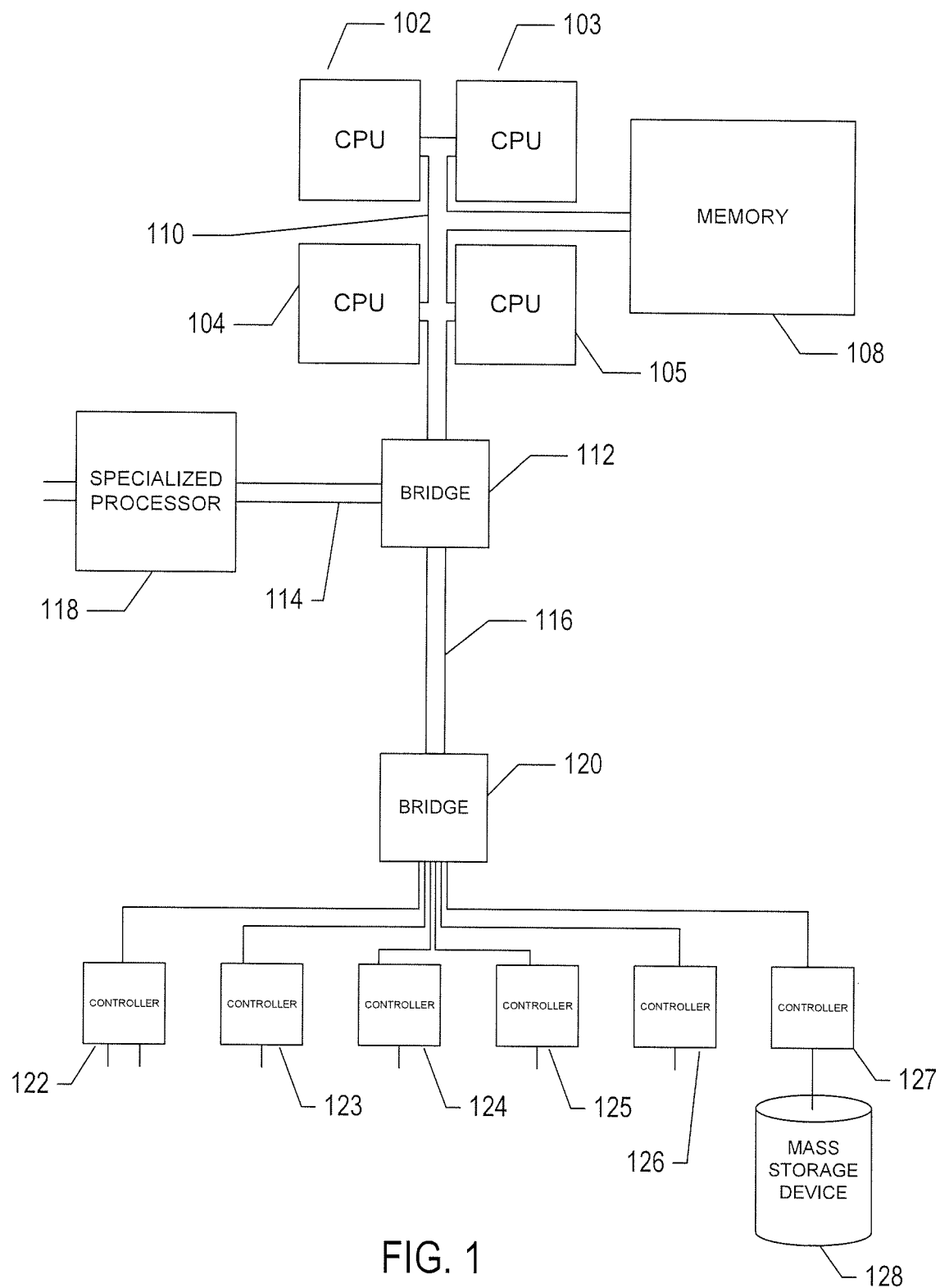
FIG. 1 provides a general architectural diagram for various types of computers.

The current document is directed to a reinforcement-learning-based application manager that uses action tags and metric tags. In a first subsection, below, a detailed description of computer hardware, complex computational systems, and virtualization is provided with reference to FIGS. 1-11. In a second subsection, application management and reinforcement learning are discussed with reference to FIGS. 11-25. In a third subsection, control and learning processes of reinforcement-learning-based application manager are discussed with reference to FIGS. 26-30. In a fourth subsection, neural networks are discussed with reference to FIGS. 31-36I. In a fifth subsection, implementations of the currently disclosed computationally efficient automated reinforcement-learning-based application manager are discussed with reference to FIGS. 37-44B.

Computer Hardware, Complex Computational Systems, Virtualization, and Generation of Status, Informational, and Error Data The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device.

Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
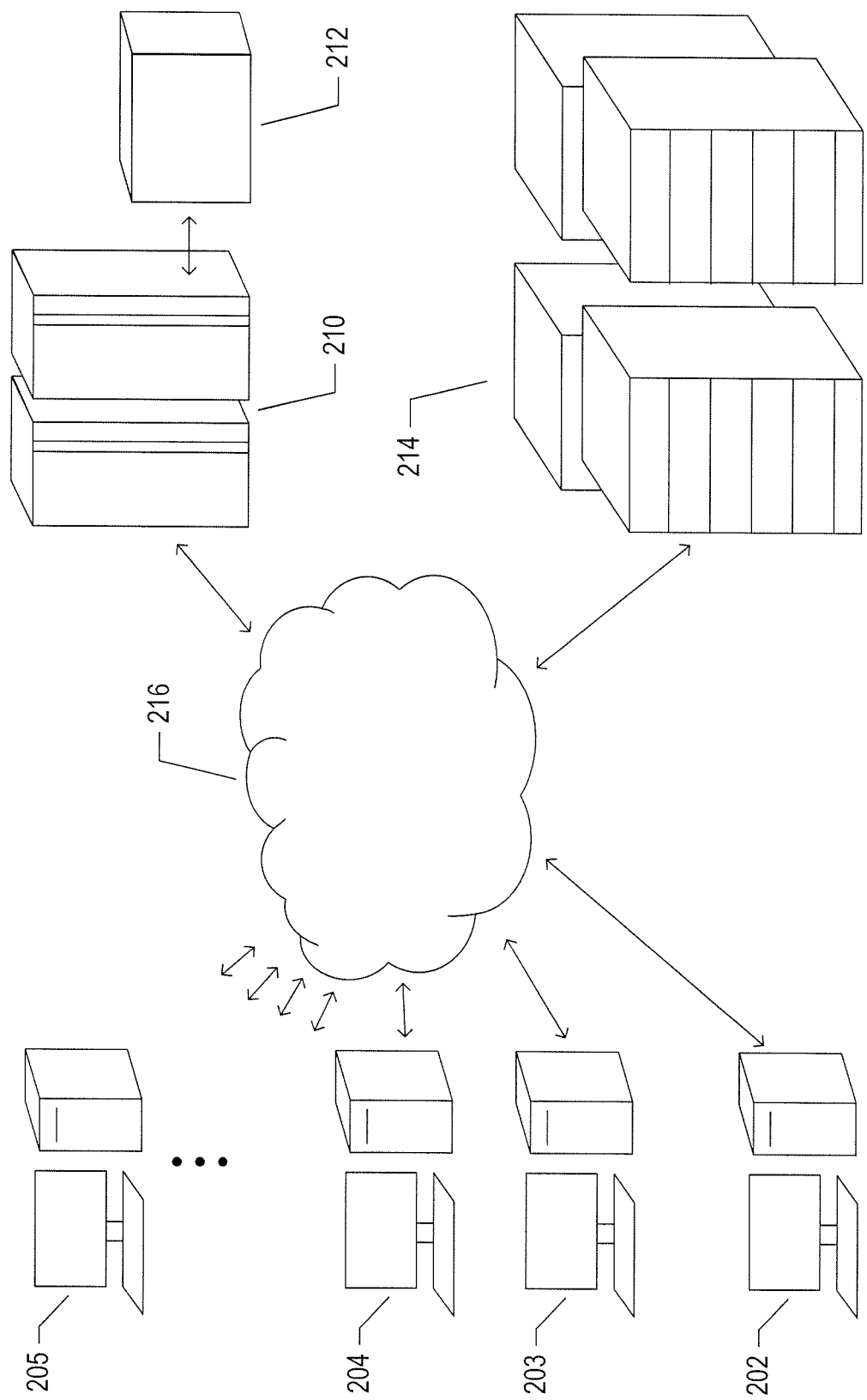
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
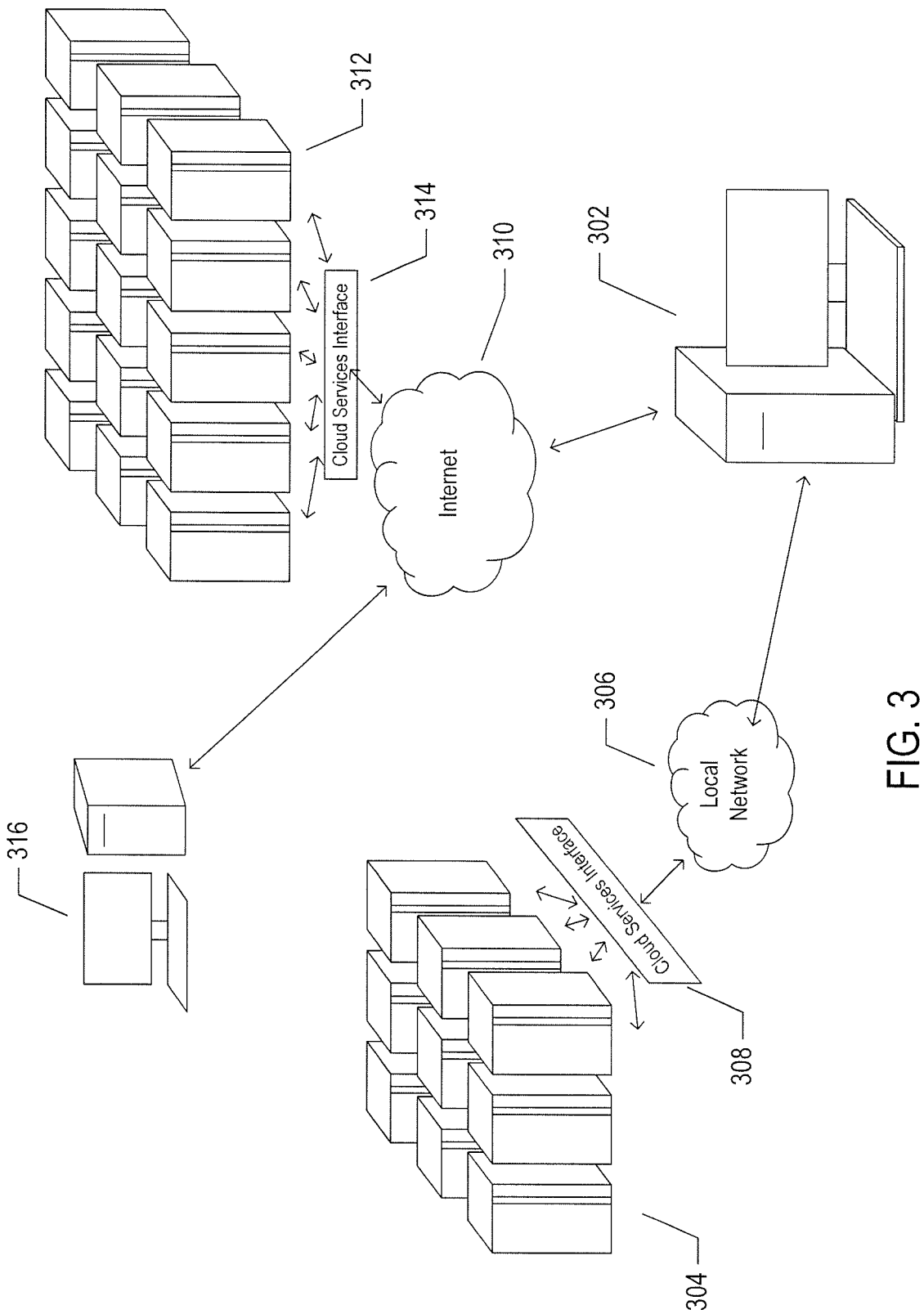
FIG. 3 illustrates cloud computing. In the recently developed cloud-computing paradigm, computing cycles and data-storage facilities are provided to organizations and individuals by cloud-computing providers.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
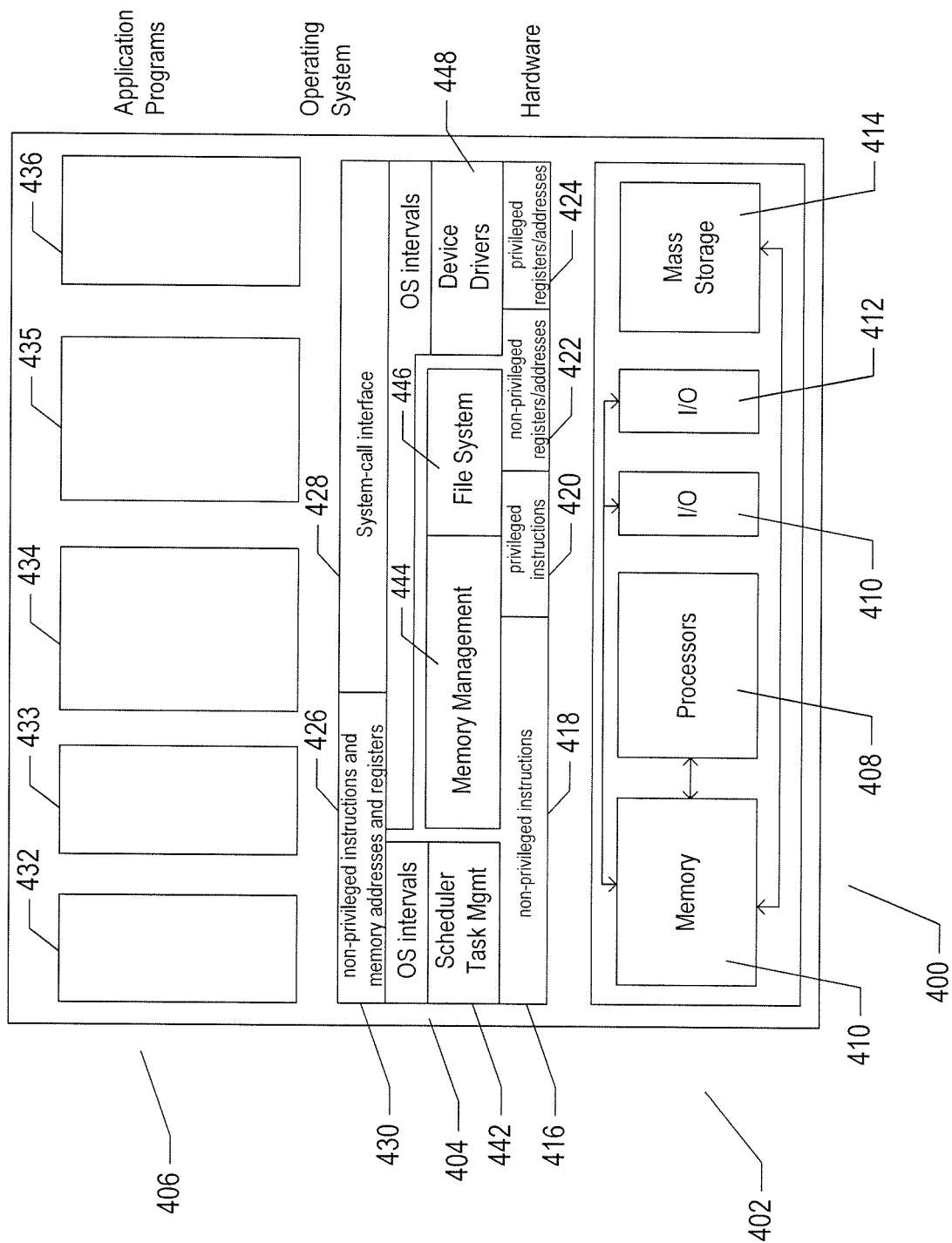
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
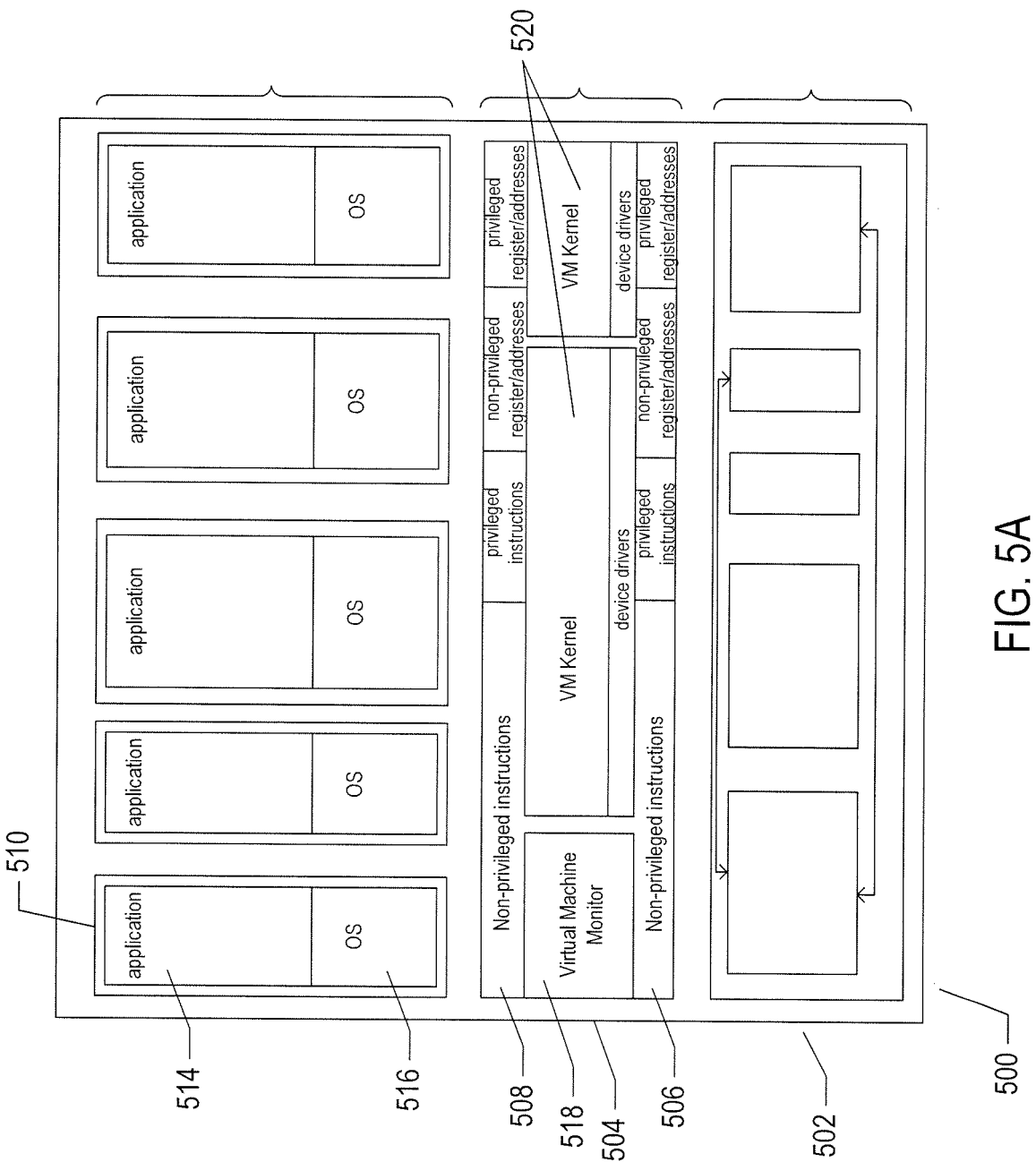
FIGS. 5A-B illustrate two types of virtual machine and virtual-machine execution environments.
Figure 5B:
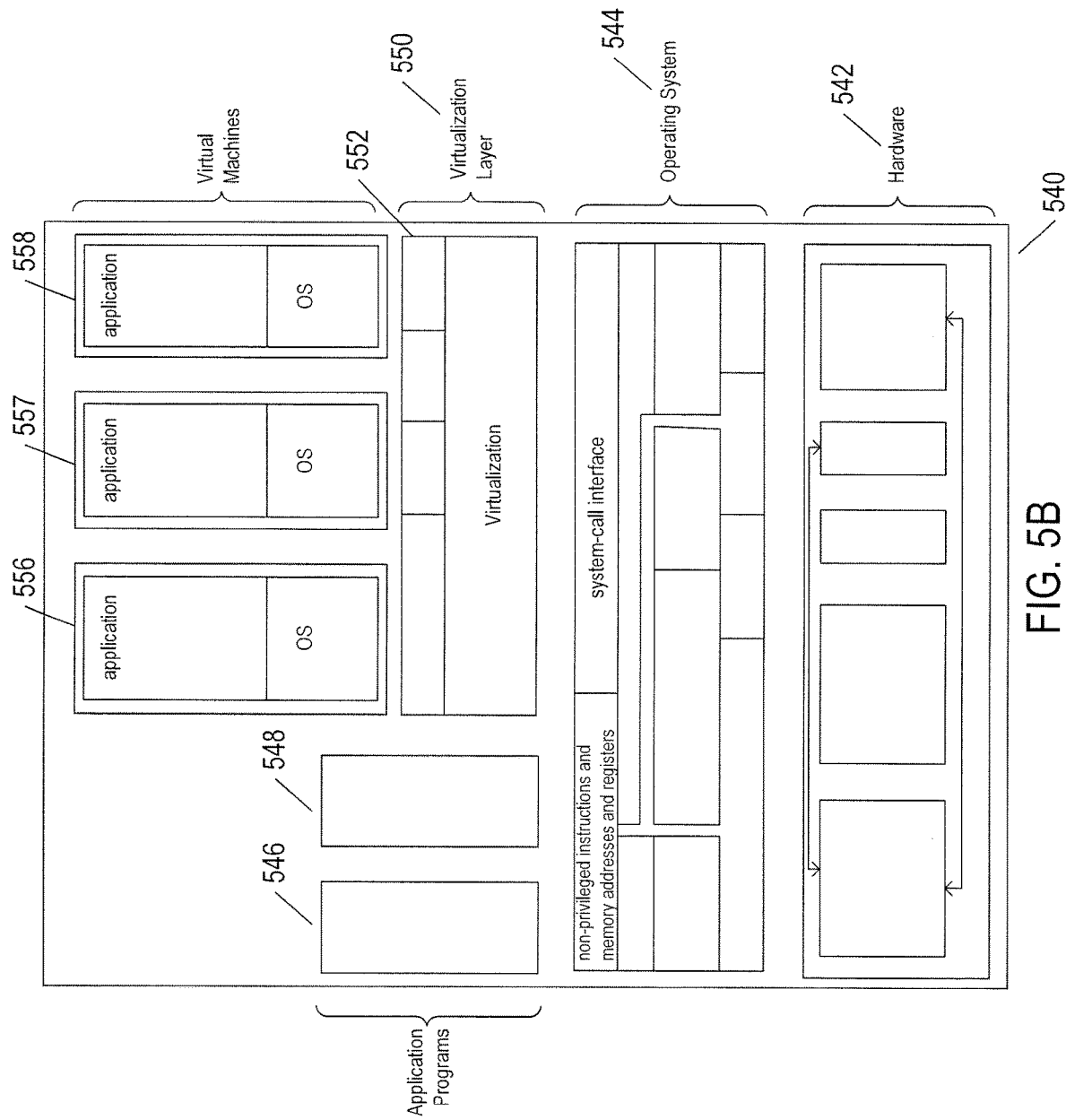

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
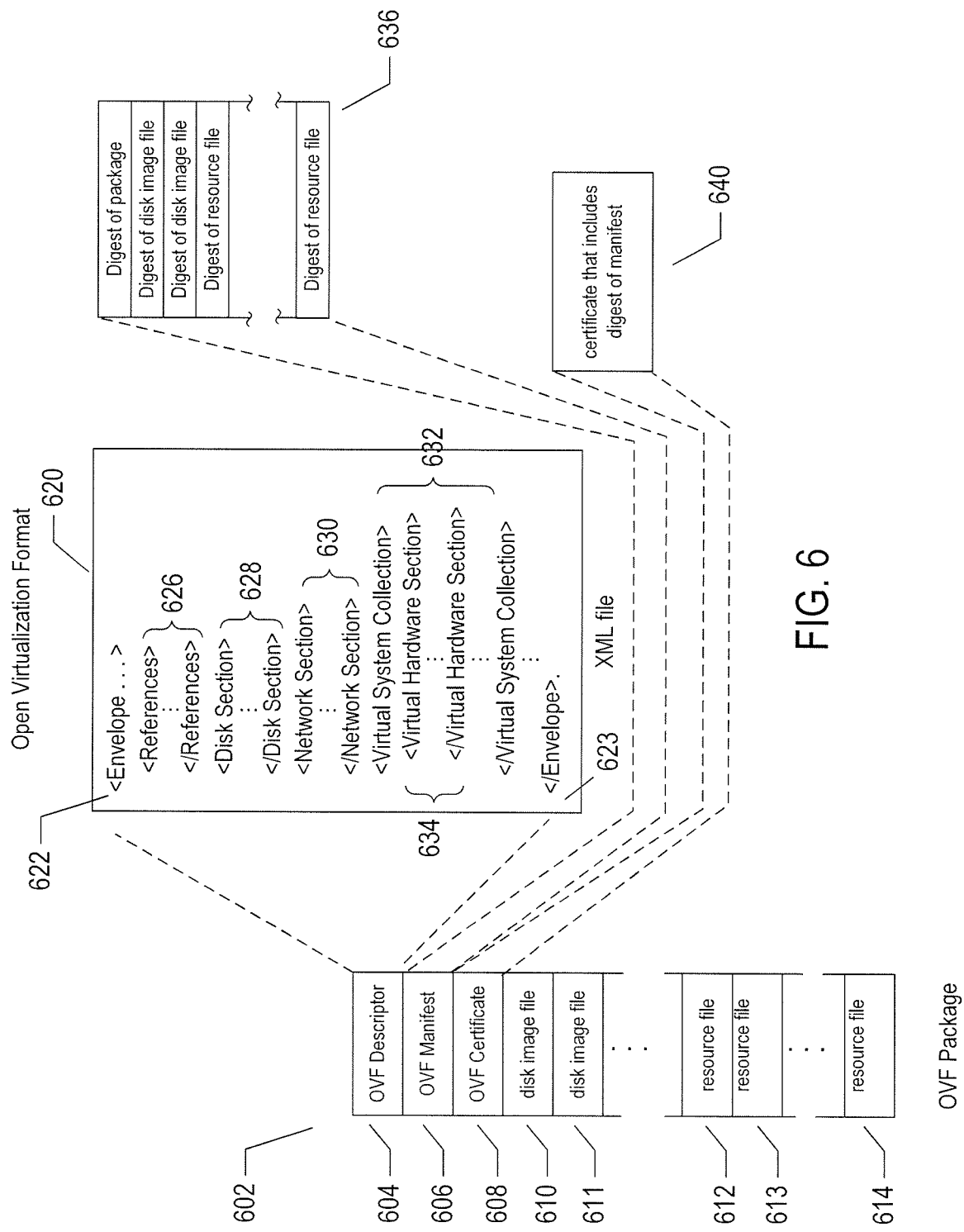
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
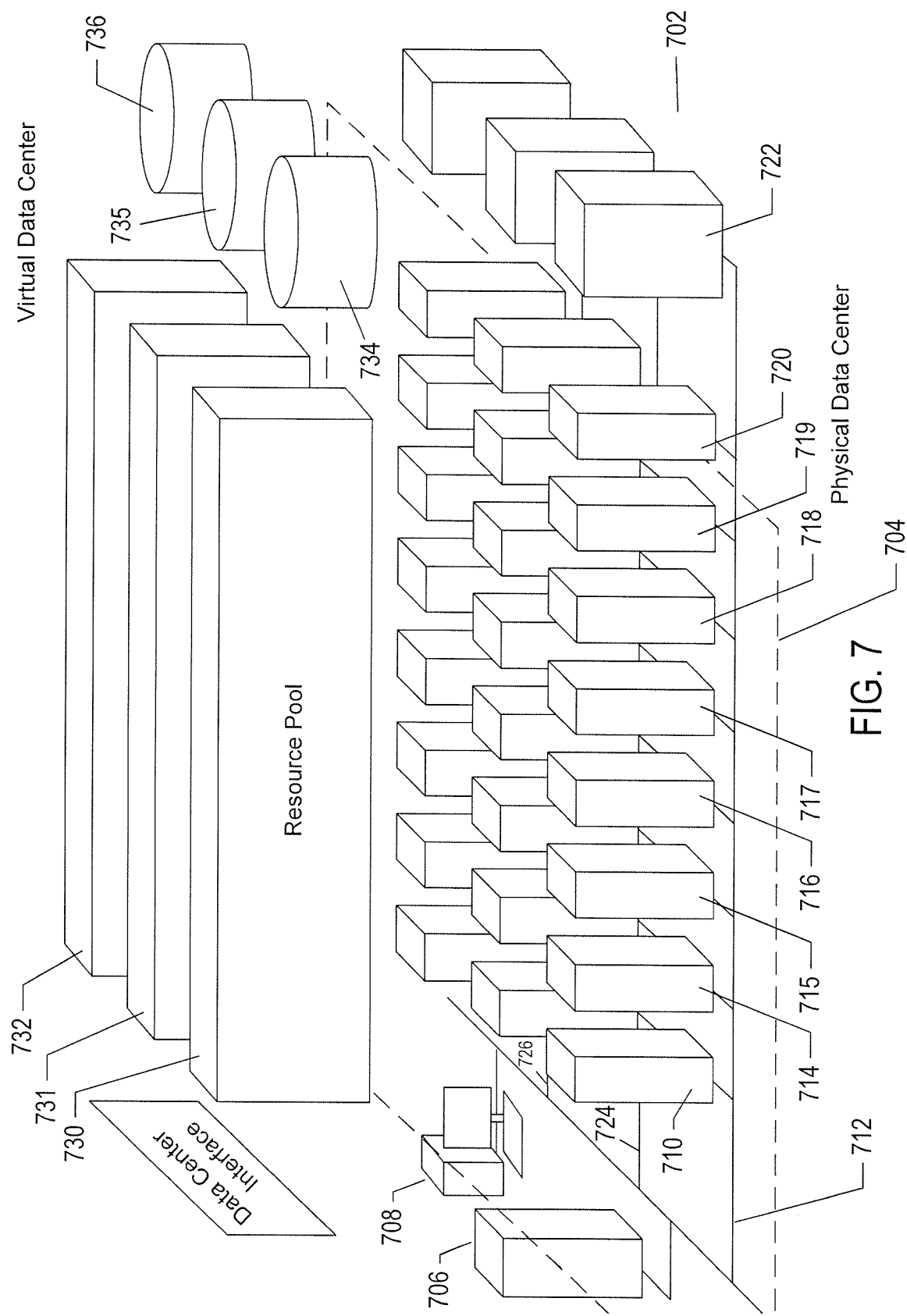
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

Figure 8:
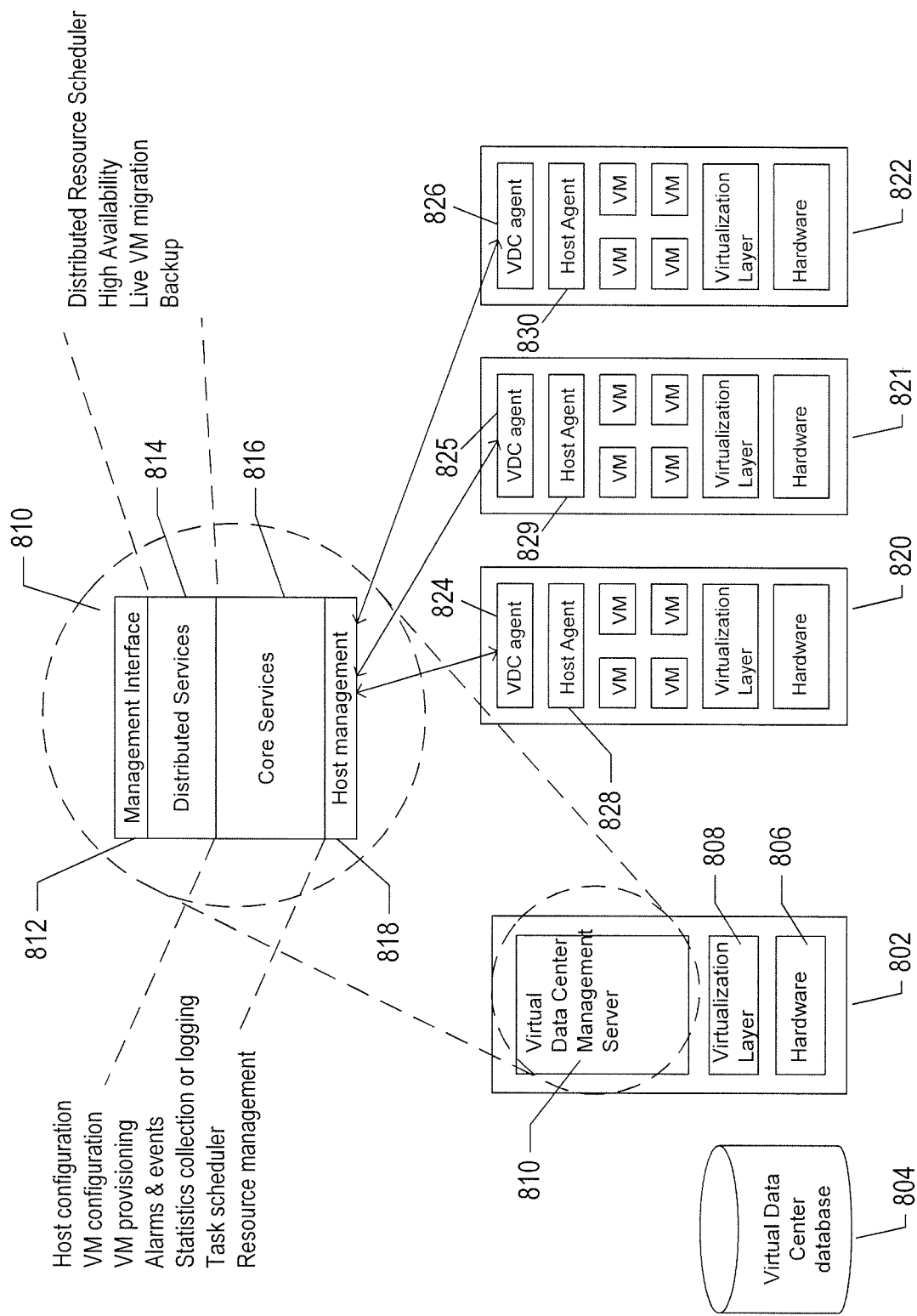
FIG. 8 illustrates virtual-machine components of a virtual-data-center management server and physical servers of a physical data center above which a virtual-data-center interface is provided by the virtual-data-center management server.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the virtual-data-center management server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability. FIG. 8 illustrates virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server virtual machine 810 above the virtualization layer. Although shown as a single server in FIG. 8, the virtual-data-center management server ("VDC management server") may include two or more physical server computers that support multiple VDC-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VDC management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VDC management server include host configuration, virtual-machine configuration, virtual-machine provisioning, generation of virtualdata-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VDC management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
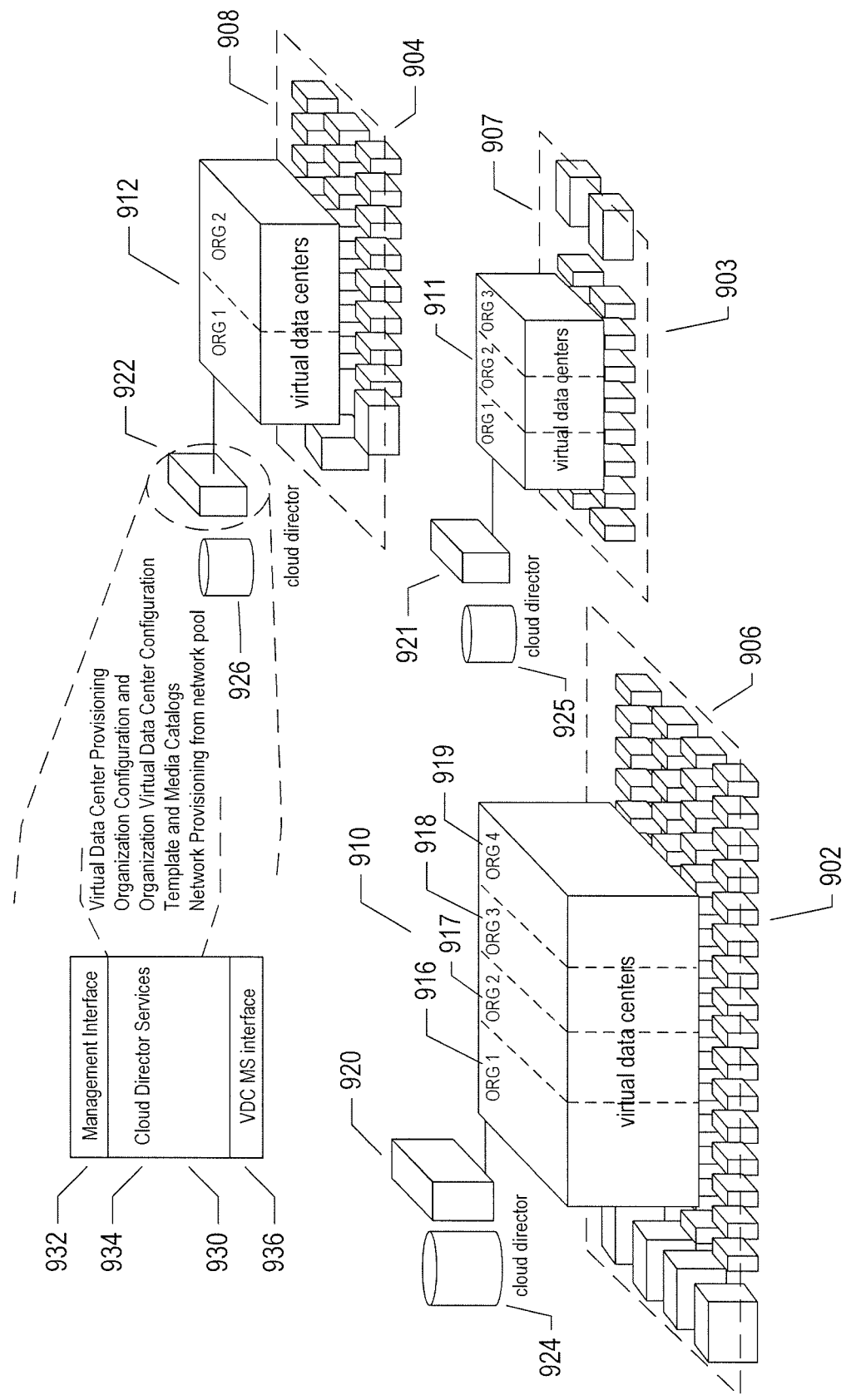
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
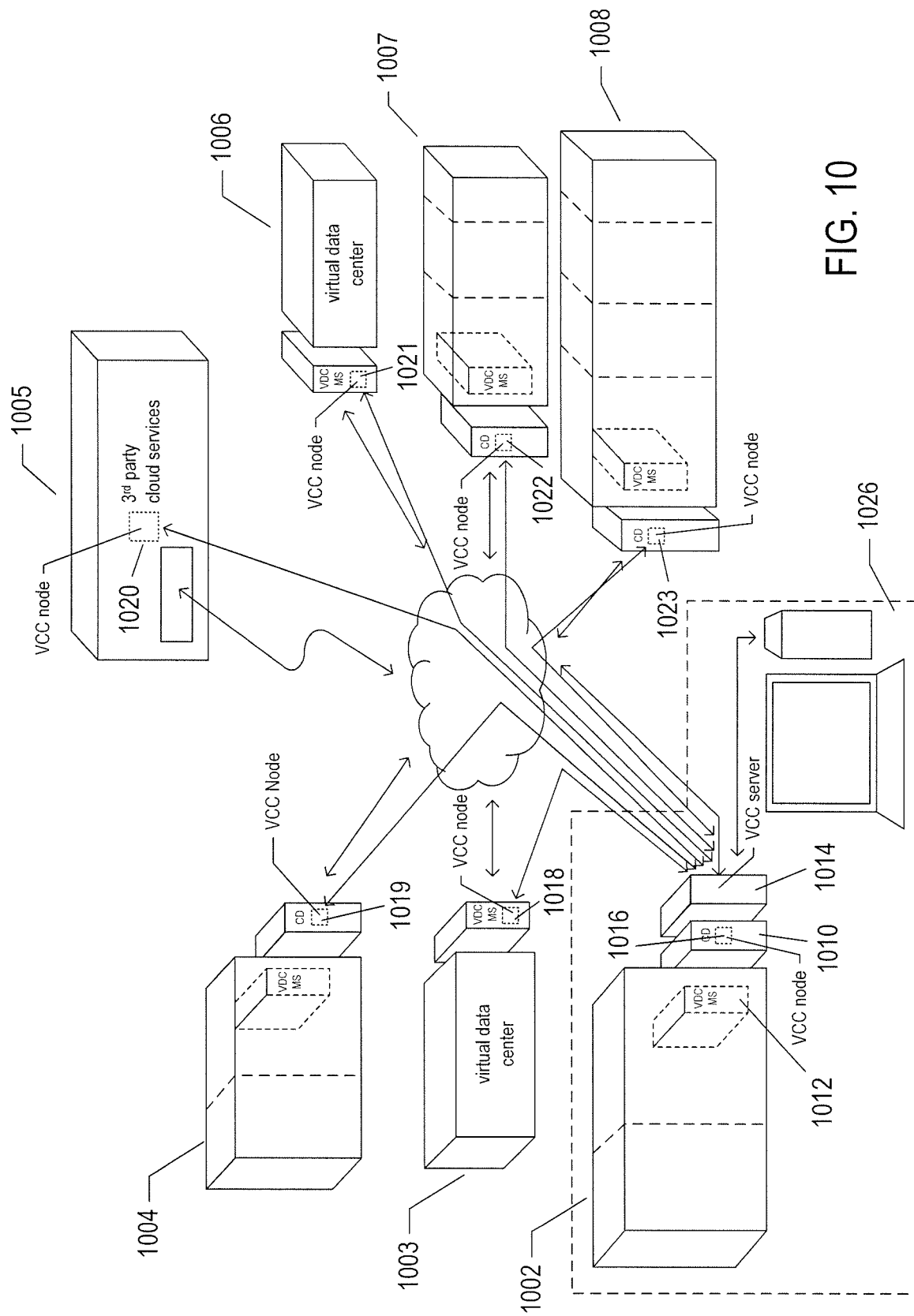
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Application Management and Reinforcement Learning

Figure 11A:
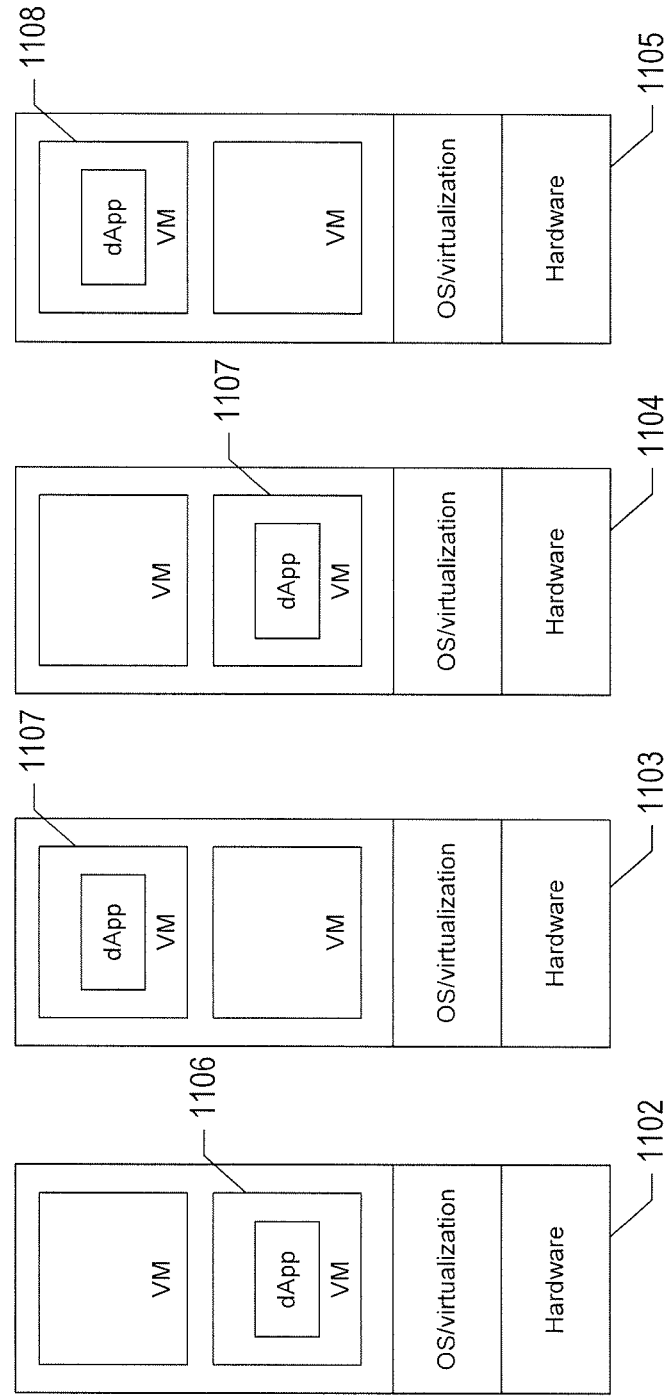
FIGS. 11A-C illustrate an application manager.
Figure 11B:
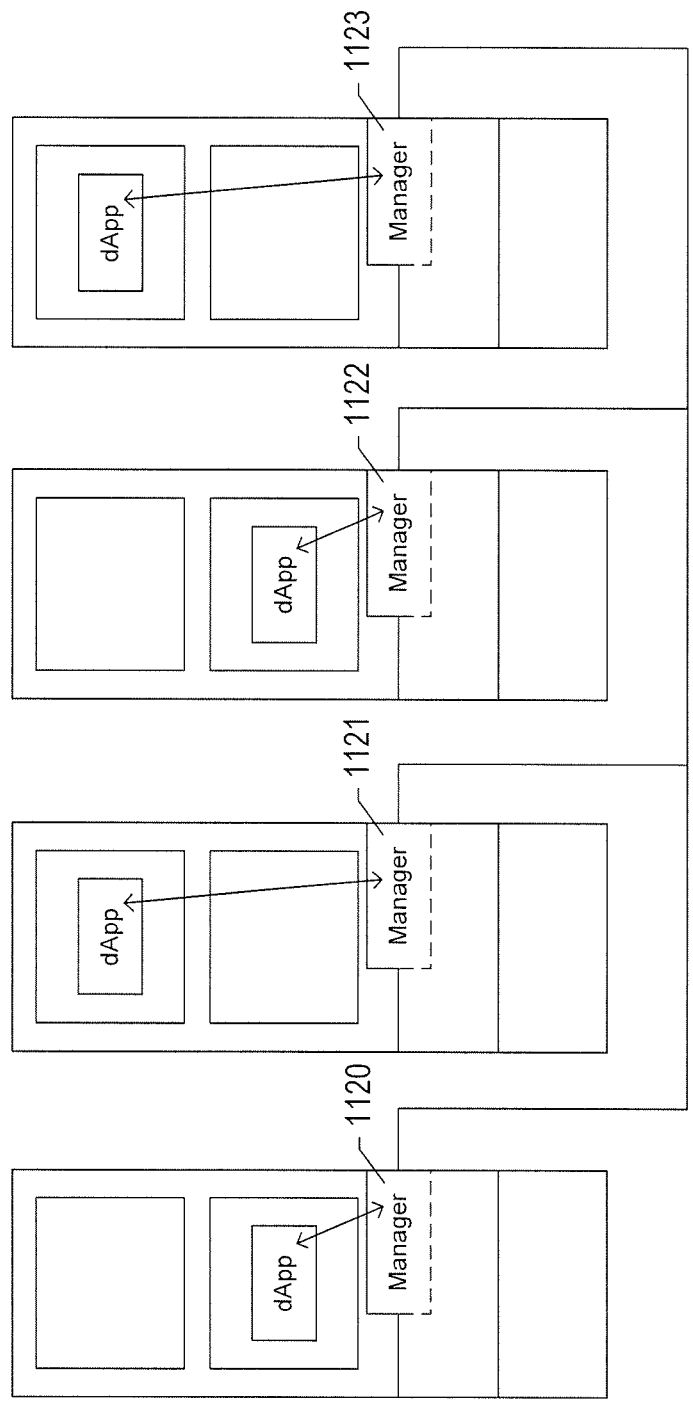
Figure 11C:
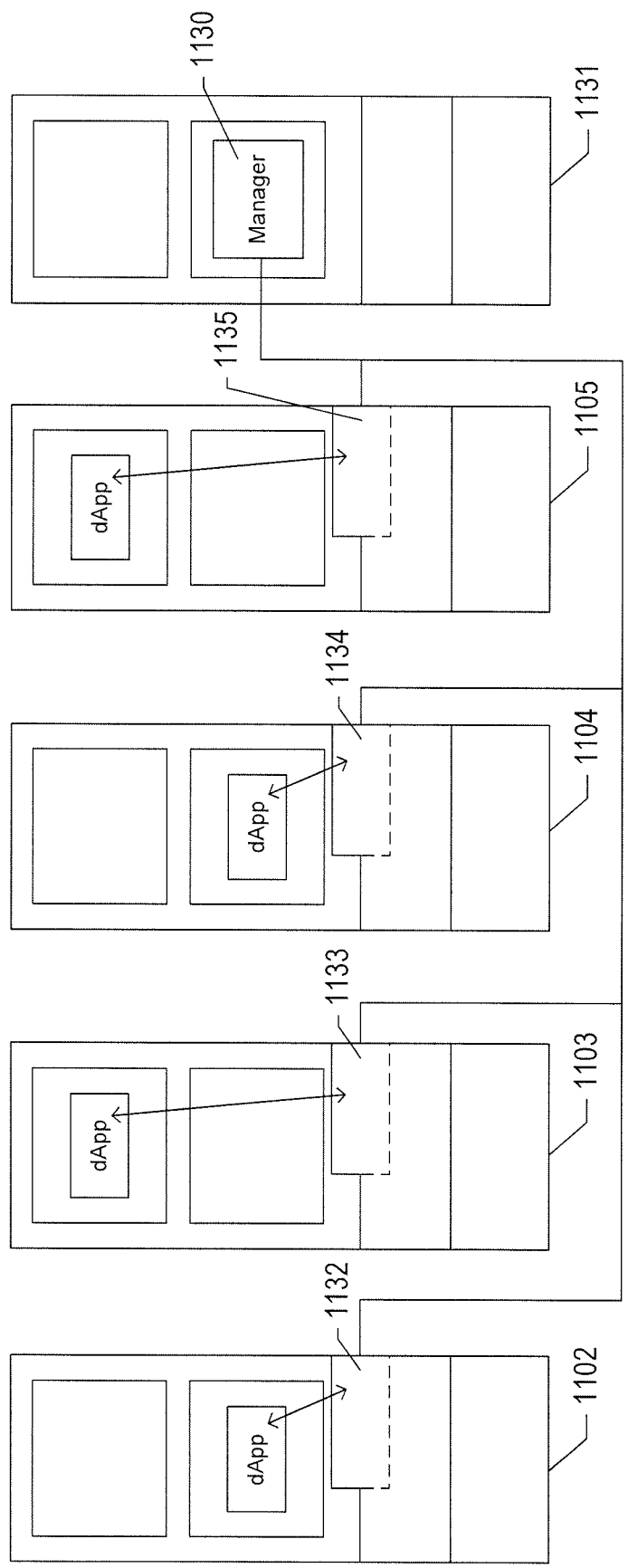

FIGS. 11A-C illustrate an application manager. All three figures use the same illustration conventions, next described with reference to FIG. 11A. The distributed computing system is represented, in FIG. 11A, by four servers 1102-1105 that each support execution of a virtual machine, 1106-1108 respectively, that provides an execution environment for a local instance of the distributed application. Of course, in real-life cloud-computing environments, a particular distributed application may run on many tens to hundreds of individual physical servers. Such distributed applications often require fairly continuous administration and management. For example, instances of the distributed application may need to be launched or terminated, depending on current computational loads, and may be frequently relocated to different physical servers and even to different cloud-computing facilities in order to take advantage of favorable pricing for virtual-machine execution, to obtain necessary computational throughput, and to minimize networking latencies. Initially, management of distributed applications as well as the management of multiple, different applications executing on behalf of a client or client organization of one or more cloud-computing facilities was carried out manually through various management interfaces provided by cloud-computing facilities and distributed-computer data centers. However, as the complexity of distributed-computing environments has increased and as the numbers and complexities of applications concurrently executed by clients and client organizations have increased, efforts have been undertaken to develop automated application managers for automatically monitoring and managing applications on behalf of clients and client organizations of cloud-computing facilities and distributed-computer-system-based data centers.

As shown in FIG. 11B, one approach to automated management of applications within distributed computer systems is to include, in each physical server on which one or more of the managed applications executes, a local instance of the distributed application manager 1120-1123. The local instances of the distributed application manager cooperate, in peer-to-peer fashion, to manage a set of one or more applications, including distributed applications, on behalf of a client or client organization of the data center or cloud-computing facility. Another approach, as shown in FIG. 11C, is to run a centralized or centralized-distributed application manager 1130 on one or more physical servers 1131 that communicates with application-manager agents 1132-1135 on the servers 1102-1105 to support control and management of the managed applications. In certain cases, application-management facilities may be incorporated within the various types of management servers that manage virtual data centers and aggregations of virtual data centers discussed in the previous subsection of the current document. The phrase "application manager" means, in this document, an automated controller than controls and manages applications programs and the computational environment in which they execute. Thus, an application manager may interface to one or more operating systems and virtualization layers, in addition to applications, in various implementations, to control and manage the applications and their computational environments. In certain implementations, an application manager may even control and manage virtual and/or physical components that support the computational environments in which applications execute.

In certain implementations, an application manager is configured to manage applications and their computational environments within one or more distributed computing systems based on a set of one or more policies, each of which may include various rules, parameter values, and other types of specifications of the desired operational characteristics of the applications. As one example, the one or more policies may specify maximum average latencies for responding to user requests, maximum costs for executing virtual machines per hour or per day, and policy-driven approaches to optimizing the cost per transaction and the number of transactions carried out per unit of time. Such overall policies may be implemented by a combination of finer-grain policies, parameterized control programs, and other types of controllers that interface to operating-system and virtualization-layer-management subsystems. However, as the numbers and complexities of applications desired to be managed on behalf of clients and client organizations of data centers and cloud-computing facilities continues to increase, it is becoming increasingly difficult, if not practically impossible, to implement policy-driven application management by manual programming and/or policy construction. As a result, a new approach to application management based on the machine-learning technique referred to as "reinforcement learning" has been undertaken.

Figure 12:
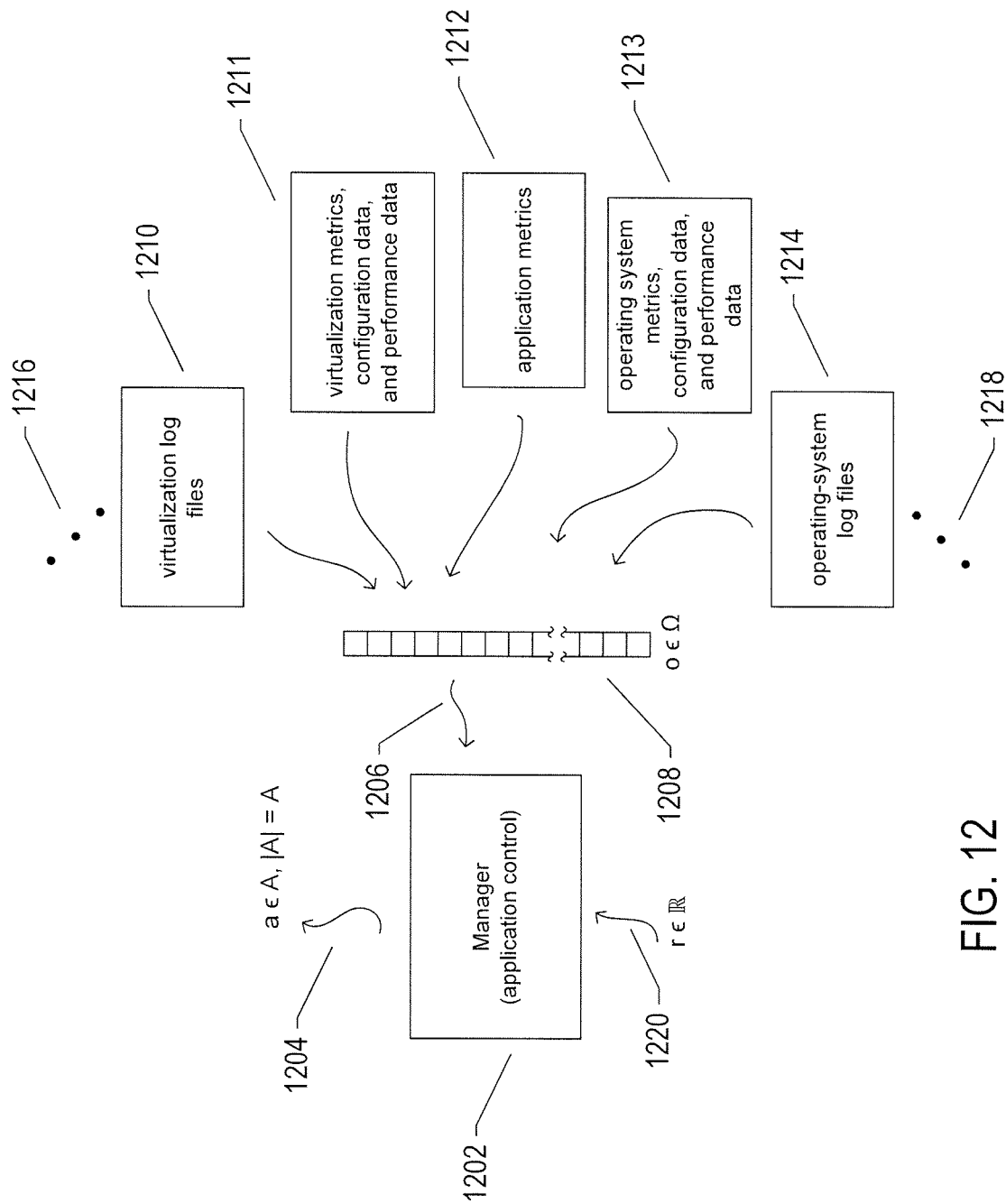
FIG. 12 illustrates, at a high level of abstraction, a reinforcement-learning-based application manager controlling a computational environment, such as a cloud-computing facility.

FIG. 12 illustrates, at a high level of abstraction, a reinforcement-learning-based application manager controlling a computational environment, such as a cloud-computing facility. The reinforcement-learning-based application manager 1202 manages one or more applications by emitting or issuing actions, as indicated by arrow 1204. These actions are selected from a set of actions A of cardinality |A|. Each action a in the set of actions A can be generally thought of as a vector of numeric values that specifies an operation that the manager is directing the environment to carry out. The environment may, in many cases, translate the action into one or more environment-specific operations that can be carried out by the computational environment controlled by the reinforcement-learning-based application manager. It should be noted that the cardinality |A| may be indeterminable, since the numeric values may include real values, and the action space may be therefore effectively continuous or effectively continuous in certain dimensions. The operations represented by actions may be, for example, commands, including command arguments, executed by operating systems, distributed operating systems, virtualization layers, management servers, and other types of control components and subsystems within one or more distributed computing systems or cloud-computing facilities. The reinforcement-learning-based application manager receives observations from the computational environment, as indicated by arrow 1206. Each observation o can be thought of as a vector of numeric values 1208 selected from a set of possible observation vectors $\Omega$. The set $\Omega$ may, of course, be quite large and even practically innumerable. Each element of the observation o represents, in certain implementations, a particular type of metric or observed operational characteristic or parameter, numerically encoded, that is related to the computational environment. The metrics may have discrete values or real values, in various implementations. For example, the metrics or observed operational characteristics may indicate the amount of memory allocated for applications and/or application instances, networking latencies experienced by one or more applications, an indication of the number of instruction-execution cycles carried out on behalf of applications or local-application instances, and many other types of metrics and operational characteristics of the managed applications and the computational environment in which the managed applications run. As shown in FIG. 12, there are many different sources 1210-1214 for the values included in an observation o, including virtualization-layer and operating-system log files 1210 and 1214, virtualization-layer metrics, configuration data, and performance data provided through a virtualization-layer management interface 1211, various types of metrics generated by the managed applications 1212, and operating-system metrics, configuration data, and performance data 1213. Ellipses 1216 and 1218 indicate that there may be many additional sources for observation values. In addition to receiving observation vectors o, the reinforcement-learning-based application manager receives rewards, as indicated by arrow 1220. Each reward is a numeric value that represents the feedback provided by the computational environment to the reinforcement-learning-based application manager after carrying out the most recent action issued by the manager and transitioning to a resultant state, as further discussed below. The reinforcement-learning-based application manager is generally initialized with an initial policy that specifies the actions to be issued in response to received observations and over time, as the application manager interacts with the environment, the application manager adjusts the internally maintained policy according to the rewards received following issuance of each action. In many cases, after a reasonable period of time, a reinforcement-learning-based application manager is able to learn a near-optimal or optimal policy for the environment, such as a set of distributed applications, that it manages. In addition, in the case that the managed environment evolves over time, a reinforcement-learning-based application manager is able to continue to adjust the internally maintained policy in order to track evolution of the managed environment so that, at any given point in time, the internally maintained policy is near-optimal or optimal. In the case of an application manager, the computational environment in which the applications run may evolve through changes to the configuration and components, changes in the computational load experienced by the applications and computational environment, and as a result of many additional changes and forces. The received observations provide the information regarding the managed environment that allows the reinforcement-learning-based application manager to infer the current state of the environment which, in turn, allows the reinforcement-learning-based application manager to issue actions that push the managed environment towards states that, over time, produce the greatest reward feedbacks. Of course, similar reinforcement-learning-based application managers may be employed within standalone computer systems, individual, networked computer systems, various processor-controlled devices, including smart phones, and other devices and systems that run applications.

FIG. 13 summarizes the reinforcement-learning-based approach to control. The manager or controller 1302, referred to as a "reinforcement-learning agent," is contained within, but is distinct and separate from, the universe 1304. Thus, the universe comprises the manager or controller 1302 and the portion of the universe not included in the manager, in set notation referred to as "universe-manager." In the current document, the portion of the universe not included in the manager is referred to as the "environment." In the case of an application manager, the environment includes the managed applications, the physical computational facilities in which they execute, and even generally includes the physical computational facilities in which the manager executes. The rewards are generated by the environment and the reward-generation mechanism cannot be controlled or modified by the manager.

Figure 14A:
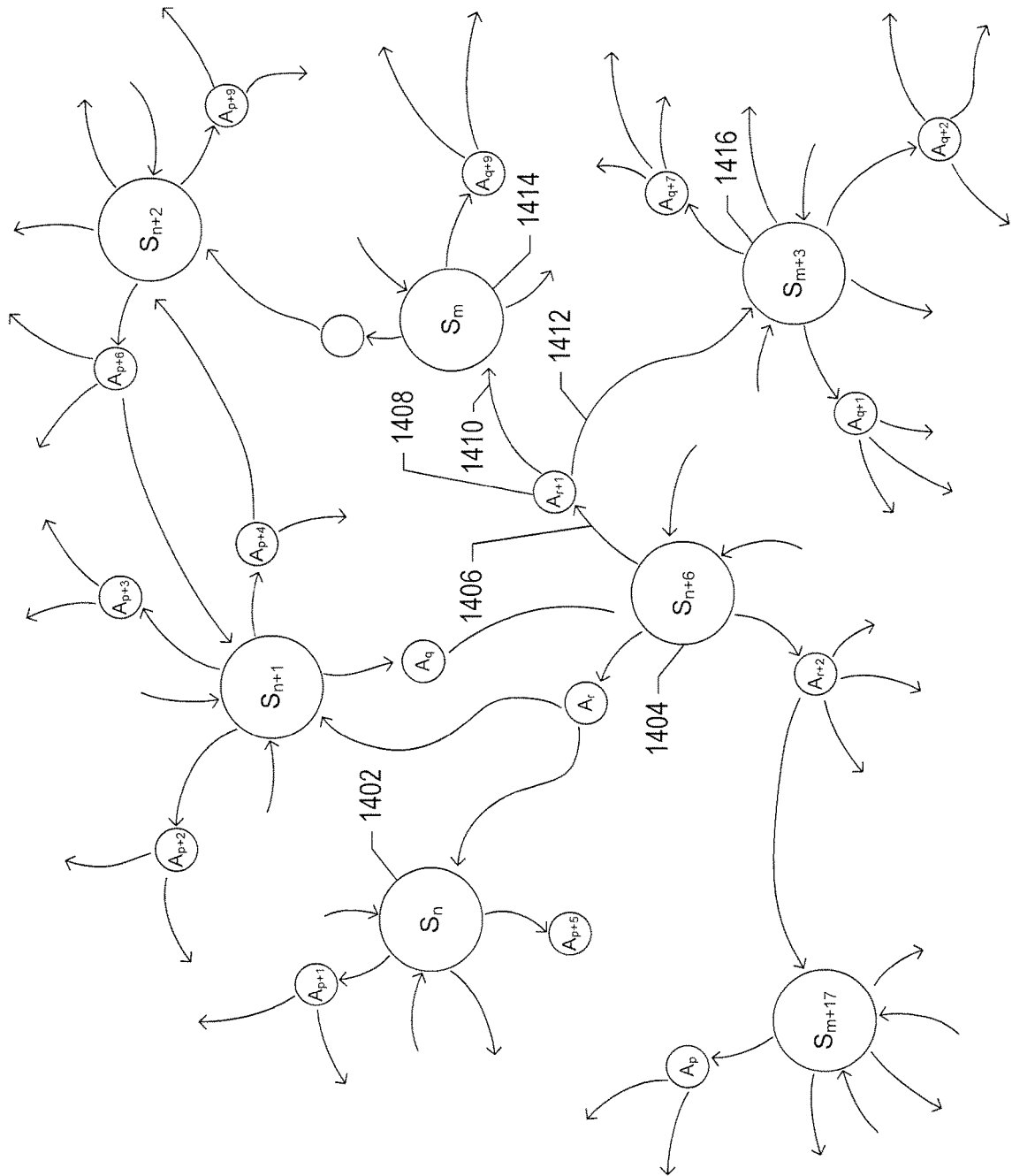
FIGS. 14A-B illustrate states of the environment.
Figure 14B:
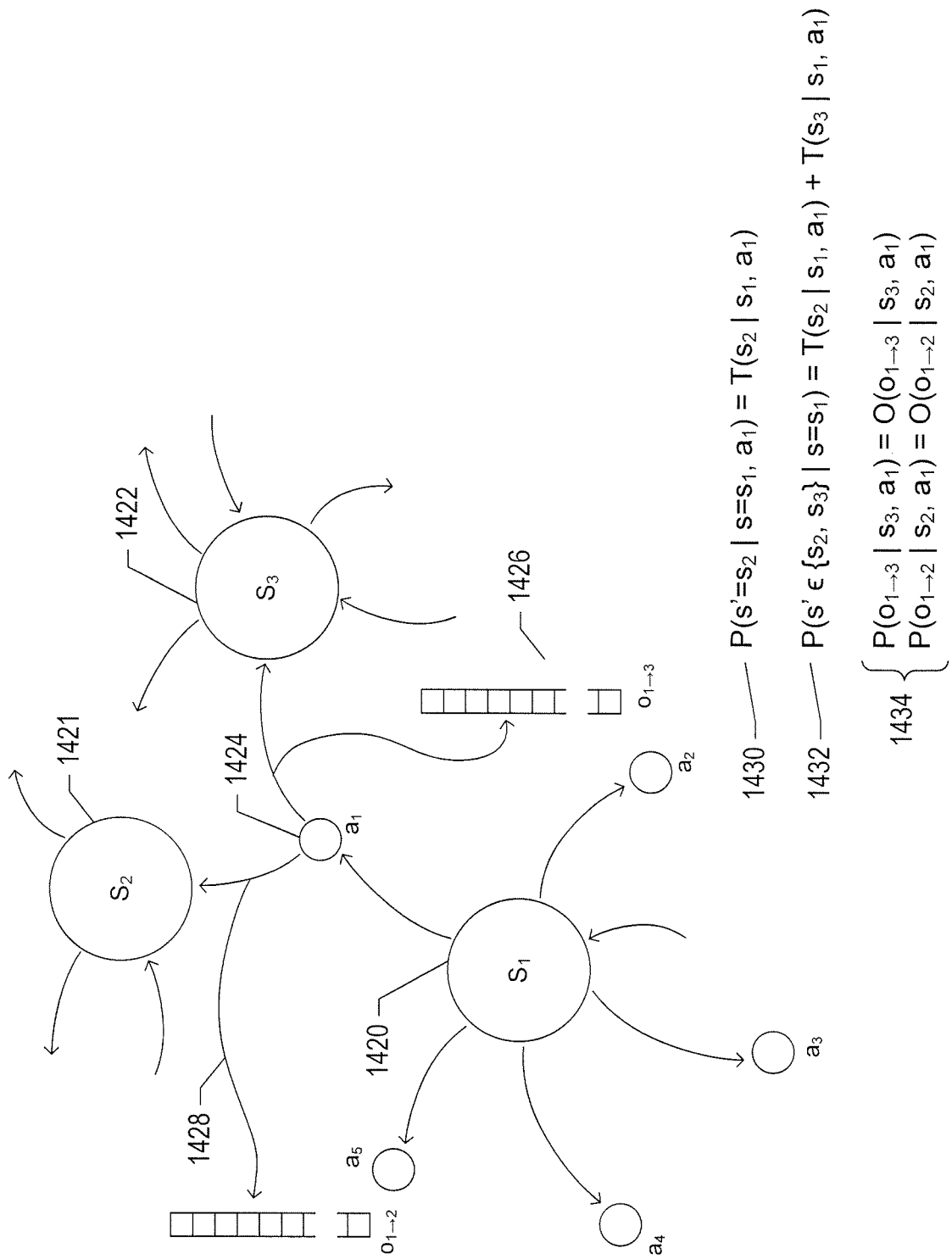

FIGS. 14A-B illustrate states of the environment. In the reinforcement-learning approach, the environment is considered to inhabit a particular state at each point in time. The state may be represented by one or more numeric values or character-string values, but generally is a function of hundreds, thousands, millions, or more different variables. The observations generated by the environment and transmitted to the manager reflect the state of the environment at the time that the observations are made. The possible state transitions can be described by a state-transition diagram for the environment. FIG. 14A illustrates a portion of a state-transition diagram. Each of the states in the portion of the state-transition diagram shown in FIG. 14A are represented by large, labeled disks, such as disc 1402 representing a particular state $S_n$. The transition between one state to another state occurs as a result of an action, emitted by the manager, that is carried out within the environment. Thus, arrows incoming to a given state represent transitions from other states to the given state and arrows outgoing from the given state represent transitions from the given state to other states. For example, one transition from state 1404, labeled $S_{n+6}$, is represented by outgoing arrow 1406. The head of this arrow points to a smaller disc that represents a particular action 1408. This action node is labeled $A_{r+1}$. The labels for the states and actions may have many different forms, in different types of illustrations, but are essentially unique identifiers for the corresponding states and actions. The fact that outgoing arrow 1406 terminates in action 1408 indicates that transition 1406 occurs upon carrying out of action 1408 within the environment when the environment is in state 1404. Outgoing arrows 1410 and 1412 emitted by action node 1408 terminate at states 1414 and 1416, respectively. These arrows indicate that carrying out of action 1408 by the environment when the environment is in state 1404 results in a transition either to state 1414 or to state 1416. It should also be noted that an arrow emitted from an action node may return to the state from which the outgoing arrow to the action node was emitted. In other words, carrying out of certain actions by the environment when the environment is in a particular state may result in the environment maintaining that state. Starting at an initial state, the state-transition diagram indicates all possible sequences of state transitions that may occur within the environment. Each possible sequence of state transitions is referred to as a "trajectory."

FIG. 14B illustrates additional details about state-transition diagrams and environmental states and behaviors. FIG. 14B shows a small portion of a state-transition diagram that includes three state nodes 1420-1422. A first additional detail is the fact that, once an action is carried out, the transition from the action node to a resultant state is accompanied by the emission of an observation, by the environment, to the manager. For example, a transition from state 1420 to state 1422 as a result of action 1424 produces observation 1426, while transition from state 1420 to state 1421 via action 1424 produces observation 1428. A second additional detail is that each state transition is associated with a probability. Expression 1430 indicates that the probability of transitioning from state $s_1$ to state $s_2$ as a result of the environment carrying out action $a_1$, where s indicates the current state of the environment and s' indicates the next state of the environment following s, is output by the state-transition function T, which takes, as arguments, indications of the initial state, the final state, and the action. Thus, each transition from a first state through a particular action node to a second state is associated with a probability. The second expression 1432 indicates that probabilities are additive, so that the probability of a transition from state $s_1$ to either state $s_2$ or state $s_3$ as a result of the environment carrying out action $a_1$ is equal to the sum of the probability of a transition from state $s_1$ to state $s_2$ via action $a_1$ and the probability of a transition from state $s_1$ to state $s_3$ via action $a_1$. Of course, the sum of the probabilities associated with all of the outgoing arrows emanating from a particular state is equal to 1.0, for all non-terminal states, since, upon receiving an observation/reward pair following emission of a first action, the manager emits a next action unless the manager terminates. As indicated by expressions 1434, the function O returns the probability that a particular observation o is returned by the environment given a particular action and the state to which the environment transitions following execution of the action. In other words, in general, there are many possible observations o that might be generated by the environment following transition to a particular state through a particular action, and each possible observation is associated with a probability of occurrence of the observation given a particular state transition through a particular action.

Figure 15:
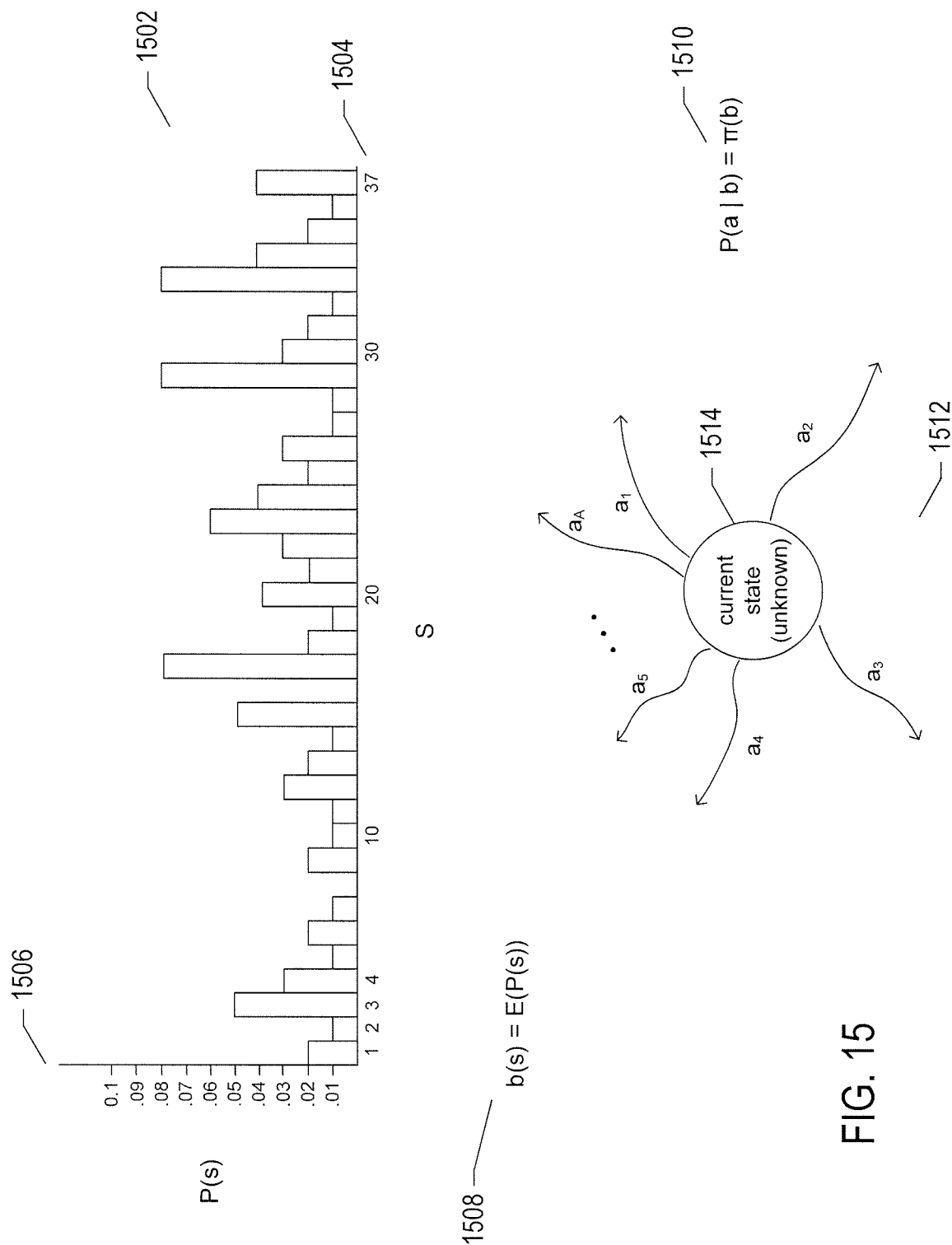
FIG. 15 illustrates the concept of belief.

FIG. 15 illustrates the concept of belief. At the top of FIG. 15, a histogram 1502 is shown. The horizontal axis 1502 represents 37 different possible states for a particular environment and the vertical axis 1506 represents the probability of the environment being in the corresponding state at some point in time. Because the environment must be in one state at any given point in time, the sum of the probabilities for all the states is equal to 1.0. Because the manager does not know the state of the environment, but instead only knows the values of the elements of the observation following the last executed action, the manager infers the probabilities of the environment being in each of the different possible states. The manager's belief b(s) is the expectation of the probability that the environment is in state s, as expressed by equation 1508. Thus, the belief b is a probability distribution which could be represented in a histogram similar to histogram 1502. Over time, the manager accumulates information regarding the current state of the environment and the probabilities of state transitions as a function of the belief distribution and most recent actions, as a result of which the probability distribution b shifts towards an increasingly non-uniform distribution with greater probabilities for the actual state of the environment. In a deterministic and fully observable environment, in which the manager knows the current state of the environment, the policy π maintained by the manager can be thought of as a function that returns the next action a to be emitted by the manager to the environment based on the current state of the environment, or, in mathematical notation, a=π(s). However, in the non-deterministic and non-transparent environment in which application managers operate, the policy π maintained by the manager determines a probability for each action based on the current belief distribution b, as indicated by expression 1510 in FIG. 15, and an action with the highest probability is selected by the policy π, which can be summarized, in more compact notation, by expression 1511. Thus, as indicated by the diagram of a state 1512, at any point in time, the manager does not generally certainly know the current state of the environment, as indicated by the label 1514 within the node representation of the current date 1512, as a result of which there is some probability, for each possible state, that the environment is currently in that state. This, in turn, generally implies that there is a non-zero probability that each of the possible actions that the manager can issue should be the next issued action, although there are cases in which, although the state of the environment is not known with certain, there is enough information about the state of the environment to allow a best action to be selected.

Figure 16A:
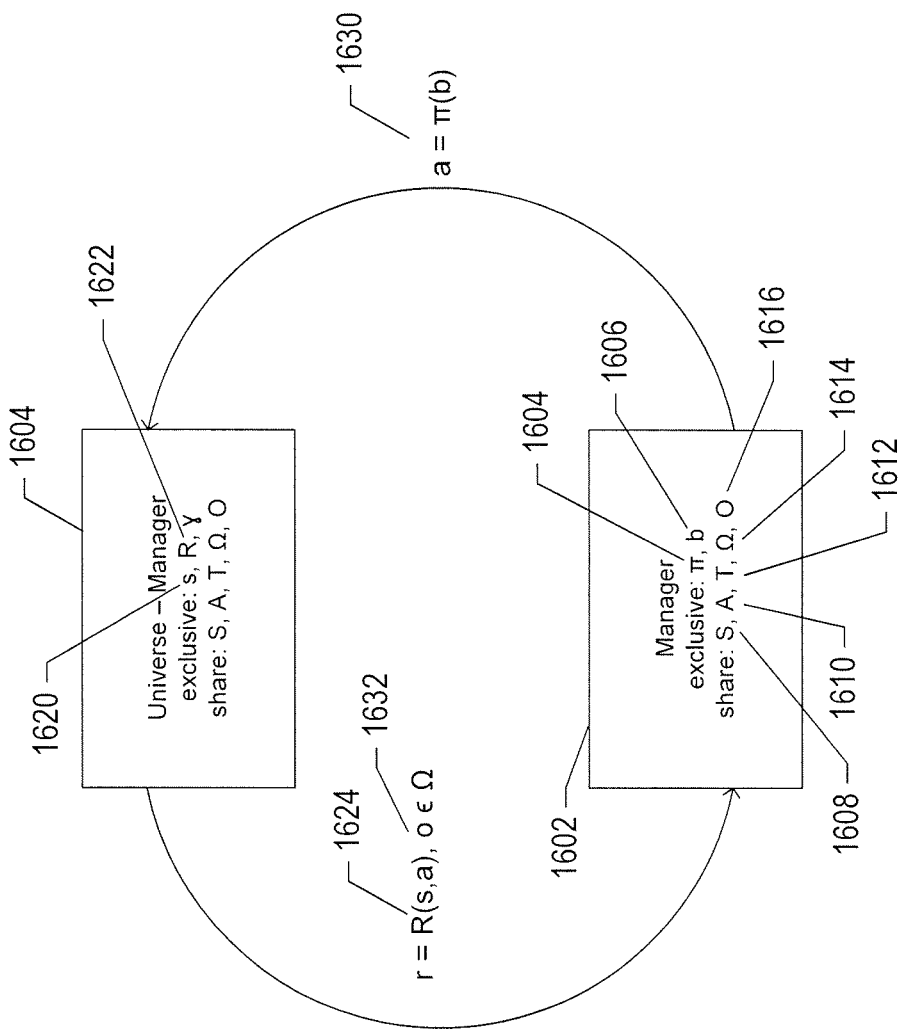
FIGS. 16A-B illustrate a simple flow diagram for the universe comprising the manager and the environment in one approach to reinforcement learning.
Figure 16B:
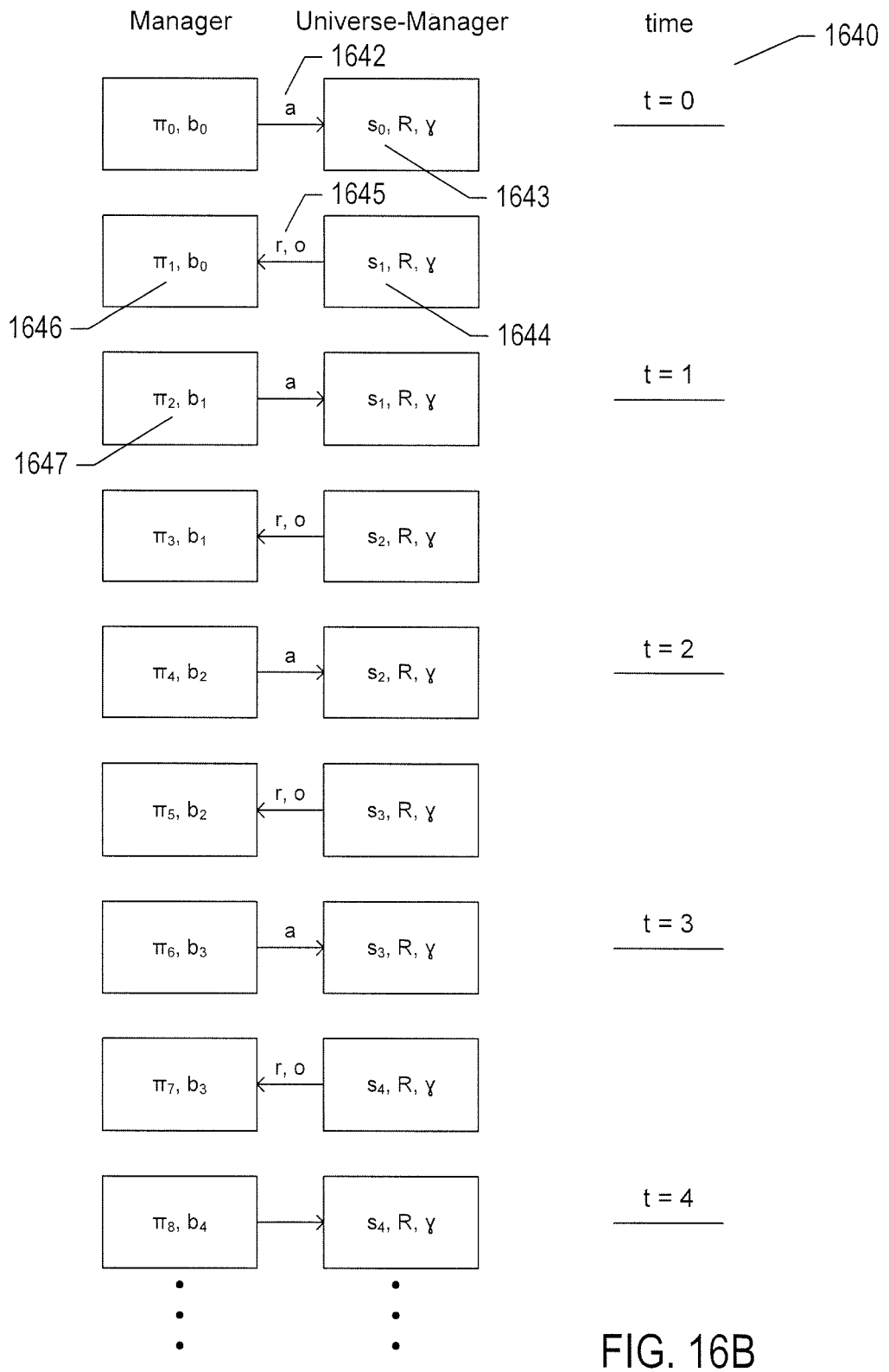

FIGS. 16A-B illustrate a simple flow diagram for the universe comprising the manager and the environment in one approach to reinforcement learning. The manager 1602 internally maintains a policy π 1604 and a belief distribution b 1606 and is aware of the set of environment states S 1608, the set of possible actions A 1610, the state-transition function T 1612, the set of possible observations Ω 1614 and, and the observation-probability function O 1616, all discussed above. The environment 1604 shares knowledge of the sets A, and Ω with the manager. Usually, the true state space S and the functions T and O are unknown and estimated by the manager. The environment maintains the current state of the environment s 1620, a reward function R 1622 that returns a reward r in response to an input current state s and an input action a received while in the current state 1624, and a discount parameter γ 1626, discussed below. The manager is initialized with an initial policy and belief distribution. The manager emits a next action 1630 based on the current belief distribution which the environment then carries out, resulting in the environment occupying a resultant state and then issues a reward 1624 and an observation o 1632 based on the resultant state and the received action. The manager receives the reward and observation, generally updates the internally stored policy and belief distribution, and then issues a next action, in response to which the environment transitions to a resultant state and emits a next reward and observation. This cycle continues indefinitely or until a termination condition arises.

It should be noted that this is just one model of a variety of different specific models that may be used for a reinforcement-learning agent and environment. There are many different models depending on various assumptions and desired control characteristics. In certain models which employ policy-gradient approaches, for example, a belief distribution may not be needed.

FIG. 16B shows an alternative way to illustrate operation of the universe. In this alternative illustration method, a sequence of time steps is shown, with the times indicated in a right-hand column 1640. Each time step consists of issuing, by the manager, an action to the environment and issuing, by the environment, a reward and observation to the manager. For example, in the first time step t=0, the manager issues an action a 1642, the environment transitions from state $s_0$ 1643 to $s_1$ 1644, and the environment issues a reward r and observation o 1645 to the manager. As a result, the manager updates the policy and belief distribution in preparation for the next time step. For example, the initial policy and belief distribution $\pi_0$ and $b_0$ 1646 are updated to the policy and belief distribution $\pi_1$ and $b_1$ 1647 at the beginning of the next time step t=1. The sequence of states $\{s_0, s_1, \ldots\}$ represents the trajectory of the environment as controlled by the manager. Each time step is thus equivalent to one full cycle of the control-flow-diagram-like representation discussed above with reference to FIG. 16A.

FIG. 17 provides additional details about the operation of the manager, environment, and universe. At the bottom of FIG. 17, a trajectory for the manager and environment is laid out horizontally with respect to the horizontal axis 1702 representing the time steps discussed above with reference to FIG. 16B. A first horizontal row 1704 includes the environment states, a second horizontal row 1706 includes the belief distributions, and a third horizontal row 1708 includes the issued rewards. At any particular state, such as circled state $s_4$ 1710, one can consider all of the subsequent rewards, shown for state $s_4$ within box 1712 in FIG. 17. The discounted return for state $s_4$, $G_4$, is the sum of a series of discounted rewards 1714. The first term in the series 1716 is the reward $r_5$ returned when the environment transitions from state $s_4$ to state $s_5$. Each subsequent term in the series includes the next reward multiplied by the discount rate γ raised to a power. The discounted reward can be alternatively expressed using a summation, as indicated in expression 1718. The value of a given state s, assuming a current policy π, is the expected discounted return for the state, and is returned by a value function $V^\pi(\ )$, as indicated by expression 1720. Alternatively, an action-value function returns a discounted return for a particular state and action, assuming a current policy, as indicated by expression 1722. An optimal policy π* provides a value for each state that is greater than or equal to the value provided by any possible policy π in the set of possible policies Π. There are many different ways for achieving an optimal policy. In general, these involve running a manager to control an environment while updating the value function $V^\pi(\ )$ and policy π, either in alternating sessions or concurrently. In some approaches to reinforcement learning, when the environment is more or less static, once an optimal policy is obtained during one or more training runs, the manager subsequently controls the environment according to the optimal policy. In other approaches, initial training generates an initial policy that is then continuously updated, along with the value function, in order to track changes in the environment so that a near-optimal policy is maintained by the manager.

Figure 18:
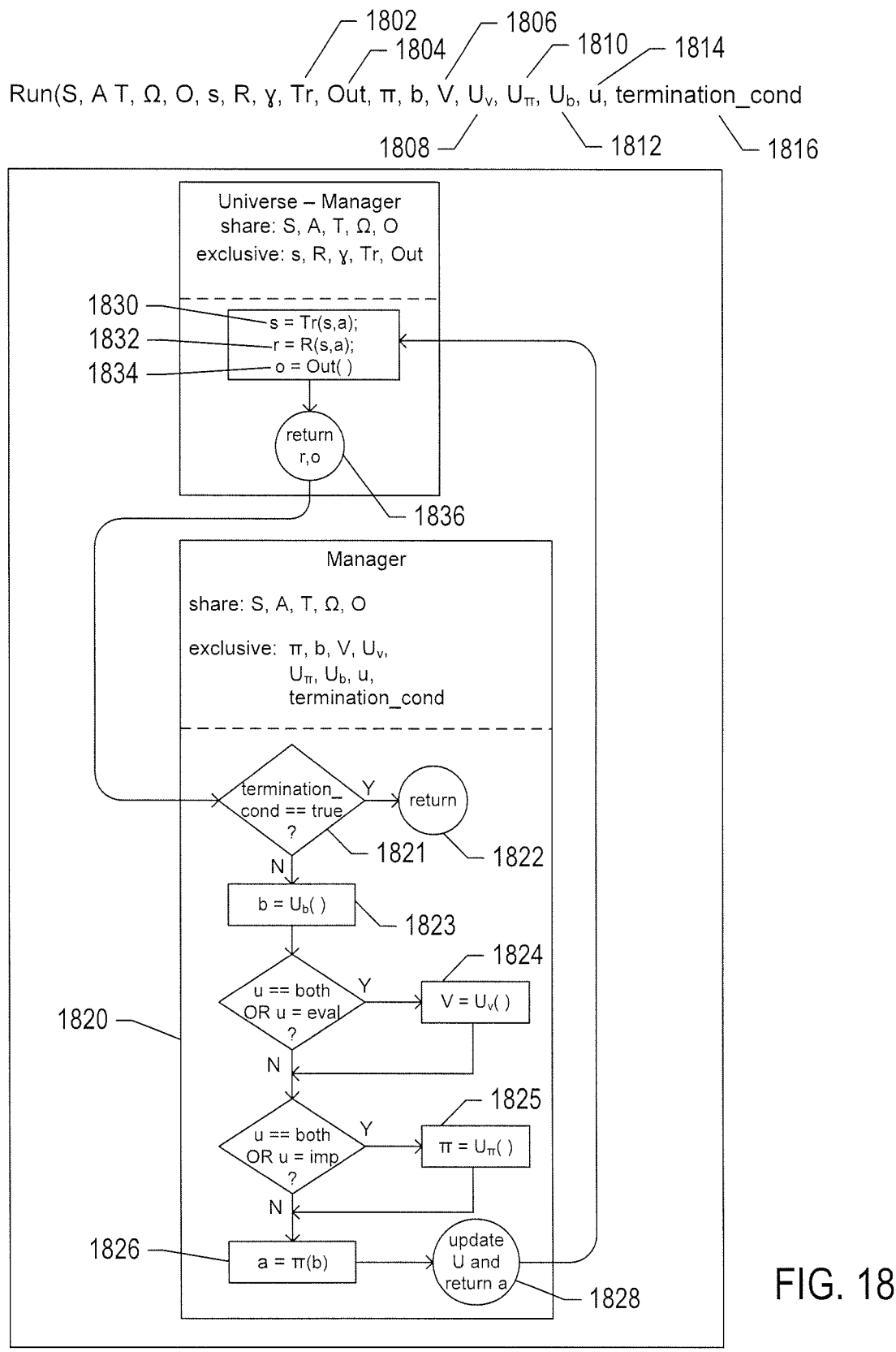
FIG. 18 provides a somewhat more detailed control-flow-like description of operation of the manager and environment than originally provided in FIG. 16A.

FIG. 18 provides a somewhat more detailed control-flow-like description of operation of the manager and environment than originally provided in FIG. 16A. The control-flow-like presentation corresponds to a run of the manager and environment that continues until a termination condition evaluates to TRUE. In addition to the previously discussed sets and functions, this model includes a state-transition function Tr 1802, an observation-generation function Out 1804, a value function V 1806, update functions $U_v$ 1808, $U_\pi$ 1810, and $U_b$ 1812 that update the value function, policy, and belief distribution, respectively, an update variable u 1814 that indicates whether to update the value function, policy, or both, and a termination condition 1816. The manager 1820 determines whether the termination condition evaluates to TRUE, in step 1821, and, if so, terminates in step 1822. Otherwise, the manager updates the belief, in step 1823 and updates one or both of the value function and policy, in steps 1824 and 1825, depending on the current value of the update variable u. In step 1826, the manager generates a new action and, in step 1828, updates the update variable u and issues the generated action to the environment. The environment determines a new state 1830, determines a reward 1832, and determines an observation 1834 and returns the generated reward and observation in step 1836.

Figure 19:
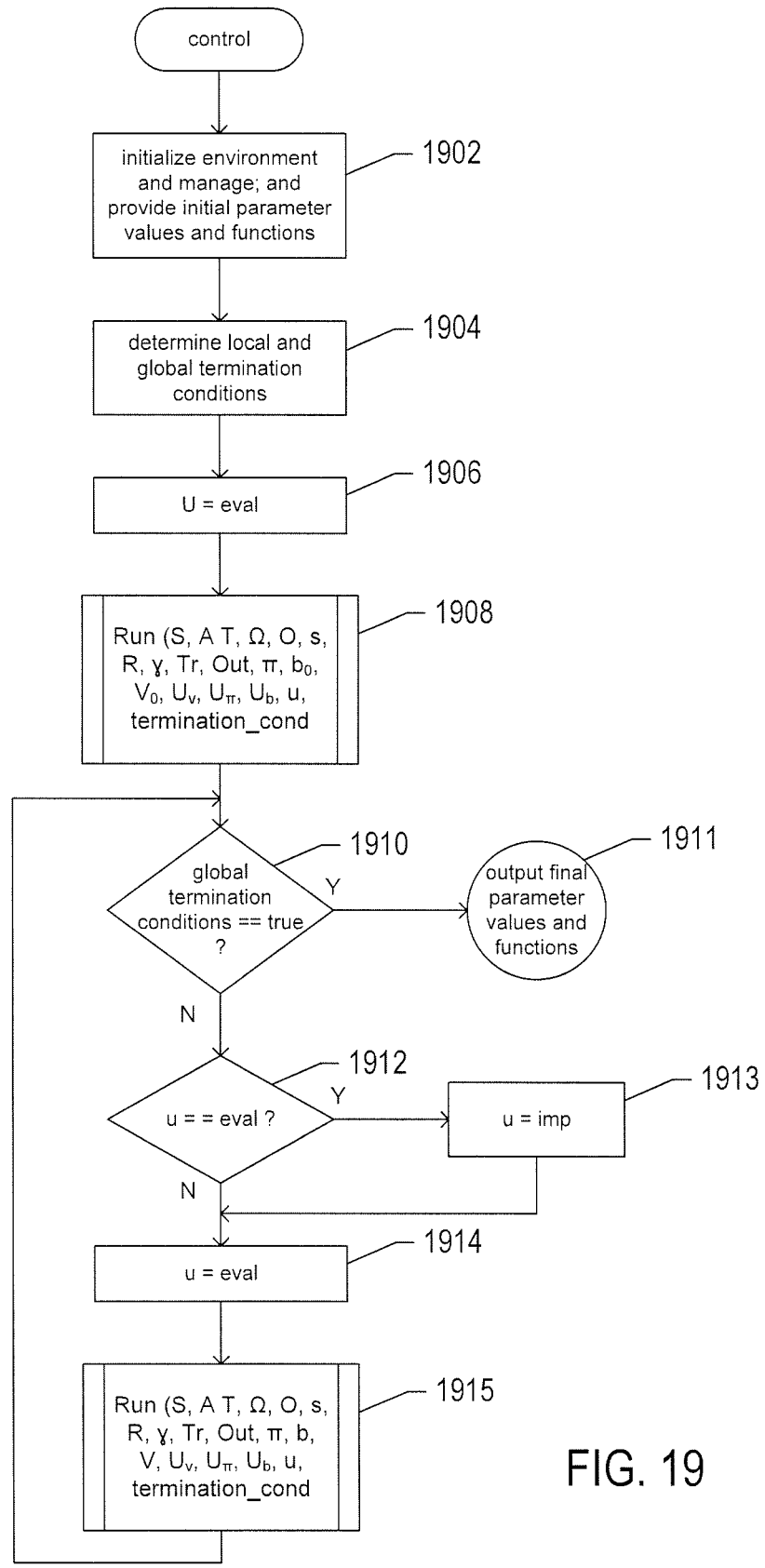
FIG. 19 provides a traditional control-flow diagram for operation of the manager and environment over multiple runs.

FIG. 19 provides a traditional control-flow diagram for operation of the manager and environment over multiple runs. In step 1902, the environment and manager are initialized. This involves initializing certain of the various sets, functions, parameters, and variables shown at the top of FIG. 18. In step 1904, local and global termination conditions are determined. When the local termination condition evaluates to TRUE, the run terminates. When the global termination condition evaluates to TRUE, operation of the manager terminates. In step 1906, the update variable u is initialized to indicate that the value function should be updated during the initial run. Step 1908 consists of the initial run, during which the value function is updated with respect to the initial policy. Then, additional runs are carried out in the loop of steps 1910-1915. When the global termination condition evaluates to TRUE, as determined in step 1910, operation of the manager is terminated in step 1911, with output of the final parameter values and functions. Thus, the manager may be operated for training purposes, according to the control-flow diagram shown in FIG. 19, with the final output parameter values and functions stored so that the manager can be subsequently operated, according to the control-flow diagram shown in FIG. 19, to control a live system. Otherwise, when the global termination condition does not evaluate to TRUE and when the update variable u has a value indicating that the value function should be updated, as determined in step 1912, the value stored in the update variable u is changed to indicate that the policy should be updated, in step 1913. Otherwise, the value stored in the update variable u is changed to indicate that the value function should be updated, in step 1914. Then, a next run, described by the control-flow-like diagram shown in FIG. 18, is carried out in step 1915. Following termination of this run, control flows back to step 1910 for a next iteration of the loop of steps 1910-1915. In alternative implementations, the update variable u may be initially set to indicate that both the value function and policy should be updated during each run and the update variable u is not subsequently changed. This approach involves different value-function and policy update functions than those used when only one of the value function and policy is updated during each run.

Figure 20:
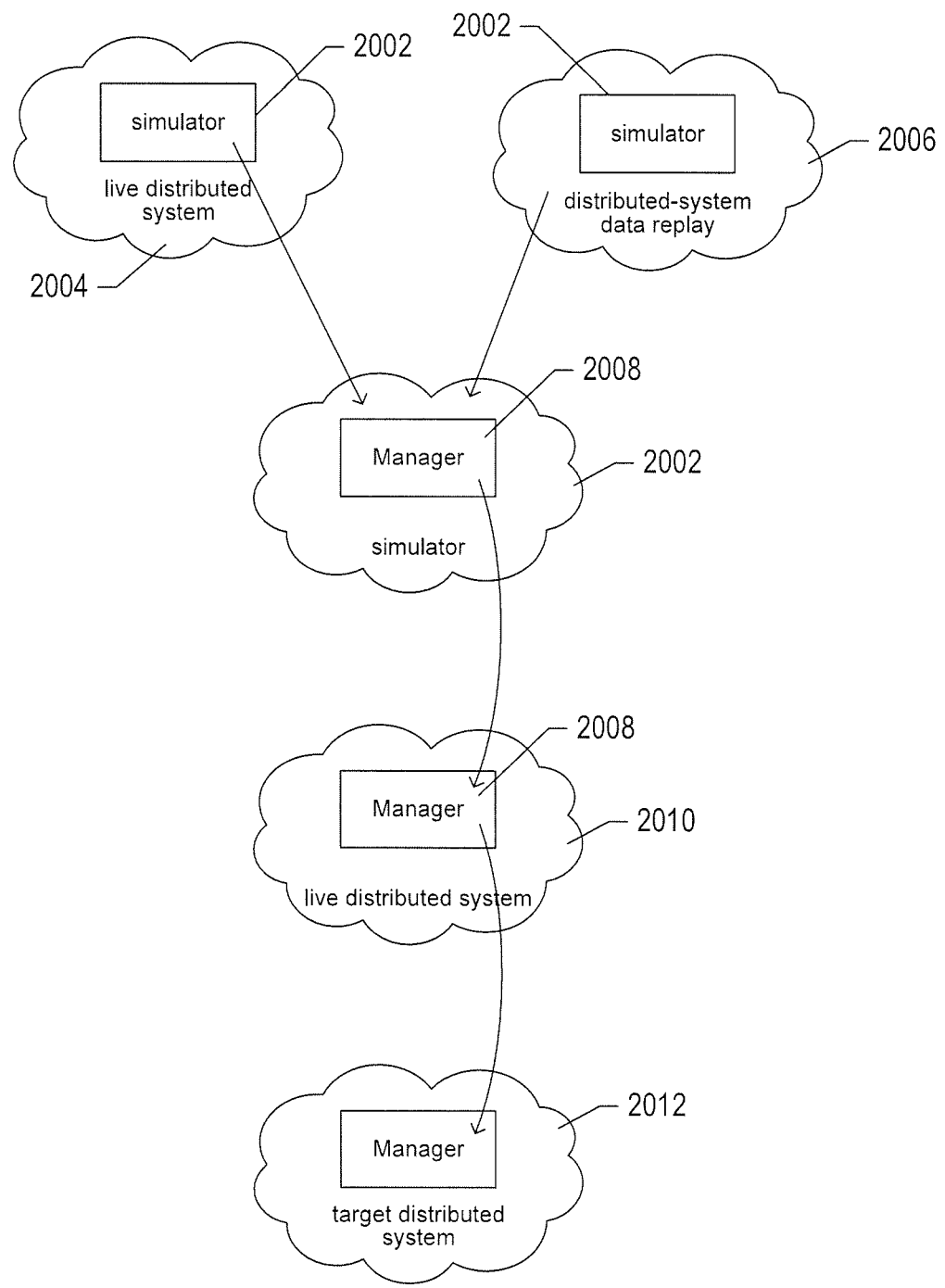
FIG. 20 illustrates one approach to using reinforcement learning to generate and operate an application manager.

FIG. 20 illustrates one approach to using reinforcement learning to generate and operate an application manager. First, reinforcement learning is used to train an environment simulator 2002 by one or both of operating the simulator against a live-distributed-system environment 2004 or against a simulated distributed-system environment that replays archived data generated by a live distributed system to the simulator 2006. Then, a manager 2008 is initially trained by controlling an environment consisting of the simulator 2002. The manager, once trained, is then operated for a time to control an environment comprising a live distributed system 2010. Once the manager has been trained both against the simulator and the live distributed system, it is ready to be deployed to manage an environment 2012 comprising a target live distributed system.

Figure 21:
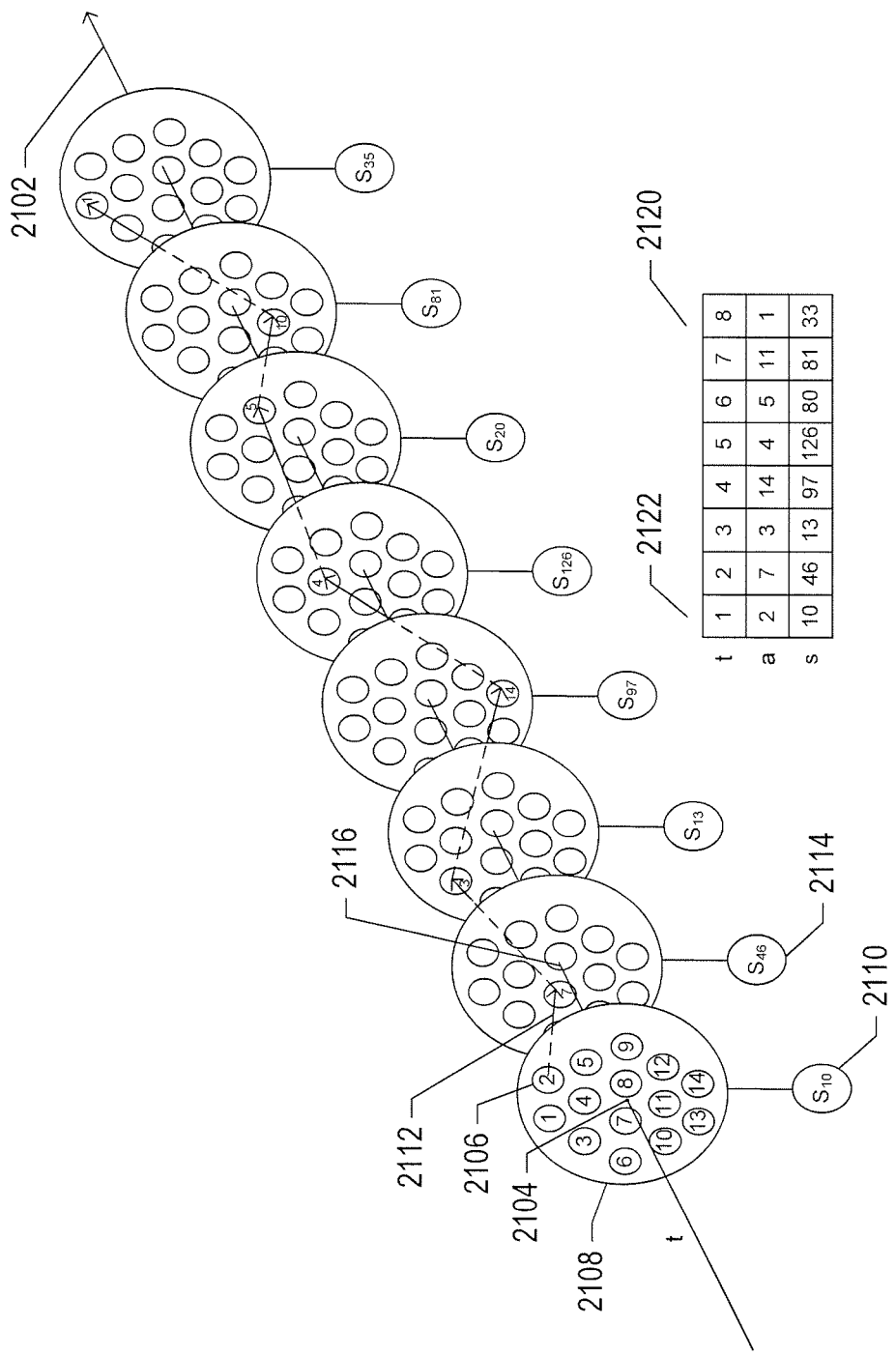
FIG. 21 illustrates an alternative view of a control trajectory comprising a sequence of executed of actions, each accompanied by a managed-environment state change.

FIG. 21 illustrates an alternative view of a control trajectory comprising a sequence of executed of actions, each accompanied by a managed-environment state change. In FIG. 21, arrow 2102 represents a timeline. At the beginning of each of multiple time intervals, a reinforcement-learning-based controller invokes the above-discussed policy π to select a next action from a set of actions A. For example, at the time interval that begins with time 2104, the reinforcement-learning-based controller invokes the policy π to select action 2106, represented as a circle inscribing a numerical label "2," from the set of possible actions A, represented by disk 2108, which contains 14 different possible actions represented by smaller circles that each inscribe a different numeric label. Of course, in real-world situations, there may be hundreds, thousands, tens of thousands, or more different possible actions. The state of the managed-environment, at time 2104, is represented by the circle 2110 inscribing the label "$s_{10}$" indicating the managed-environment state. When the reinforcement-learning-based controller executes the selected action, as represented by arrow 2112, the managed environment transitions to a new state 2114 at a next point in time 2116, where the process is repeated to produce a next action and next state transition. Thus, reinforcement-learning-based control can be thought of as a trajectory through a state/action space. In the simple example of FIG. 21, with both actions and states represented by integers, the state/action space can be imagined as a two-dimensional plane with two orthogonal coordinate axes corresponding to actions and states. A control trajectory can be represented as a table, such as table 2120 shown in FIG. 21, containing three-value columns, such as column 2122, that each includes a time value, an indication of an action, and an indication of the state. Again, as mentioned above, actions and states may be represented by integers, floating-point numbers, and other types of symbols and symbol strings, including character strings.

Figure 22:
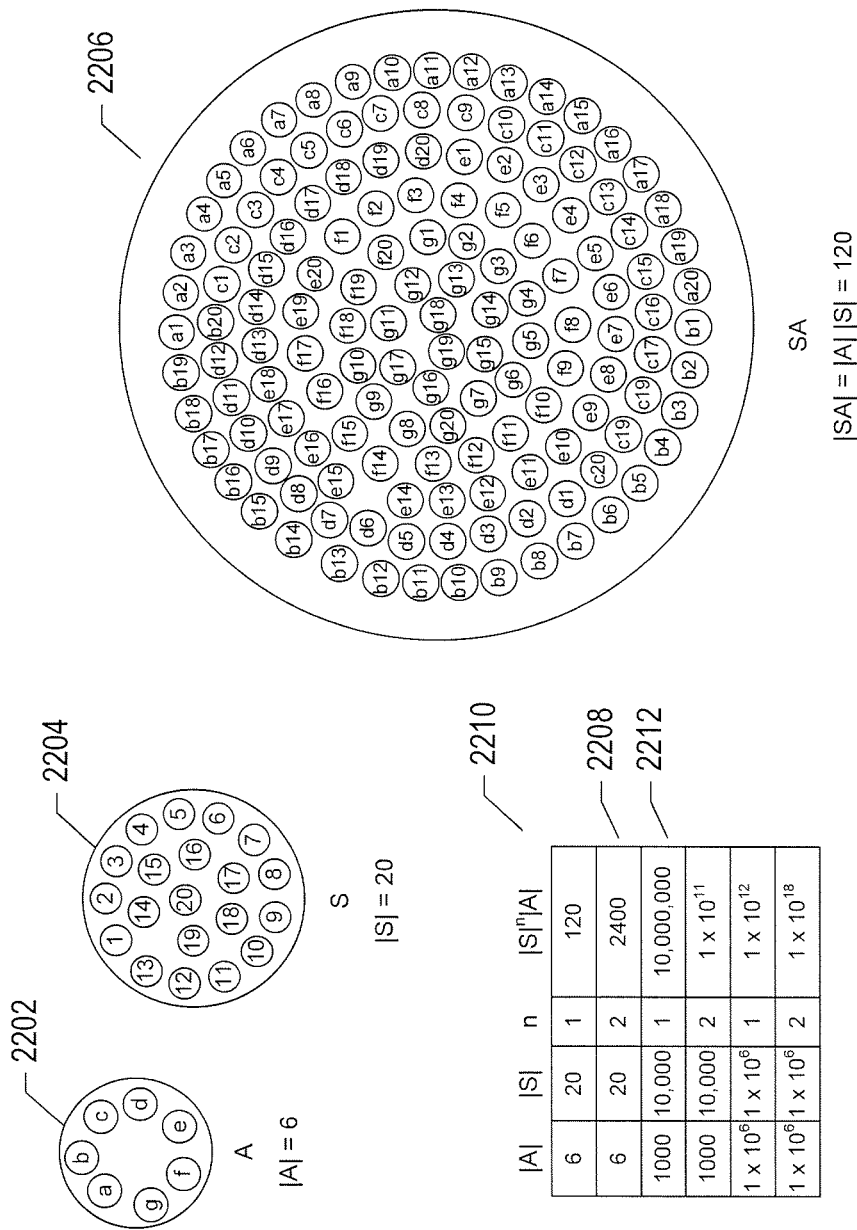
FIG. 22 illustrates the potential sizes of the set of possible state/action pairs.

FIG. 22 illustrates the potential sizes of the set of possible state/action pairs. Using similar illustration conventions as used in FIG. 21, FIG. 22 shows an illustration of a set of actions A 2202, with a cardinality of 6, and a set of states S 2204, with a cardinality of 20. In certain reinforcement-learning-based controller implementations, the policy $\pi$ is based on an assumed Markov model. In a Markov-model based policy, the policy $\pi$ selects a next action based on the current managed-environment state or, when the state is unknown to the reinforcement-learning-based controller, on the belief distribution b for the current managed-environment state, as discussed above. The set of possible state/action pairs SA 2206 can be thought of as the set of all possible current-state/next-action control decisions that can be generated from the set of possible actions A and the set of possible states S. For a Markov-based reinforcement-learning-based controller, the number of possible state/action pairs is equal to the product of the cardinalities of the set of possible actions A and the set of possible states S. In the example shown in FIG. 22, the number of possible state/action pairs is 120, even though there are only 6 possible actions and 20 possible states. Other types of reinforcement-learning-based controllers may consider the current state and the preceding state in order to choose a next action. In this case, each possible action-selection decision can be considered to be a triple comprising an action and two states. In this case, the number of possible control decisions is equal to the product of the cardinality of the set of possible actions A and the square of the cardinality of the set of possible states S. In yet other types of reinforcement-learning-based controllers, the n most recent states, including the current state, of the managed environment are considered when making an action-selection decision. The most general expression for the number of possible control decisions is: $|S|^n|A|$. In the case that n equals 2, there are 2400 possible control decisions for the example shown in FIG. 22, as indicated in the second row 2208 of the table 2210 shown in FIG. 22. Of course, in real-world problem domains, there may be very large numbers of different possible actions and states. As shown in the third row 2212 of the table 2210, when there are 1000 possible actions and 10,000 possible states, a controller using a Markov policy, where n is equal to 1, includes 10,000,000 different possible control decisions. It would take on the order of many months of testing time for a controller, given these figures, to sample each possible control decision. For a controller using a policy based on a model for which n is equal to 2, with 1000 possible actions and 10,000 possible states, there are $10^{11}$ different possible control decisions, which would take many thousands of years for controller to sample once each. Thus, in practical, real-world situations, the number of possible control decisions, which represents the state space that a reinforcement-learning-based control system needs to explore in order to find an optimal policy, can be enormous.

Figure 23A:
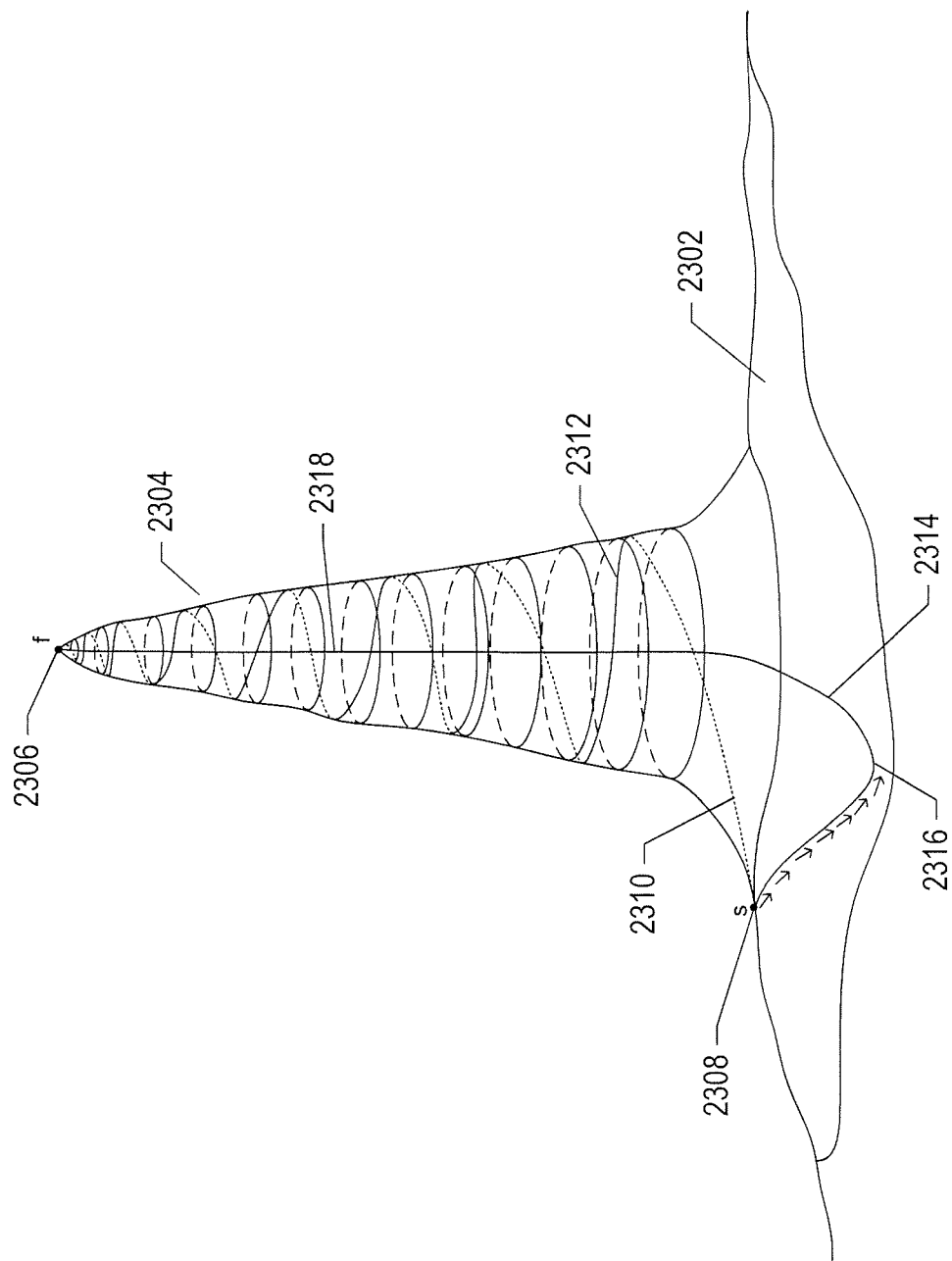
FIGS. 23A-B illustrate the need for state/action exploration by a reinforcement-learning-based controller.
Figure 23B:
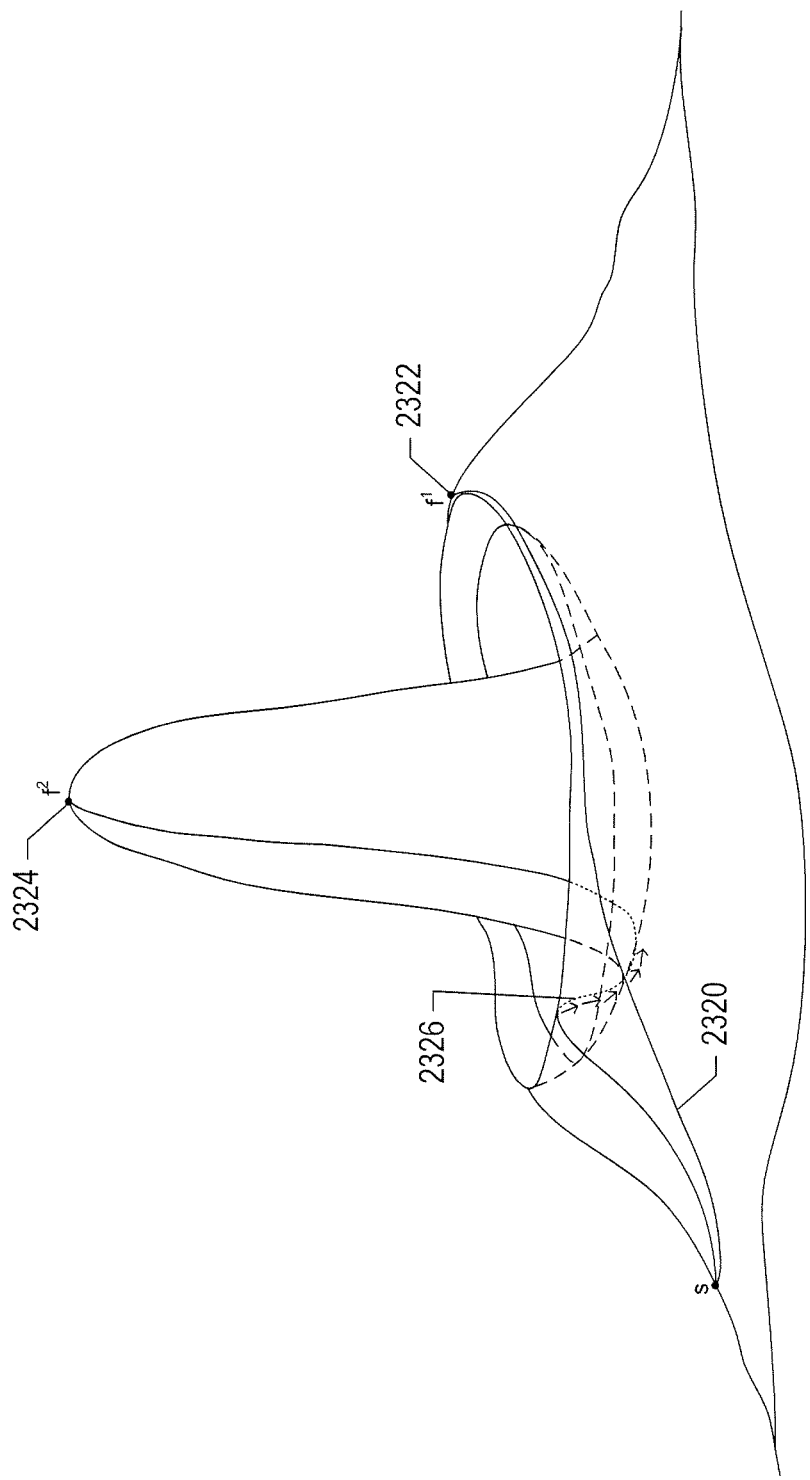

FIGS. 23A-B illustrate the need for state/action exploration by a reinforcement-learning-based controller. FIGS. 23A-B both use the same illustration conventions, next described with reference to FIG. 23A. A portion of a surface 2302 that represents the value or expected reward for state/action pairs includes a rather prominent peak 2304. The point at the summit of the surface 2306 represents a state/action pair that generates the greatest expected reward or value. In static environments, a reinforcement-learning-based controller, over time, seeks to obtain the maximum possible value by reaching point 2306, starting from an initial point 2308. Two different trajectories are shown in FIG. 23A. In non-static environments, the controller seeks to obtain a maximum discounted reward over the most recent window in time. A first trajectory 2310 gradually ascends the peak, initially ascending the back side of the peak, wrapping around to the front side of the peak 2312, and slowly spiraling upward, continuously reaching higher-valued state/action pairs until reaching point 2306. A second trajectory 2314 initially descends to a lower point on the surface 2316 and then directly and steeply ascends 2318 to point 2306. In this case, if the number of actions needed to be taken in order to reach the optimal control decision is a measure of the efficiency of the reinforcement-learning-based controller, the second trajectory 2314 is by far most efficient. However, the second trajectory involves initially carrying out locally suboptimal actions of decreasing value. Of course, this is a somewhat artificial example and illustration, since trajectories would not generally map to quasi-continuous curves and would normally not continuously increase in value, but is intended to show that, unless the reinforcement-learning-based controller carries out a certain amount of state/action space exploration, the reinforcement-learning-based controller cannot discover optimal policies $\pi^*$. In other words, were the reinforcement-learning-based controller to always select the currently most valuable action, and thus follow a greedy policy, the reinforcement-learning-based controller would generally fail to find the most efficient trajectories. As shown in FIG. 23B, in a different example, a greedy policy may allow a reinforcement-learning-based controller to find a trajectory 2320 that results in discovery of a locally optimal state/action pair 2322, but would not allow the reinforcement-learning-based controller to find the global optimal 2324, since all trajectories leading to the global optimum involve a stretch of non-optimal action selections 2326.

Figure 24:
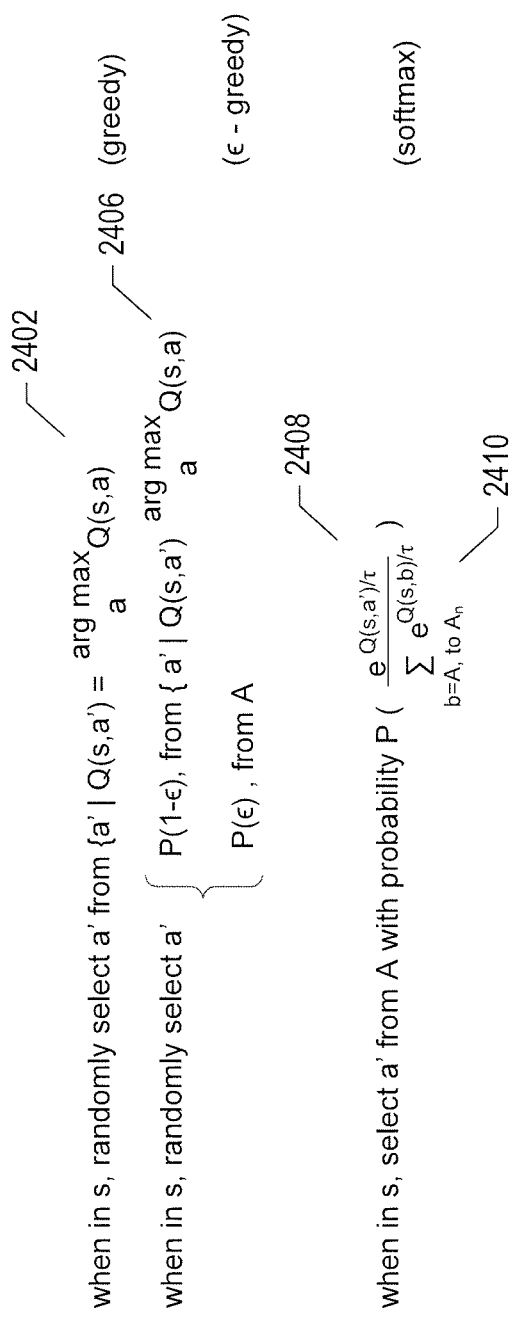
FIG. 24 provides expressions illustrating various types of policies.

FIG. 24 provides expressions illustrating various types of policies. As discussed above, an action-value function $Q^\pi(s, a)$ (1722 in FIG. 17) returns a discounted return for a particular state and action, assuming a current policy $\pi$. A first expression 2402 represents the greedy policy. When the reinforcement-learning-based controller is in a state s, the greedy policy selects a next action a' for which the discounted expected return value is maximum among all possible actions a. As discussed above, the greedy policy generally does not allow a reinforcement-learning-based controller to efficiently find optimally efficient trajectories and optimal state/action pairs, and may not allow a reinforcement-learning-based controller to efficiently find optimally efficient trajectories regardless of the control/learning period during which the reinforcement-learning-based controller operates. The $\epsilon$-greedy policy 2406 selects a next action a' according to the greedy policy with a probability of $1-\epsilon$ and selects a next action randomly from A with a probability of $\epsilon$. In general, $\epsilon$ as a relatively low value, such as 0.1 or 0.01, so that, most of the time, the $\epsilon$-greedy policy selects a next action with the maximum discounted-return value. However, occasionally, the $\epsilon$-greedy policy randomly selects a next action, so that, over time, the reinforcement-learning-based controller tries a wide variety of the many possible control decisions. By exploring the state/action space, the reinforcement-learning-based controller gradually learns to assign accurate discounted expected-return values to the various different state/action pairs so that the policy can be optimized. The SoftMax policy 2408 randomly selects a next action a' from A with the probability 2410, which corresponds to the Boltzmann distribution used in statistical mechanics. When the temperature factor τ has a low value, approaching 0, the probabilities of selection very dramatically with the estimated discounted return for the state/action, but when the temperature factor τ has a large value, the differences in the probabilities of selection diminish. Like the ε-greedy policy, the SoftMax policy favors selection of an action with the greatest estimated return value, but occasionally selects non-optimal actions in order to facilitate state/action space exploration.

FIG. 25 illustrates one implementation of a reinforcement-learning-based application manager that employs state/action-space exploration via the above-discussed ε-greedy policy. As indicated by expression 2502, the policy employed by this implementation, π(b), selects a next action a' with maximum estimated value with a probability of 1−ε and randomly selects the next action a' from A the probability of ε, and is therefore an ε-greedy policy. In this implementation, as indicated by expression 2504, there is no explicit policy-update function, unlike the case in the implementation illustrated in FIG. 18. Instead, a state/action-value update function $U_Q(\ )$ 2506 is employed. This function updates the state/action value Q(b,a) by adding to the state/action value Q(b,a) the product of a learning rate α 2508 and an estimate of the most recent return value 2510, where r is the reward received from executing action a, γ is the above-discussed discount rate, and b' and a' are the updated belief distribution and new selected action following execution of action a. Diagram 2512 illustrates the application manager logic that replaces the logic 1820 previously shown in FIG. 18. After execution of an action a, the universe returns the resulting reward r and observation vector o via path 2514. If the termination condition has occurred, as determined in step 2516, the application manager terminates, in step 2518. Otherwise, in step 2520, the application manager generates an updated belief distribution b' using the belief-distribution-update function that, in turn, considers the returned observation vector o returned by the managed environment, and, in step 2522, applies the policy (2502) to generate a next action a' using the updated belief distribution b'. Then, in step 2524, the application manager updates the discounted return value for the preceding action and belief distribution using the state/action-value update function 2506. In step 2526, the application manager stores the updated belief distribution as the current belief distribution and then returns the next action a' to the managed environment via path 2528.

As discussed above, for even modest numbers of possible actions and states, the state/action space can be enormous. In many real-world scenarios, there may be enormous numbers of possible actions and states, as a result of which the state/action space may be many tens of orders of magnitude larger than could possibly be practically exhaustively searched by exploration policies. Furthermore, there would be insufficient memory in even the largest distributed computing systems for maintaining current discounted values for each possible state/action pair. For these reasons, as indicated by expression 2530, the reinforcement-learning-based controller uses a parameterized function $Q_t(s,a)$ that returns, at any point in time t, an estimate of the value of the state/action pair s/a. The function $Q_t(s,a)$ is a function of n parameters contained in a parameter vector $θ_t$. As indicated by expression 2532, the action-value update function $U_Q(\ )$ updates the parameter values via a gradient-descent method rather than updating a stored action value Q(b,a). Thus, at time t+1, the previous parameter vector $θ_t$ is updated to parameter vector $θ_{t+1}$.

Control and Learning Processes of Reinforcement-Learning-Based Application Managers In the preceding subsection, reinforcement-learning-based application managers and aspects of the implementations of reinforcement-learning-based application managers were discussed with reference to FIGS. 11A-25. This discussion introduced observation vectors o, actions a, states, and belief distributions. Further details are provided in the current subsection.

Figure 26:
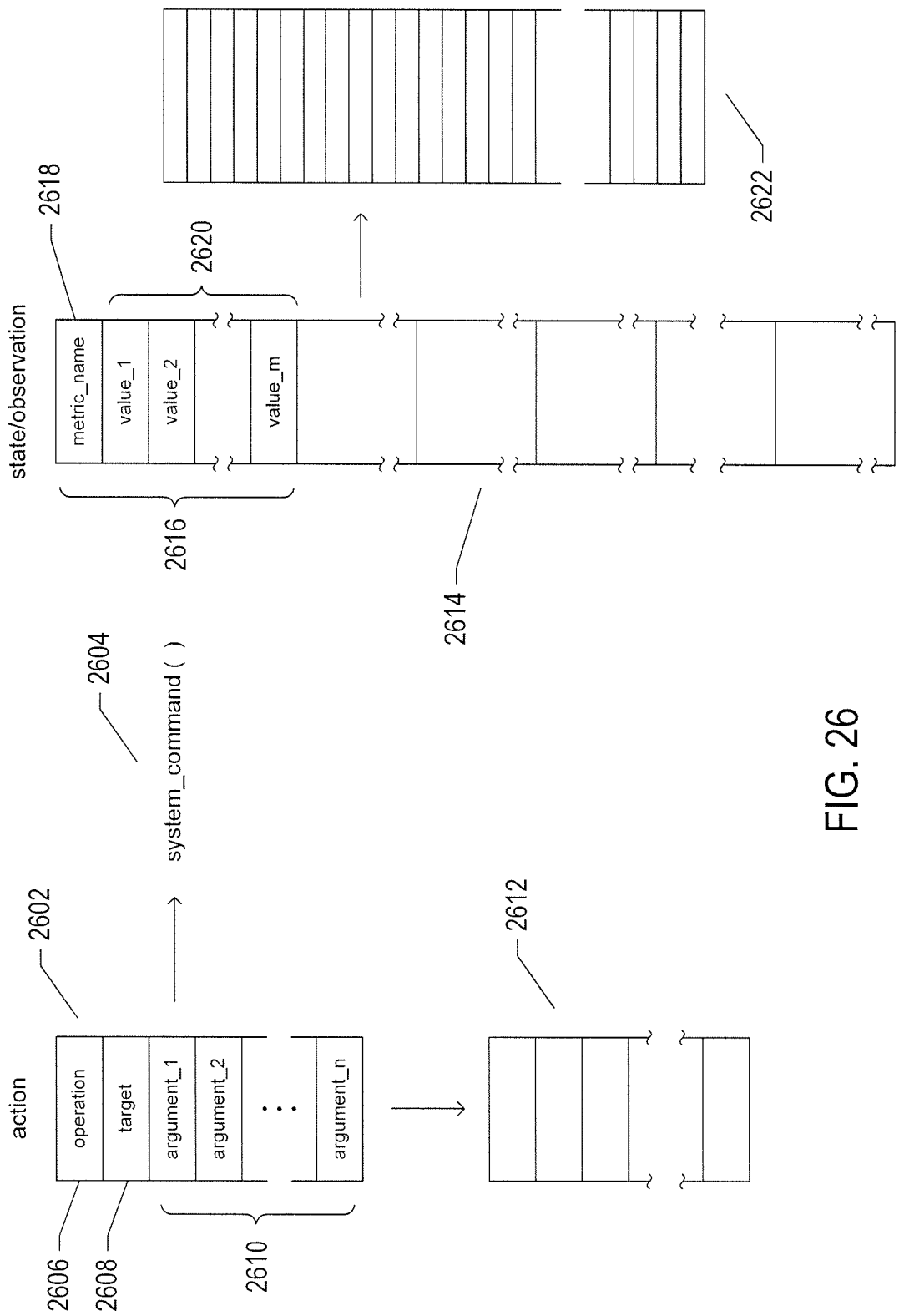
FIG. 26 illustrates actions, states, and observations.

FIG. 26 illustrates actions, states, and observations. In many implementations, an action is a vector of values 2602 that is more or less directly translated into a system command 2604 that is issued by the resource-learning-based application manager to a computational entity within the managed environment, such as a virtual-data-center management server, server computer, data-storage appliance, or other such computational entities. There may be various different numbers and types of values for different types of actions, which may be represented by action templates, but, for purposes of explaining action tags and metric tags, a generalized action format can be considered to comprise an indication of the operation or command, often referred to as an "op code," 2606, an indication of the type of target computational entity for the command 2608, and a number n of arguments 2610, including a target indication, were arguments are commonly floating-point and integer values. As mentioned above, although the values in the action vector 2602 have particular meanings within the managed environment, the above-described reinforcement-learning-based application manager essentially considers actions to be undifferentiated vectors of numeric values 2612 that, in the aggregate, represent a numeric indication of a specific action. Similarly, states vectors and observation vectors, in many implementations, comprise vectors of metrics 2614, where each metric, such as the first metric in the vector 2616, may include a metric name 2618 and m numeric values 2620 that represents the value of the metric. There may be many different types of metrics represented in an observation or state vector. For example, one metric may be the number of current external users or clients who are accessing a distributed application. Another metric might be the total cost, per hour, for the leased virtual machines currently allocated for executing a distributed application. As mentioned above, although the metrics and metric values have particular meanings within the managed environment, the above-described reinforcement-learning-based application manager essentially considers state and observation vectors to be undifferentiated vectors of numeric values 2622. In essence, the above-described reinforcement-learning-based application manager may consider action vectors, state vectors, and observation vectors to each be a single numeric value within a range of numeric values that can be expressed by the number of bits used to encode all of the values in the vectors.

Figure 27A:
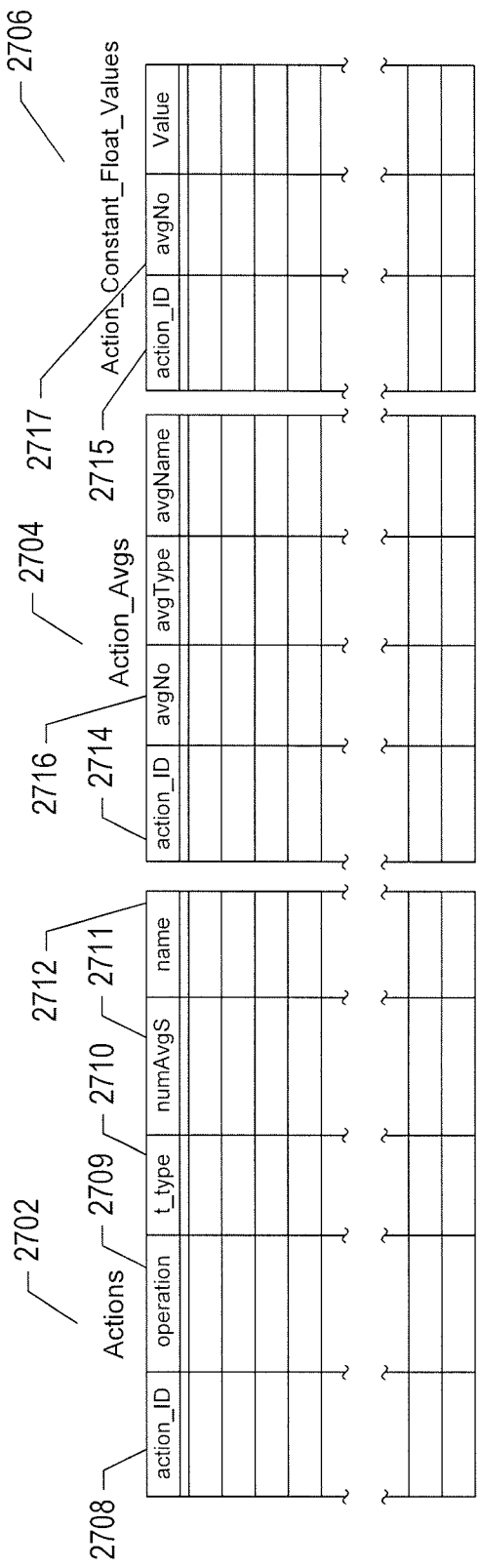

FIGS. 27A-B illustrate one example of a data representation of actions and metrics. This example uses a relational database for storing actions and metrics. Actions are stored in relational-database tables including the table Actions 2702, the table Action_Args 2704, and a variety of additional tables such as the table Action_Constant_Float_Values 2706. Each entry, or role, in the table Actions 2702 represents a different action. Each entry includes the fields: (1) action_ID 2708, a unique identifier for the action; (2) operation 2709, the opcode discussed above; (3) t_type 2710, the type of computational-entity target for the action;

(4) numArgs 2711, the number of arguments included in the action; and (5) name 2712, the name of the action. The table Action_Args 2704 stores information about each of the arguments of each of the actions. Each entry in the table Action_Args is associated with an entry in the table Actions 2702 through a common value stored in the field action_ID 2708 and 2714 of both entries. The actual argument values are stored in additional tables, such as table 2706, which stores the floating-point-valued-argument values, with a particular entry in this table associated with an entry in the table Action_Args by the common values in the common two fields action_ID 2714 and 2715 and argNo 2716 and 2717. A similar scheme is used to store metric values in the table Metrics 2720, the table Metric_Fields 2722, and additional field-value tables, such as the action-values table 2706, discussed above.

FIG. 27B illustrates various representational forms of a particular action. The action "addVirtualServer" may be texturally expressed by expression 2730 in the general context of application management. The action is stored in the above-discussed relational-database tables as indicated by the table entries 2732. When the various pieces of information are extracted from the relational database tables, they are used to compose the action vector 2734, and this action vector is directly translated into the system command 2736. A reinforcement-learning-based application manager may more concisely represent the action by expression 2738.

FIG. 28 provides numerous expressions that indicate a generic implementation of several different types of value functions and an ϵ-greedy policy. There are many different types of value functions and policies that may be used in implementing a reinforcement-learning-based application manager. The value functions and policies shown in FIG. 28 are provided to illustrate the nature of value functions and policies. Certain of this information has been discussed using different expressions in the previous subsection. A state-value function $V^\pi(s)$ for a particular policy $\pi$ is represented by expression 2802. This function receives a state vector, as input, and returns a value for the state s, where the value is the expected sum of returns that will accrue during subsequent control of the managed environment, with future values discounted by a discount rate $\gamma$. Expression 2804 provides a similar representation of a state/action-value function $Q^\pi(s,a)$, where the value of state/action pair is the expected cumulative return following execution of the action a when the managed environment is in the state s. Expression 2805 shows the meaning of the state-transition probability $P_{ss'}^a$, which is the probability that, when the managed environment is in the state s and the managed environment executes the action a, the managed environment will transition to the state s'. Expression 2806 shows the meaning of the expected reward $R_{ss'}^a$, which is the expected reward returned by the managed environment, when the managed environment is in the state s, following execution of the action a. Expression 2807 is an expression of an estimate of the state-value function $V^\pi(s)$, expressed as the weighted sum of all of the sums of the return values and discounted subsequent state values for all the possible actions taken from state s. This estimate provides a basis for iterative approaches to determining the state-value function for any particular policy. The three expressions 2808 illustrate the meaning of the optimal state-value and state/action-value functions $V^*(s)$ and $Q^*(s,a)$, which are the state-value functions and state/action-value functions for the optimal control policies. Finally, expressions 2809 again illustrates an example ϵ-greedy policy, which selects, as a next action, the action corresponding to the state/action pair having the highest value according to the state/action-value function in most cases, but occasionally selects the next action a randomly from the set of possible actions A.

Figure 29B:
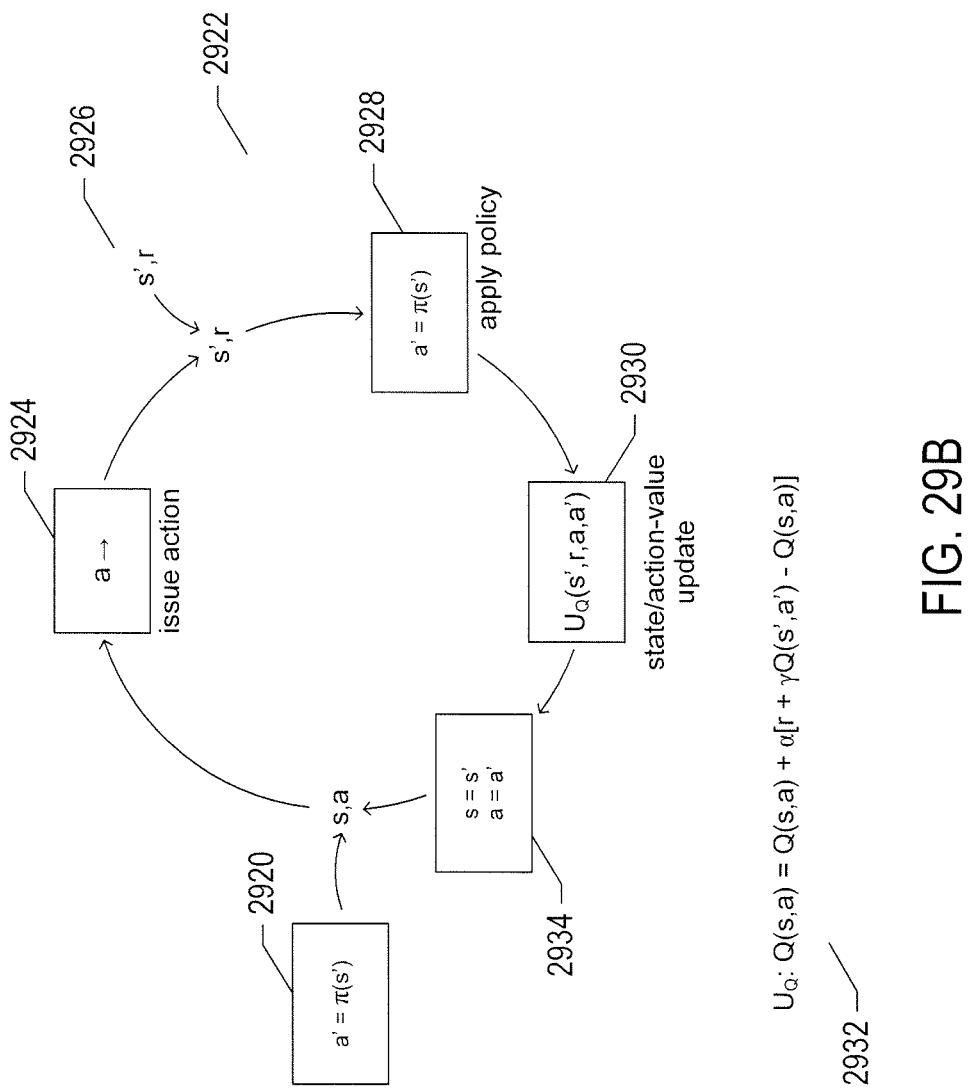

FIGS. 29A-B illustrate two different types of reinforcement-learning control-and-learning schemes that provide bases for two different reinforcement-learning-based application managers. The first implementation, shown in FIG. 29A, employs a ϵ-greedy policy, which uses a current state-value function $V_C$ and a deterministic set of state transitions that indicate a next state given the current state and a next action, to, most often, select a next action that will result in a transition to the highest valued next state while learning a next state-value function but, occasionally, randomly select the next action. The process begins with step 2902, where an initial state, an initial current state-value function $V_C$, and a newly initialized next state-value function $V_N$ are provided to begin a next learning cycle. A learning cycle comprises iterative execution of a control cycle comprising action selection 2906 followed by action execution and input of a next state and reward 2907, in turn followed by update of the next state-value function 2908, which, as it is updated, diverges towards a next state-value function $\overline{V}_N$. Step 2910 represents the end of the current learning cycle. In step 2912, the current state-value function is changed to the next state-value function $\overline{V}_N$, and, in step 2914, a new next state-value function $V_N$ is initialized, after which the process continues with step 2902. Expression 2916 shows a representative state-value function update, where the new value for a current state in which an action has been executed is equal to the sum of the old value of the current state and the product of a learning rate α and the sum of the reward returned from executing the action and the difference between the discounted value of the next state and the old value of the current state. By using the ϵ-greedy policy, the reinforcement-based-learning application manager continues to explore the state/action space, as discussed above in the preceding section of this document. This implementation might be useful when it is expected that the values of states change over time but when a constant policy is desired over periods of time corresponding to the time allocated to each learning cycle.

FIG. 29B illustrates a second reinforcement-learning-based application-manager implementation. In this implementation, an initial action is produced from an initial state, in step 2920, and then a continuous control-and-learning cycle 2922 executes. In step 2924, the next action is executed. In response, the managed environment returns a new state and reward 2926 and then, in step 2928, a new action is generated based on the new state. In step 2930, the state/action-value function Q is updated using an update function $U_Q$ represented by expression 2932. Then, in step 2934, the current state in action are set to the new state received from the managed environment 2926 and the new action generated from that new state in step 2928. This second implementation continuously updates the state/action-value function and continues to explore the state/action space by virtue of using the ϵ-greedy policy.

Figure 30:
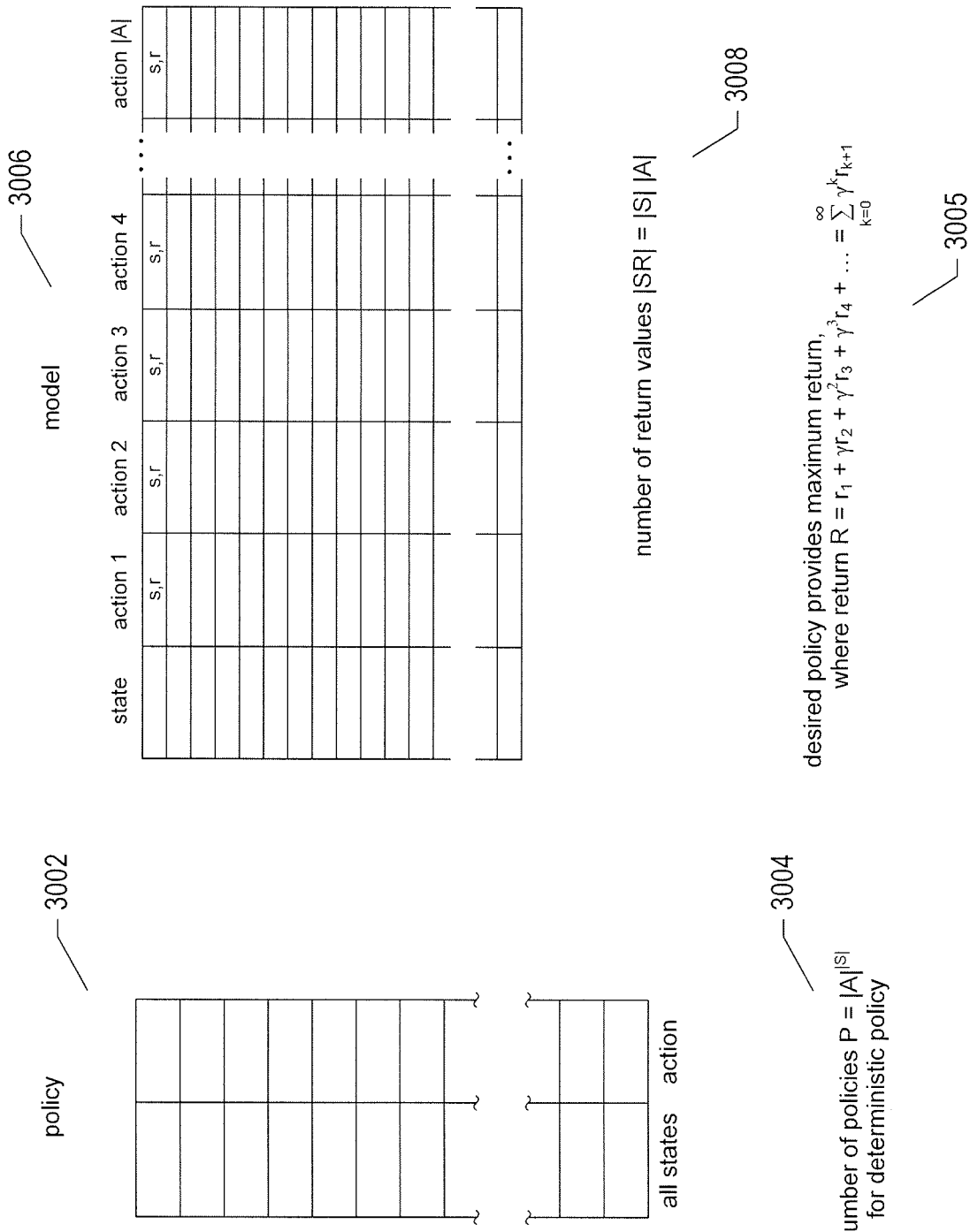
FIG. 30 illustrates, in a somewhat different fashion than in the previous subsection, the enormous computational overheads associated with large state/action spaces.

FIG. 30 illustrates, in a somewhat different fashion than in the previous subsection, the enormous computational overheads associated with large state/action spaces. A deterministic policy 3002 can be thought of as a table of state/action pairs for all possible states. Whatever the current state, an appropriate next action can be obtained from the table. As discussed in the previous subsection, more complex policies may involve probabilistic action generation, in which case each state would be associated with a next-action distribution, which is even more computationally complex. But even for simple deterministic policy, the total number of possible policies is equal to the number of actions raised to the power of the number of states 3004. As discussed in the previous subsection, there may be extremely large numbers of possible states and actions in a real-world reinforcement-learning-based management system and associated managed environment. Thus, if reinforcement learning is viewed as a means for simultaneously control in determining an optimal policy, the optimal-policy search may be extremely computationally demanding or, in many cases, computationally impossible. As shown in expression 3005, the optimal policy provides a maximum return, which may be estimated based on some finite number of returns, but generally involves an enormous number of additions, and this total return estimation must be carried out for every possible policy in order to find an optimal policy, at least in a naïve optimal-policy search. A model 3006 can also be thought of as a table. In the case of the model, the table contains new-state/reward to pairs for each possible action for each state, so that the number of new-state/reward pairs in the model is equal to the product of the number of states and the number of actions 3008. Learning a model can therefore be an enormously computationally complex task. The number of different possible models is far greater than the number of possible control policies. Clearly, the computational complexities of searching for an optimal policy and developing models can be significantly reduced were it possible to reduce one or both of the number of states and the number of actions that need to be considered. In particular, reducing the number of states may have a profoundly beneficial effect on optimal-policy searching, based on expression 3004. The currently disclosed action tags and metric tags provide the basis for many different methods for decreasing the computational complexities involved in reinforcement learning by constraining the number of states and the number of actions that may need to be considered while learning a policy.

Neural Networks

Figure 31:
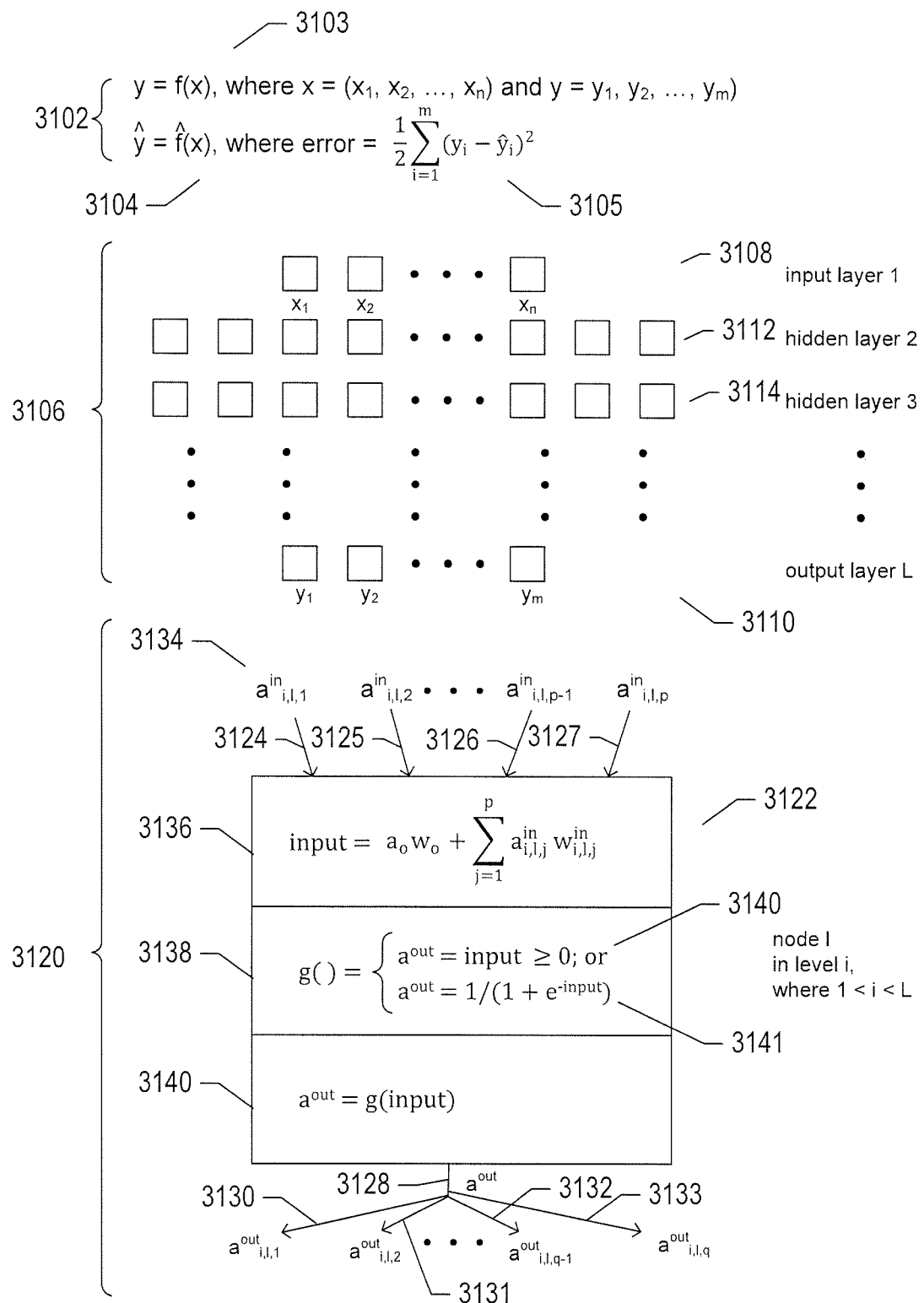
FIG. 31 illustrates the fundamental components of a feed-forward neural network.

FIG. 31 illustrates the fundamental components of a feed-forward neural network. Equations 3102 mathematically represents ideal operation of a neural network as a function $f(x)$. The function receives an input vector x and outputs a corresponding output vector y 3103. For example, an input vector may be a digital image represented by a two-dimensional array of pixel values in an electronic document or may be an ordered set of numeric or alphanumeric values. Similarly, the output vector may be, for example, an altered digital image, an ordered set of one or more numeric or alphanumeric values, an electronic document, one or more numeric values. The initial expression 3103 represents the ideal operation of the neural network. In other words, the output vectors y represent the ideal, or desired, output for corresponding input vector x. However, in actual operation, a physically implemented neural network $\hat{f}(x)$, as represented by expressions 3104, returns a physically generated output vector ŷ that may differ from the ideal or desired output vector y. As shown in the second expression 3105 within expressions 3104, an output vector produced by the physically implemented neural network is associated with an error or loss value. A common error or loss value is the square of the distance between the two points represented by the ideal output vector and the output vector produced by the neural network. To simplify back-propagation computations, discussed below, the square of the distance is often divided by 2. As further discussed below, the distance between the two points represented by the ideal output vector and the output vector produced by the neural network, with optional scaling, may also be used as the error or loss. A neural network is trained using a training dataset comprising input-vector/ideal-output-vector pairs, generally obtained by human or human-assisted assignment of ideal-output vectors to selected input vectors. The ideal-output vectors in the training dataset are often referred to as "labels." During training, the error associated with each output vector, produced by the neural network in response to input to the neural network of a training-dataset input vector, is used to adjust internal weights within the neural network in order to minimize the error or loss. Thus, the accuracy and reliability of a trained neural network is highly dependent on the accuracy and completeness of the training dataset.

As shown in the middle portion 3106 of FIG. 31, a feed-forward neural network generally consists of layers of nodes, including an input layer 3108, and output layer 3110, and one or more hidden layers 3112 and 3114. These layers can be numerically labeled 1, 2, 3, . . . , L, as shown in FIG. 31. In general, the input layer contains a node for each element of the input vector and the output layer contains one node for each element of the output vector. The input layer and/or output layer may have one or more nodes. In the following discussion, the nodes of a first level with a numeric label lower in value than that of a second layer are referred to as being higher-level nodes with respect to the nodes of the second layer. The input-layer nodes are thus the highest-level nodes. The nodes are interconnected to form a graph.

The lower portion of FIG. 31 (3120 in FIG. 31) illustrates a feed-forward neural-network node. The neural-network node 3122 receives inputs 3124-3127 from one or more next-higher-level nodes and generates an output 3128 that is distributed to one or more next-lower-level nodes 3130-3133. The inputs and outputs are referred to as "activations," represented by superscripted-and-subscripted symbols "a" in FIG. 31, such as the activation symbol 3134. An input component 3136 within a node collects the input activations and generates a weighted sum of these input activations to which a weighted internal activation $a_0$ is added. An activation component 3138 within the node is represented by a function g( ), referred to as an "activation function," that is used in an output component 3140 of the node to generate the output activation of the node based on the input collected by the input component 3136. The neural-network node 3122 represents a generic hidden-layer node. Input-layer nodes lack the input component 3136 and each receive a single input value representing an element of an input vector. Output-component nodes output a single value representing an element of the output vector. The values of the weights used to generate the cumulative input by the input component 3136 are determined by training, as previously mentioned. In general, the input, outputs, and activation function are predetermined and constant, although, in certain types of neural networks, these may also be at least partly adjustable parameters. In FIG. 31, two different possible activation functions are indicated by expressions 3140 and 3141. The latter expression represents a sigmoidal relationship between input and output that is commonly used in neural networks and other types of machine-learning systems.

Figure 32:
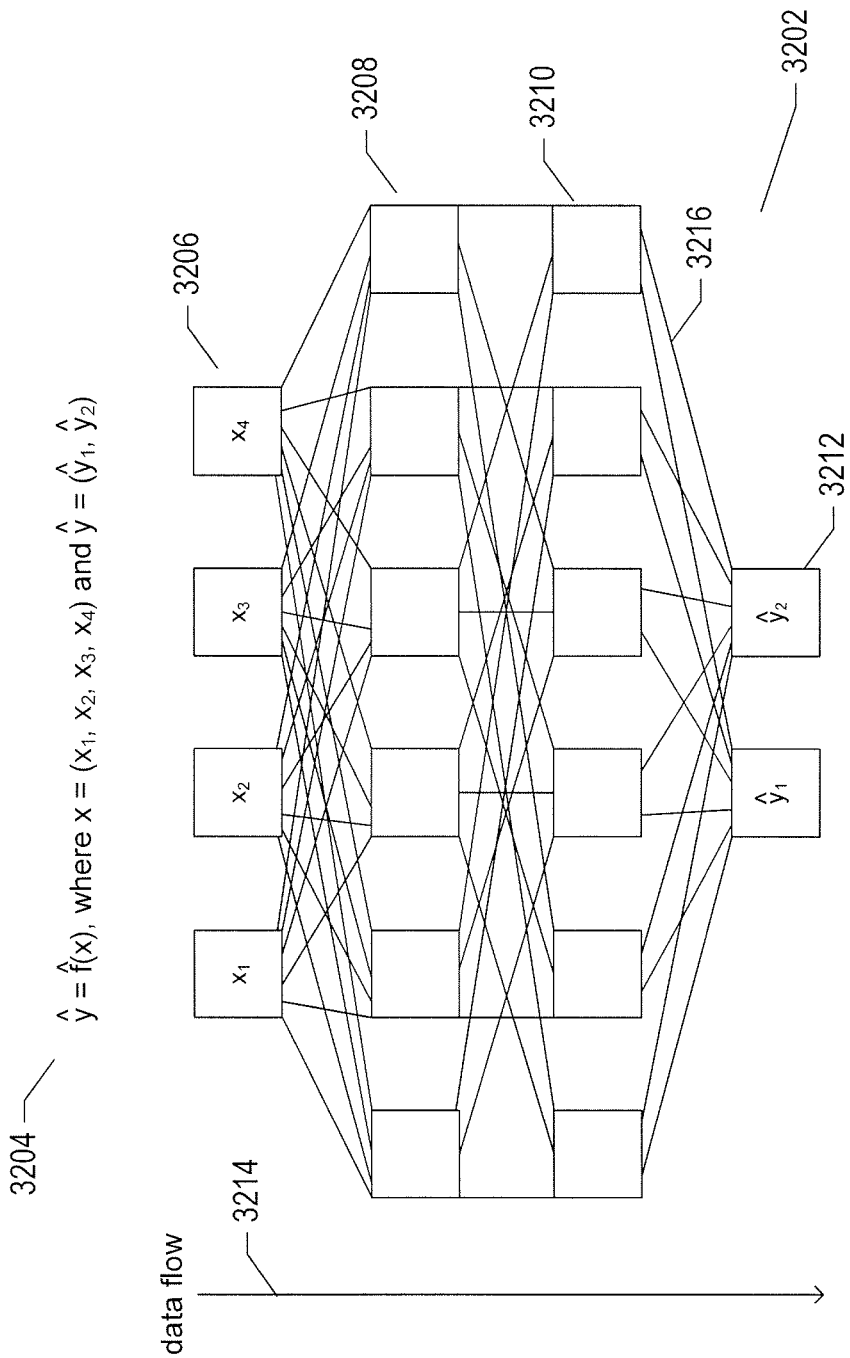
FIG. 32 illustrates a small, example feed-forward neural network.

FIG. 32 illustrates a small, example feed-forward neural network. The example neural network 3202 is mathematically represented by expression 3204. It includes an input layer of four nodes 3206, a first hidden layer 3208 of six nodes, a second hidden layer 3210 of six nodes, and an output layer 3212 of two nodes. As indicated by directed arrow 3214, data input to the input-layer nodes 3206 flows downward through the neural network to produce the final values output by the output nodes in the output layer 3212. The line segments, such as line segment 3216, interconnecting the nodes in the neural network 3202 indicate communications paths along which activations are transmitted from higher-level nodes to lower-level nodes. In the example feed-forward neural network, the nodes of the input layer 3206 are fully connected to the nodes of the first hidden layer 3208, but the nodes of the first hidden layer 3208 are only sparsely connected with the nodes of the second hidden layer 3210. Various different types of neural networks may use different numbers of layers, different numbers of nodes in each of the layers, and different patterns of connections between the nodes of each layer to the nodes in preceding and succeeding layers.

FIG. 33 provides a concise pseudocode illustration of the implementation of a simple feed-forward neural network. Three initial type definitions 3302 provide types for layers of nodes, pointers to activation functions, and pointers to nodes. The class node 3304 represents a neural-network node. Each node includes the following data members: (1) output 3306, the output activation value for the node; (2) g 3307, a pointer to the activation function for the node; (3) weights 3308, the weights associated with the inputs; and (4) inputs 3309, pointers to the higher-level nodes from which the node receives activations. Each node provides an activate member function 3310 that generates the activation for the node, which is stored in the data member output, and a pair of member functions 3312 for setting and getting the value stored in the data member output. The class neuralNet 3314 represents an entire neural network. The neural network includes data members that store the number of layers 3316 and a vector of node-vector layers 3318, each node-vector layer representing a layer of nodes within the neural network. The single member function $f$ 3320 of the class neuralNet generates an output vector y for an input vector x. An implementation of the member function activate for the node class is next provided 3322. This corresponds to the expression shown for the input component 3136 in FIG. 31. Finally, an implementation for the member function $f$ 3324 of the neuralNet class is provided. In a first for-loop 3326, an element of the input vector is input to each of the input-layer nodes. In a pair of nested for-loops 3327, the activate function for each hidden-layer and output-layer node in the neural network is called, starting from the highest hidden layer and proceeding layer-by-layer to the output layer. In a final for-loop 3328, the activation values of the output-layer nodes are collected into the output vector y.

FIG. 34, using the same illustration conventions as used in FIG. 32, illustrates back propagation of errors through the neural network during training. As indicated by directed arrow 3402, the error-based weight adjustment flows upward from the output-layer nodes 3212 to the highest-level hidden-layer nodes 3208. For the example neural network 3202, the error, or loss, is computed according to expression 3404. This loss is propagated upward through the connections between nodes in a process that proceeds in an opposite direction from the direction of activation transmission during generation of the output vector from the input vector. The back-propagation process determines, for each activation passed from one node to another, the value of the partial differential of the error, or loss, with respect to the weight associated with the activation. This value is then used to adjust the weight in order to minimize the error, or loss.

FIGS. 35A-B show the details of the weight-adjustment calculations carried out during back propagation. An expression for the total error, or loss, E with respect to an input-vector/label pair within a training dataset is obtained in a first set of expressions 3502, which is one half the squared distance between the points in a multidimensional space represented by the ideal output and the output vector generated by the neural network. The partial differential of the total error E with respect to a particular weight $w_{i,j}$ for the $j^{th}$ input of an output node i is obtained by the set of expressions 3504. In these expressions, the partial differential operator is propagated rightward through the expression for the total error E. An expression for the derivative of the activation function with respect to the input x produced by the input component of a node is obtained by the set of expressions 3506. This allows for generation of a simplified expression for the partial derivative of the total energy E with respect to the weight associated with the $j^{th}$ input of the $i^{th}$ output node 3508. The weight adjustment based on the total error E is provided by expression 3510, in which r has a real value in the range [0-1] that represents a learning rate, $a_j$ is the activation received through input j by node i, and $\Delta_i$ is the product of parenthesized terms, which include $a_i$ and $y_i$, in the first expression in expressions 3508 that multiplies $a_j$. FIG. 35B provides a derivation of the weight adjustment for the hidden-layer nodes above the output layer. It should be noted that the computational overhead for calculating the weights for each next highest layer of nodes increases geometrically, as indicated by the increasing number of subscripts for the $\Delta$ multipliers in the weight-adjustment expressions.

Figure 36A:
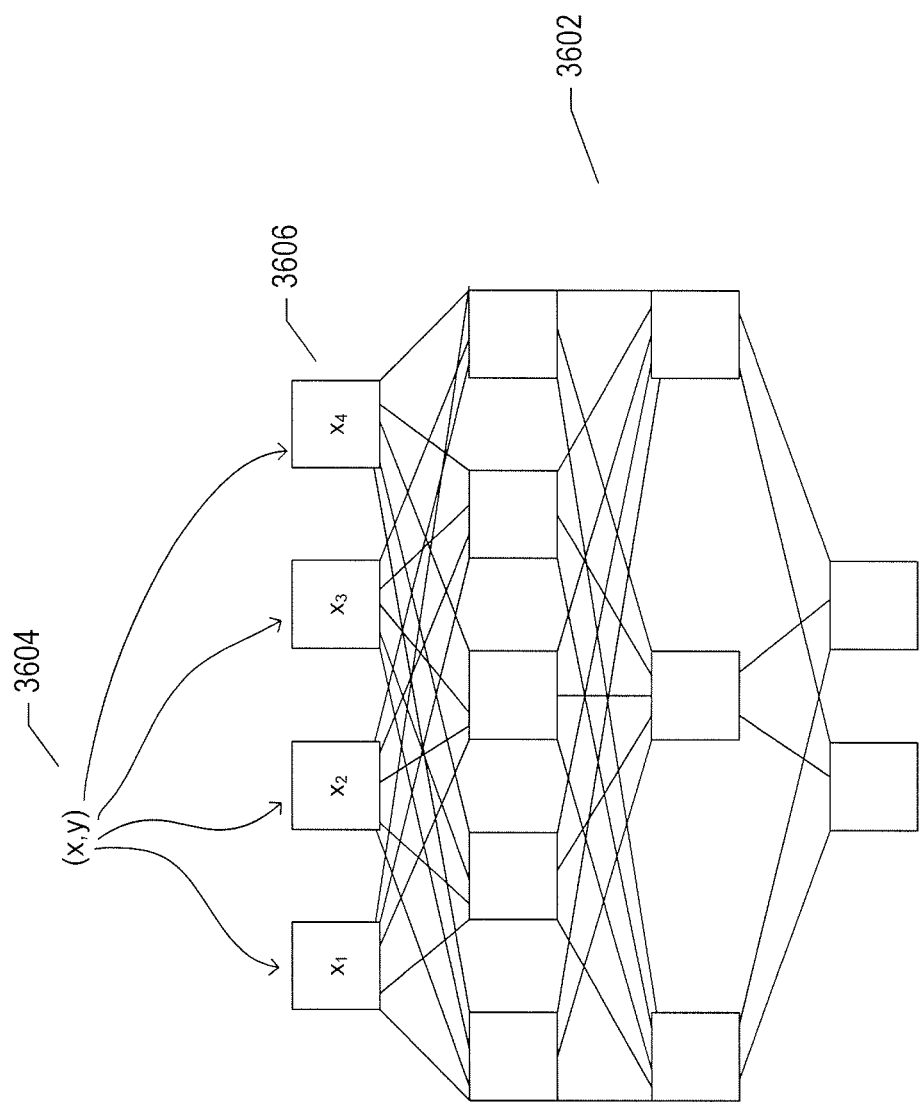
Figure 36B:
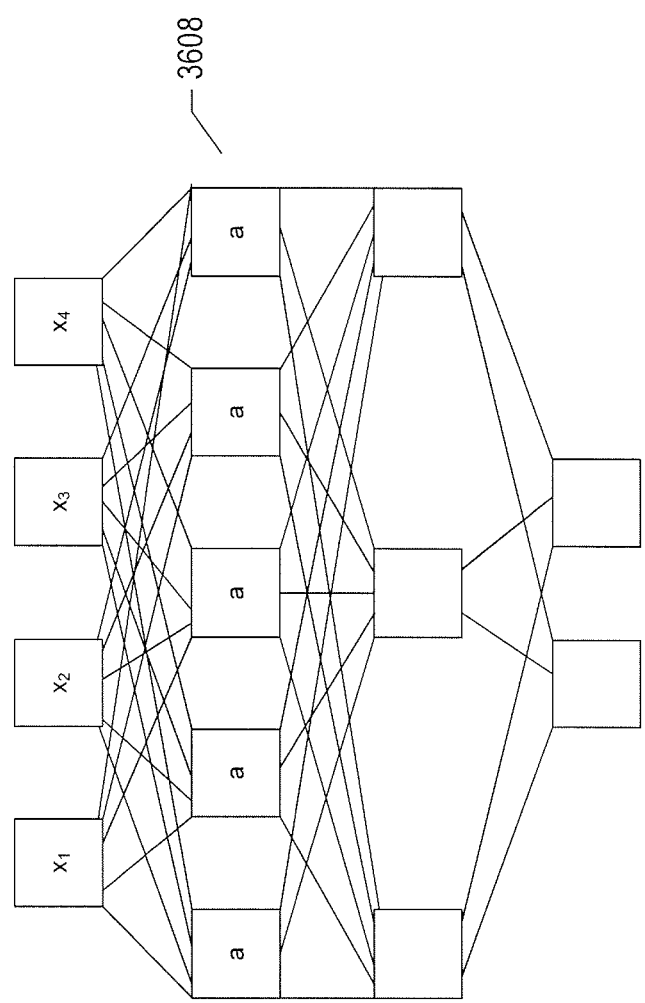
Figure 36D:
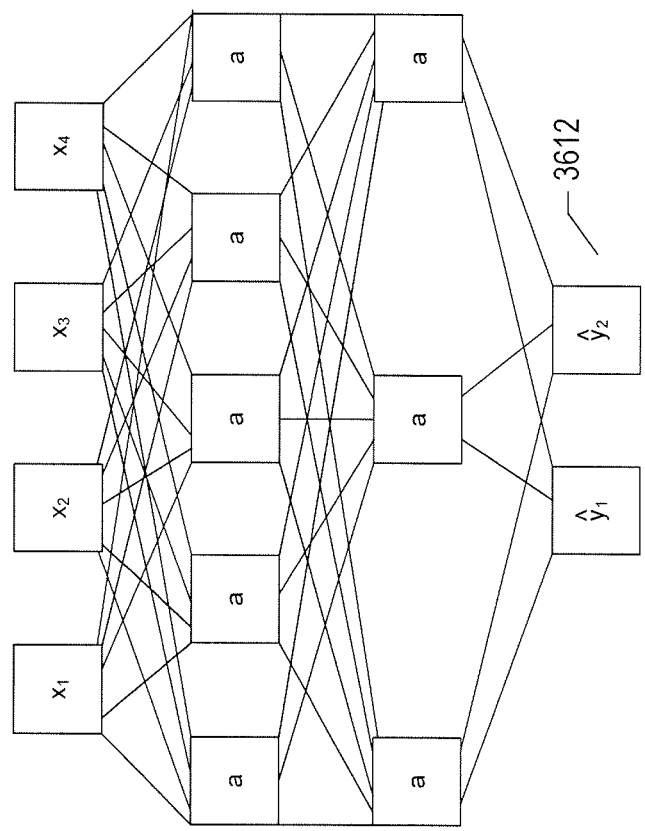
Figure 36E:
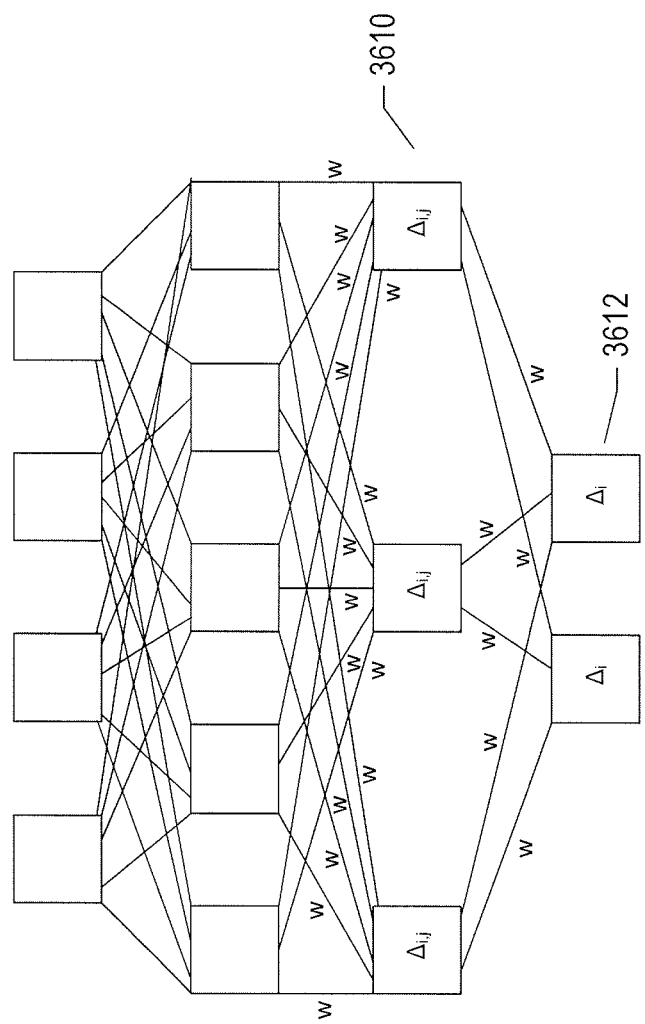
Figure 36F:
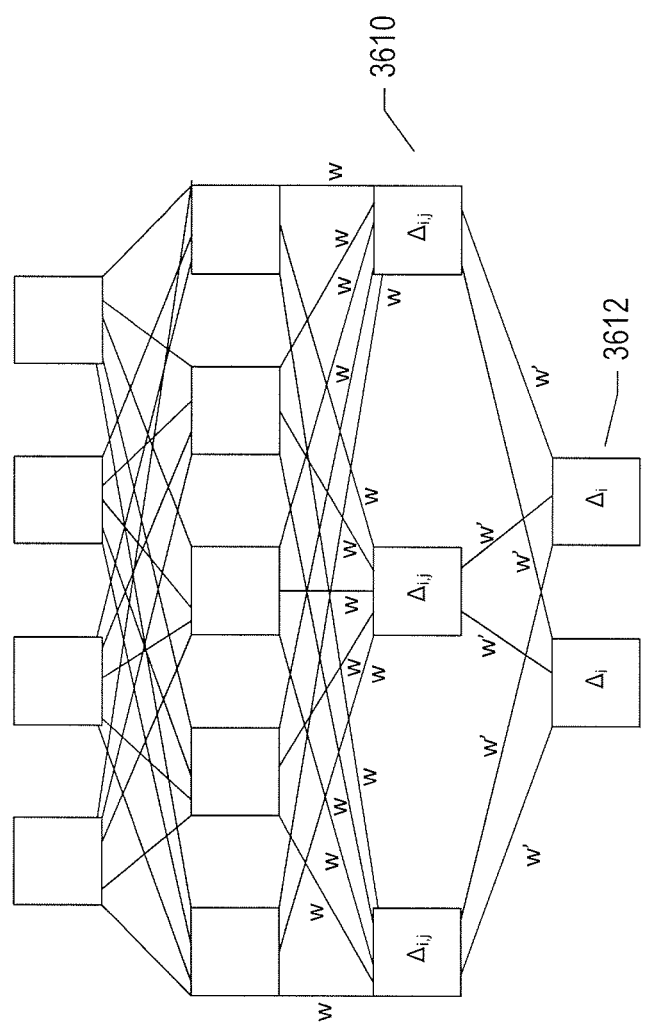
Figure 36G:
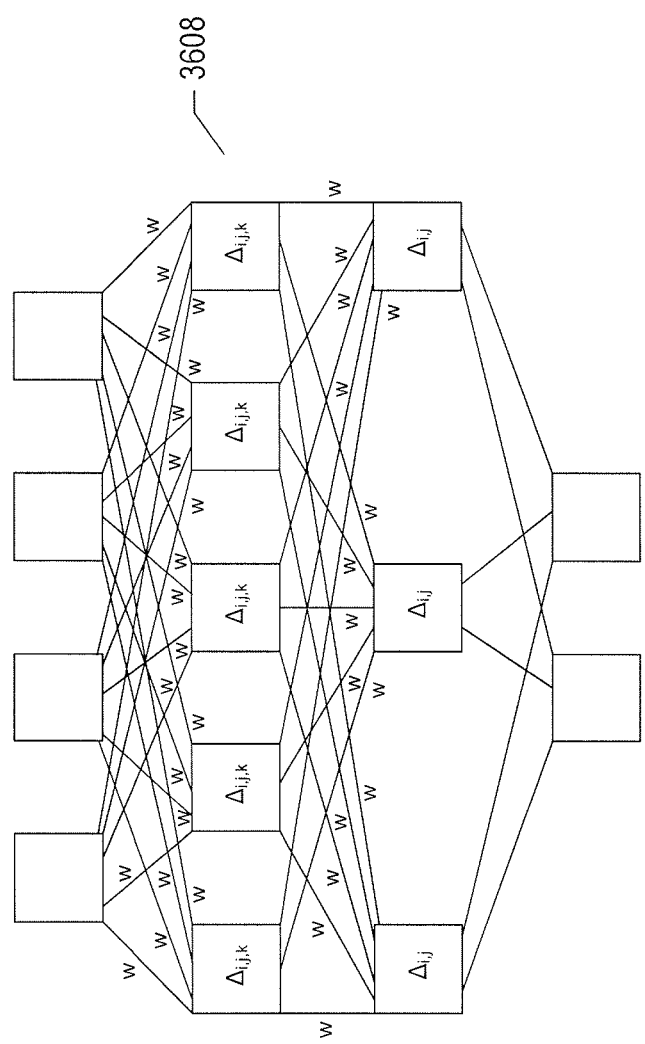
Figure 36H:
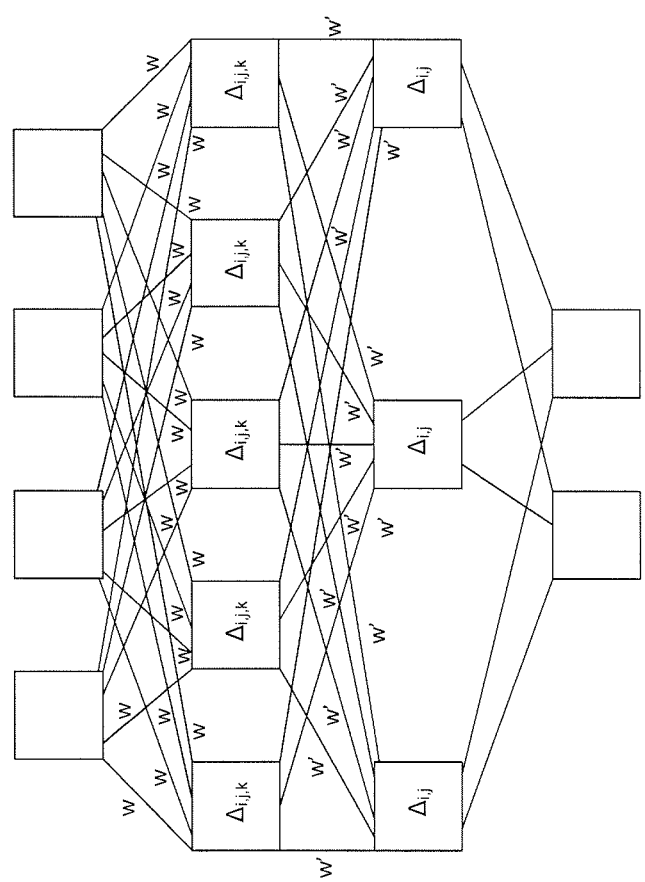
Figure 36I:
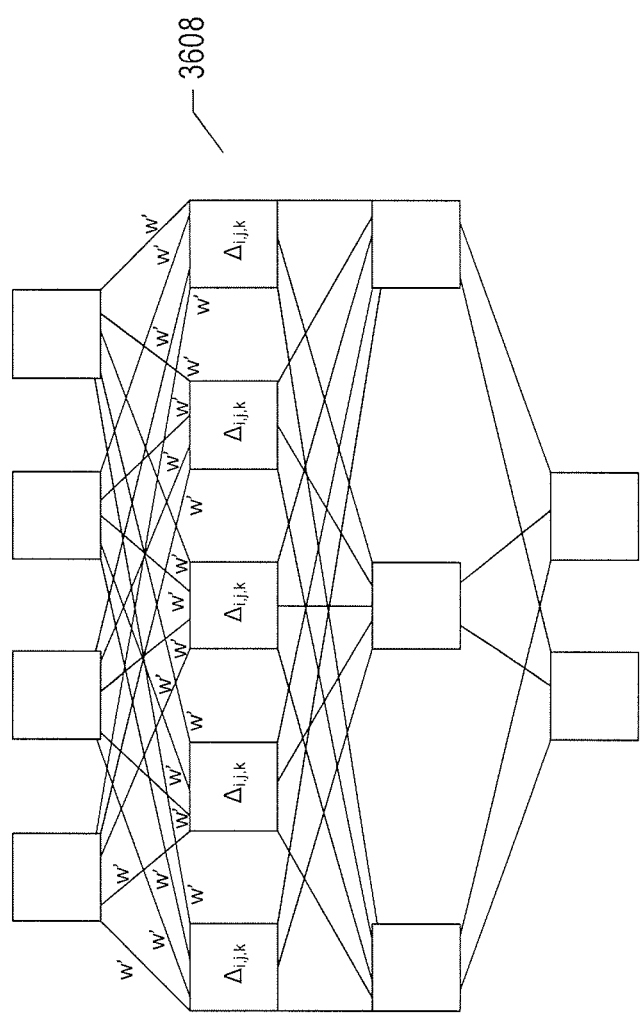

FIGS. 36A-I illustrate one iteration of the neural-network-training process. A simple, example neural-network 3602, illustrated using the same illustration conventions shown in FIGS. 32 and 34, is used in each of FIGS. 36A-I. In FIG. 36A, the input vector of an input-vector/label pair 3604 is input to the input-layer nodes 3606. In FIG. 36B, each node in the highest-level hidden layer 3608 generates an activation via a weighted sum of input activations transmitted to the node from the input nodes. In FIG. 36C, each node in the second hidden layer 3610 generate an activation via a weighted sum of the activations input to them from nodes of the higher-level hidden layer 3608. In FIG. 36D, the output-layer nodes 3612 generate activations from the activations received from the second hidden layer nodes. The activations generated by the output-layer nodes correspond to the values of the elements of the output vector ŷ. In FIG. 36E, multipliers $\Delta_i$ of the activations for weight adjustments are computed by the output-layer nodes 3612 and multipliers $\Delta_{i,j}$ of the activations for weight adjustments are computed by the second layer of hidden nodes 3610. In FIG. 36F, the weights w associated with inputs to the output-layer nodes are adjusted to new weights w'. This is done after the multipliers of the activations to the weight adjustments of the second hidden-node layer are generated, since generation of those multipliers depends on the original weights associated with inputs to the output-layer nodes. In FIG. 36G, the multipliers of the activations for the weight adjustments of the highest-level hidden-layer nodes 3608 are generated. In FIG. 36H, the weights for the activations passed between the two hidden layers are adjusted. Finally, in FIG. 36I, the weights for the connections between the input nodes and the highest-level hidden-layer nodes 3608 are adjusted.

Figure 37:
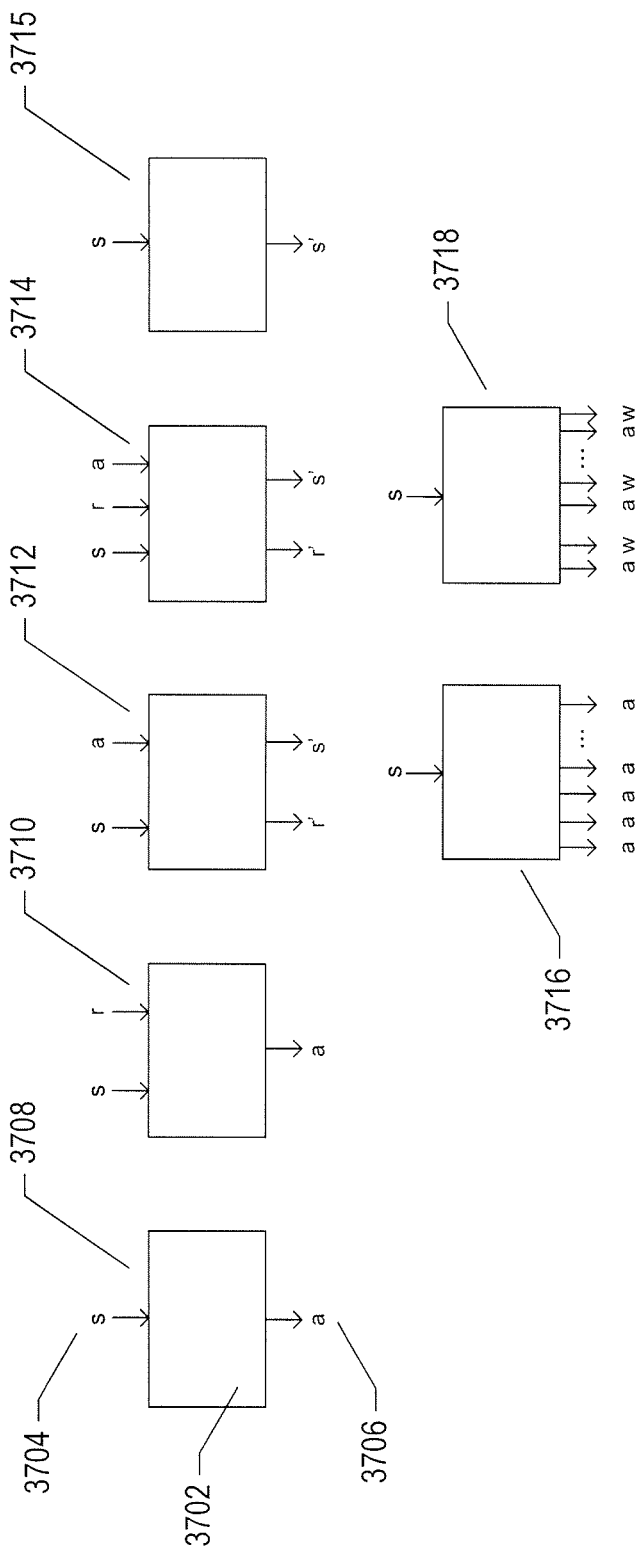
FIG. 37 illustrates various types of models that may be used by an automated reinforcement-learning-based application manager.

Currently Disclosed Computationally Efficient Automated Reinforcement-Learning-Based Application Manager FIG. 37 illustrates various types of models that may be used by an automated reinforcement-learning-based application manager. In FIG. 37, the models are represented by rectangles, such as rectangle 3702. Inputs are shown above the model, such as input 3704, and outputs are shown below the model, such as output 3706. The models may be implemented in many different ways using various types of artificial-intelligence and machine-learning technologies. For example, a model may be implemented as a neural network. Simple, tabular models may be adequate for certain purposes and far more complex models, including complex simulation models, may be needed for other purposes. Model 3708 receives a state vector as input and returns an appropriate action for issuance by a reinforcement-learning-based application manager. This model might be used as or within a control policy. Model 3710 receives both a state vector and a previous reward and returns a next action. This model may also be used as a control policy, and may be continuously improved based on the input rewards. Model 3712 receives a state vector and an action and returns a predicted next reward and next state. This type of predictive model may be used in various ways by a reinforcement-learning-based application manager, including simulating control of a managed environment in order to improve state-value and state/action-value functions, and may also be used by a control policy in addition to state-value and state/action-value information in order to select a next action. Models 3714-15 are also predictive models. Model 3716 receives a state vector as input and outputs a set of actions. This model may be used by a control policy, in conjunction with additional state-value and state/action-value information, to select a next action. The related model 3718 outputs weights for each of the actions, to facilitate choosing one of the actions as a next action.

Figure 38:
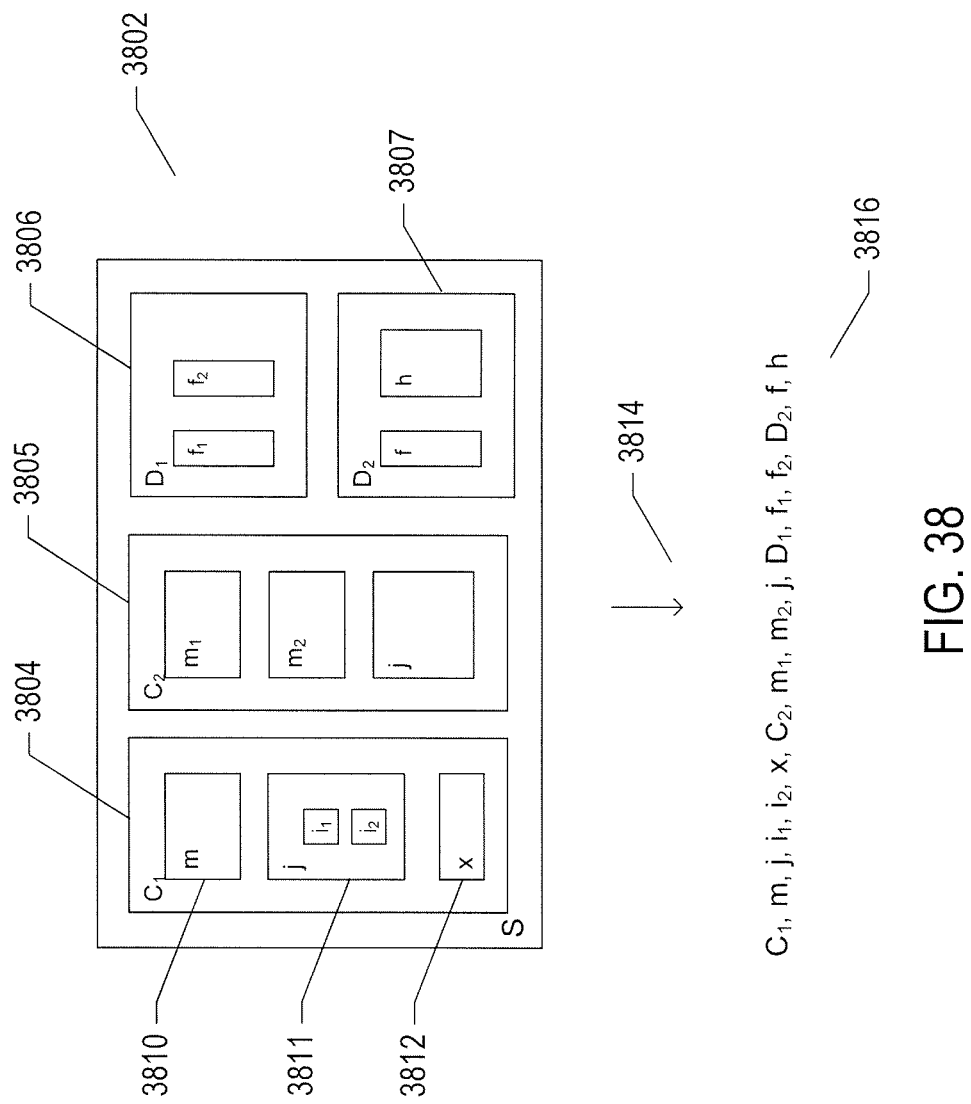
FIG. 38 illustrates generation of a linear sequence of components from a system that includes hierarchically ordered components.

FIG. 38 illustrates generation of a linear sequence of components from a system that includes hierarchically ordered components. The system 3802 is represented by a large rectangle that encloses four first-, or highest-, level components 3804-3807. Each of these first-level components includes second-level, internal components, such as second-level components 3810-3812 within first-level components 3804. The second-level components may include third-level components, and so on. A linearization process, represented by arrow 3814, can be carried out in order to generate a linear, canonical ordered list of the components 3816. Similar systems can then be represented by similar ordered sequences of components. In certain implementations of automated reinforcement-learning-based application managers, a linearization process is used to generate canonical lists of system components to which actions can be directed. In some implementations, an action issued by an automated reinforcement-learning-based application manager may be a compositive action, the components of which are translated into system commands issued to one or more system components. In other implementations, each action issued by the automated reinforcement-learning-based application manager is translated into a single system command. In either case, the linearization process is used, as next discussed, to produce an ordered set of components that represent inputs to a model.

Figure 39:
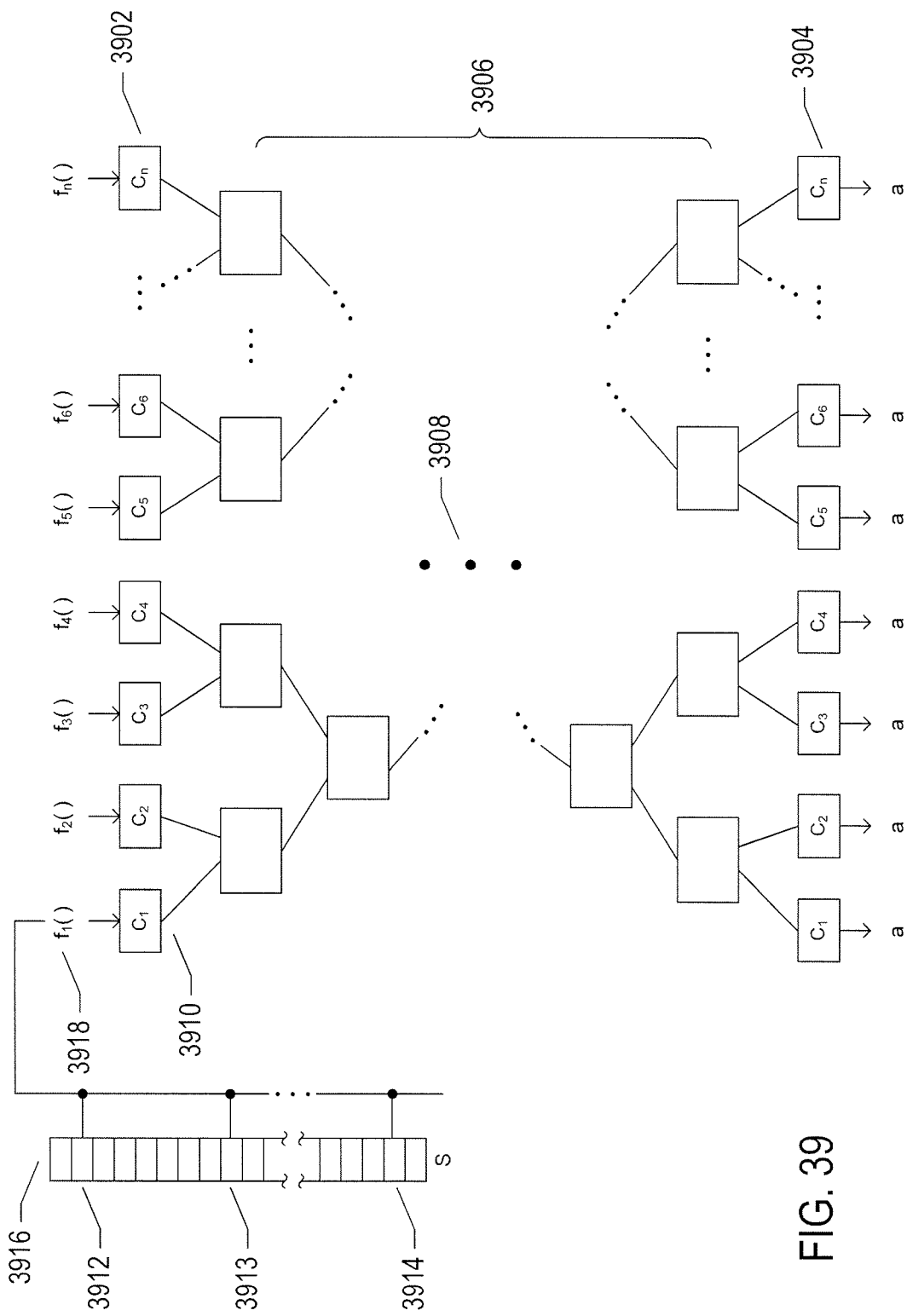
FIG. 39 illustrates a neural-network-based model as an example of a model used by an automated reinforcement-learning-based application manager.

FIG. 39 illustrates a neural-network-based model as an example of a model used by an automated reinforcement-learning-based application manager. The neural network includes a layer of component-associated input nodes 3902, a layer of component-associated output nodes 3904, and multiple layers of hidden nodes 3906. Ellipses are used, such as ellipsis 3908, to indicate that there may be many additional input and output nodes and many additional hidden nodes. Each of the input nodes, such as input node 3910, is associated with a particular component of the managed system. The input nodes are ordered according to the above-discussed linearization process. The example model is used by a control policy to generate a next action based on a current state vector or belief vector. In this model, the metrics related to a particular component within the state vector, such as metrics 3912-3914 within state vector 3916, are collected by an input function associated with a component, such as input function 3918 associated with component 3910, to generate an input to the component. The metric values collected by the additional input functions for the additional input nodes in FIG. 39 are not shown, for the sake of simplicity of illustration. The output nodes, such as output node 3920, output an action 3922 that may be issued to the component corresponding to the output node. Although, in FIG. 39 and FIGS. 41A-C, discussed below, the model has the same number of input and output nodes, this if often not the case for real-world models used in automated reinforcement-learning-based application managers. The control policy may select one or more of the suggested actions emitted by the model as the next action or as components of the next action, depending on the implementation. The model is learned, over time, by training. In certain implementations, the training may occur off-line, asynchronous to control of the managed environment, while in other implementations, the training may occur concurrently with control. In certain cases, where, in the component hierarchy, a set of sub-components is commonly present in system component configurations, the sub-components may be coalesced into a single node, to reduce the number of nodes and connections between nodes. In addition, many models include a sub-model node for each component.

FIG. 40 illustrates four different systems managed by a reinforcement-learning-based application manager and an equivalents table. In the upper portion of FIG. 40, linearized component lists for four systems 4002 are provided. Identical components in the lists are identically labeled. Asterisks and plus symbols are used to indicate non-identical components. For example, component 4004 in the first system is identical to component 4006 in the second system, but component 4008 in the third system is different from component 4010 in the fourth system and is also different from component 4012 in the second system. As mentioned below, the currently disclosed methods and systems do not depend on all systems having the same numbers of components. A model, such as the exemplary model discussed above with reference to FIG. 39, may have been learned, through extensive operation of an automated reinforcement-learning-based application manager, to facilitate control of system 1. Systems 2, 3, and 4 are currently under development and have not yet begun to be controlled by automated reinforcement-learning-based application managers. It would be desirable to use the model learned during operation of system 1 as the initial model for the remaining 3 systems under development, in order to significantly short-circuit the model-training process, which can involve very large computational overheads. Even though the models in the different systems may diverge, over time, it is greatly more efficient to start with an already-trained initial model when such a model is available. Unfortunately, in the general case, the weights learned, through training, associated with nodes of a neural network have not been considered to be transportable to neural networks used in other systems. However, for models, such as the exemplary model shown in FIG. 39, where the input and output nodes are associated with a linearized canonical list of components, as discussed above with reference to FIG. 38, it is possible to achieve significant increases in computational efficiency for newly instantiated automated reinforcement-learning-based application managers by partly or completely reusing a model trained during operation of an automated reinforcement-learning-based application manager that controls a different system. This is made possible by the node structure of such models as well as by use of an equivalents table. An equivalents table 4020 may indicate pairs of components that differ from one another but that have been found to be equivalent for purposes of model reuse. For example, entry 4022 in equivalents table 4020 indicates that, although component 4024 in the third system differs from component 4026 in the fourth system, the difference between the components is unimportant with respect to model reuse. As an example, these components may be two different versions of a physical server with different data-storage capacities and processor bandwidths, but for a particular distributed application, it may have been found that these differences are not significant with respect to control of the distributed application by an automated reinforcement-learning-based application manager.

Figure 41A:
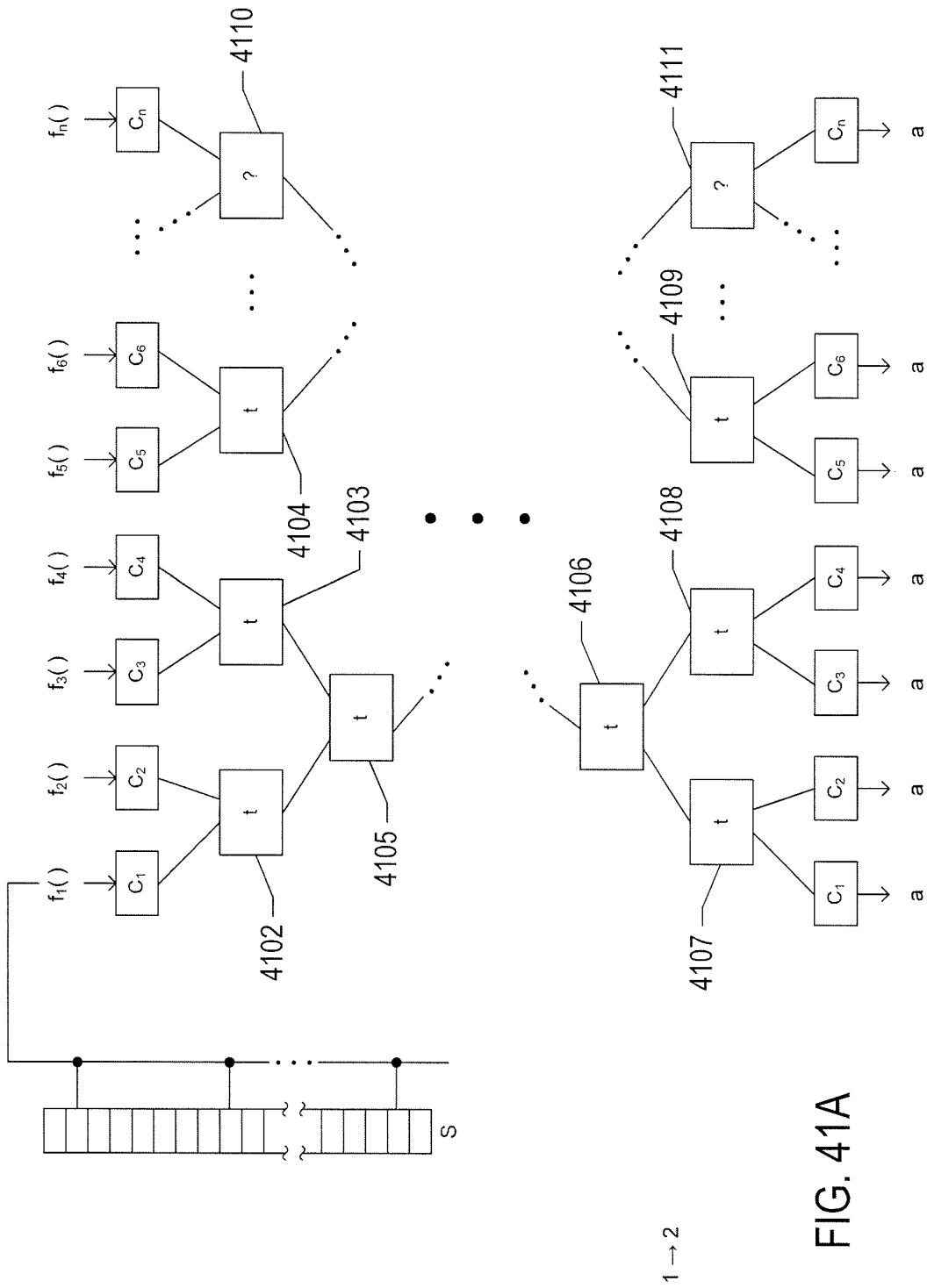
FIGS. 41A-C illustrate analysis of the four systems shown in FIG. 40 for model reuse.
Figure 41B:
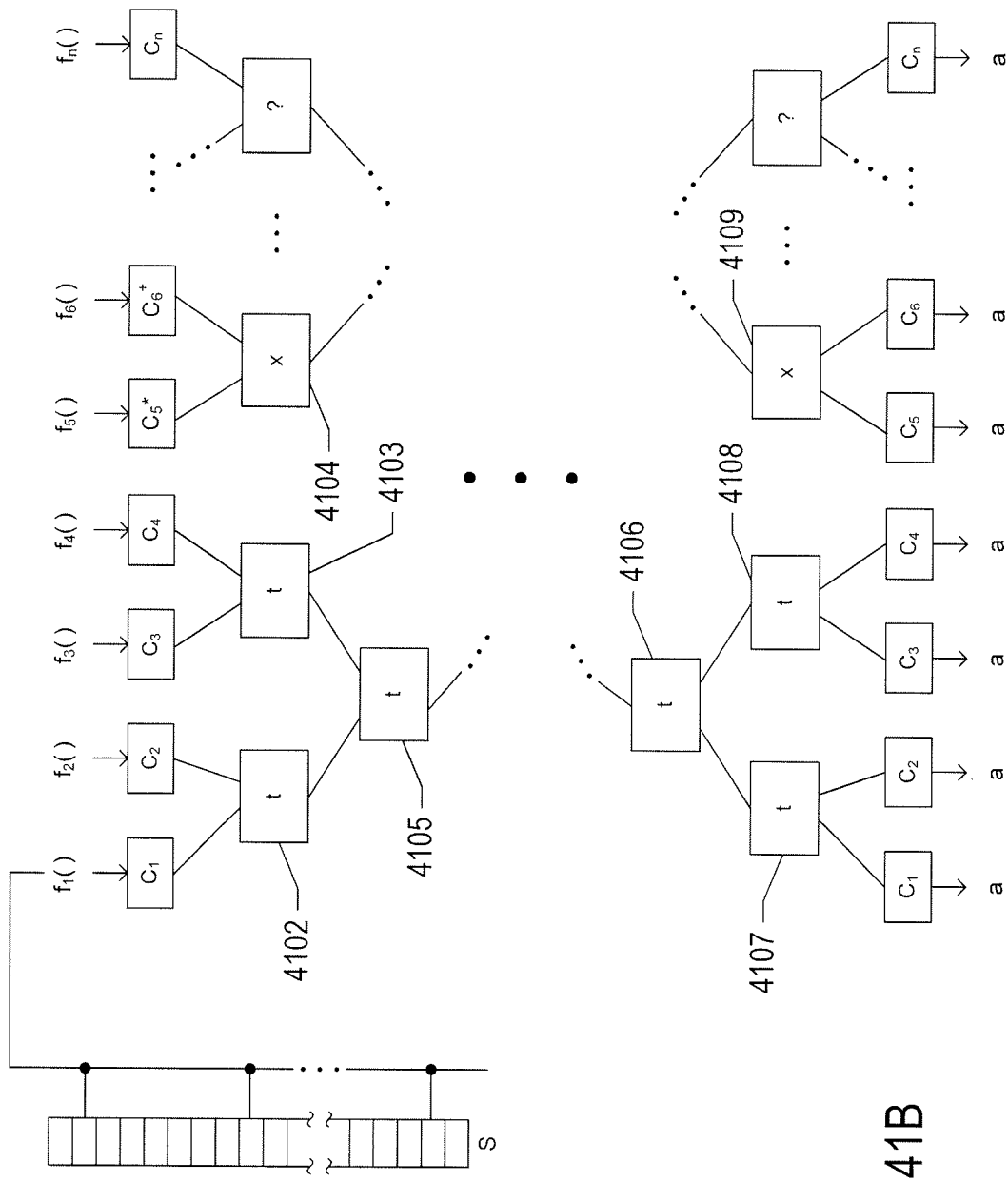
Figure 41C:
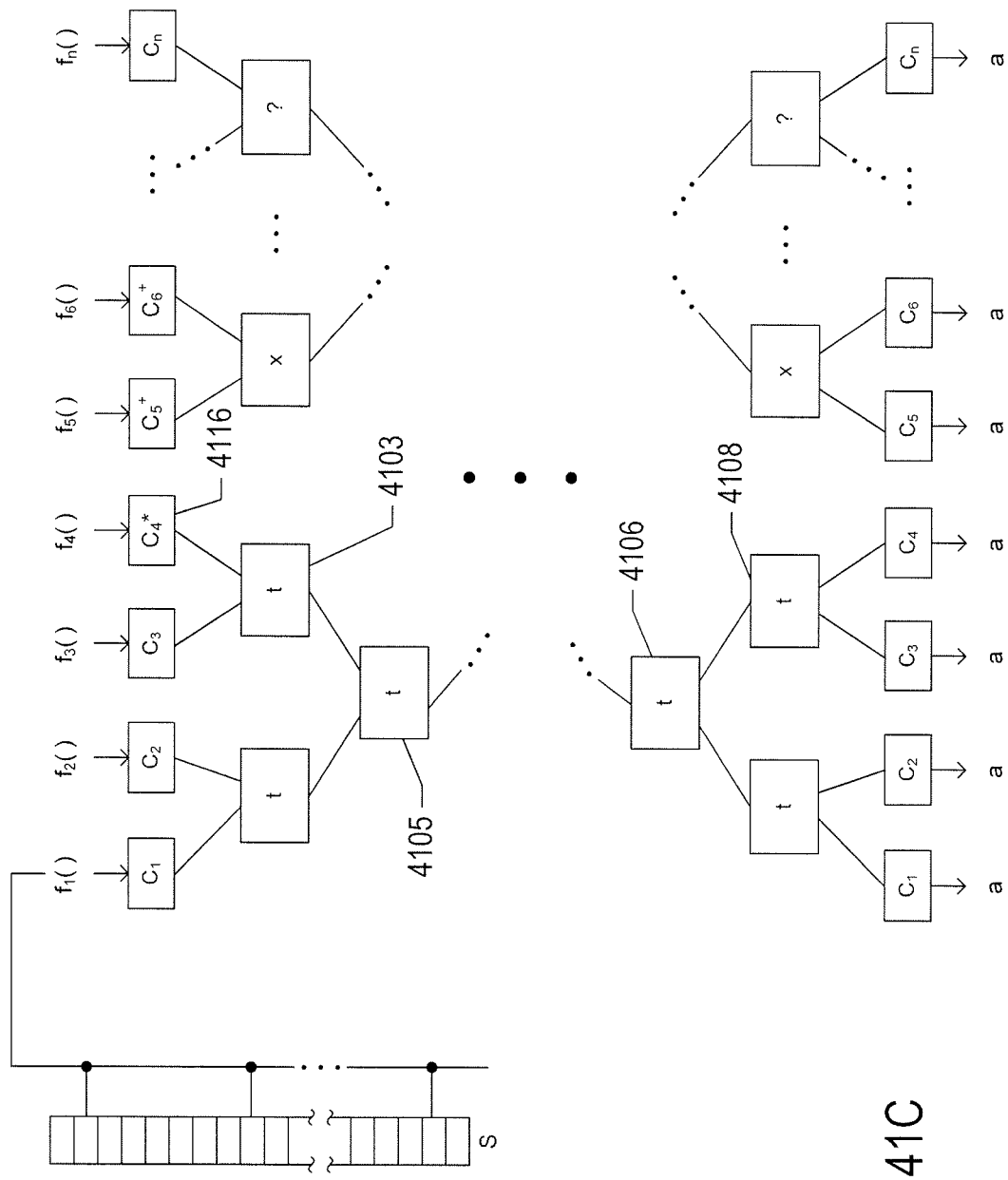

FIGS. 41A-C illustrate analysis of the four systems shown in FIG. 40 for model reuse. As can be seen in FIG. 40, the first 6 components and the final component of both the first and second systems are identical. FIG. 41A shows that the model, similar to the model previously shown in FIG. 39, that will be used for the second system discussed above with reference to FIG. 40. Since hidden node 4102 receives inputs from the first two system components, and since the first two components of both system 1 and 2 are identical, it can be inferred that the weight associated with this hidden node in the model learned by system 1 can be directly transported as an initial weight for the model to be used in system 2. The same considerations apply for hidden nodes 4103-4105, which are all marked with the label "t" indicate that the weights are transportable. The component-associated input nodes that input directly or indirectly to a hidden node in the upper portion of the figure are referred to as "ancestors" of the hidden node. The component-associated output nodes hidden nodes to which a hidden node in the lower portion of the figure directly or indirectly output signals are referred to as "descendants" of the hidden node Since FIG. 40 does not indicate the types of the additional components between the sixth and final components of the two systems, it cannot be ascertained from FIG. 40 whether the weights associated with hidden nodes 4110 and 4111 are transportable, as a result of which both nodes are labeled with "?" symbols. If the two systems are identical, then, of course, all of the weights associated with hidden nodes are transportable. When the input and output nodes are associated with weights, in the model, the same considerations would apply for labeling the input and output nodes as having transportable or non-transportable weights. Similar considerations apply to nodes 4106-4109, only their descendants are considered with respect to transportability.

FIG. 41B shows the model, similar to the model previously shown in FIG. 39, that will be used for the third system discussed above with reference to FIG. 40. As can be seen in FIG. 40, the fifth and sixth components of system 3 differ from the fifth and sixth components of system 1. The first four components are identical. Thus, because hidden nodes 4102-4105 have the same components associated with their ancestors, in both systems, and because hidden nodes 4107-4108 have the same components associated with their descendants, in both systems, their learned weights in the model trained by operation of system 1 are transportable to the model for system 3, and are so labeled in FIG. 41B. However, since hidden nodes 4104 and 4109 have different components associated with their ancestors and descendants, respectively, in the two systems, these hidden nodes are marked non-transportable, by the symbol "x." Thus, the transportability of a weight associated with a neural-network node is a function of whether or not the ancestor or descendant components of the node are identical or equivalent in the system in which the neural network was trained and in the system to which the neural network is desired to be transported.

FIG. 41C shows the model, similar to the model previously shown in FIG. 39, that will be used for the fourth system discussed above with reference to FIG. 40. In this case, the fourth input node 4116 is different from the corresponding component of the first system, as can be seen in FIG. 40. However, entry 4022 in the equivalents table 4020 in FIG. 40 indicates that the two components are equivalent. Therefore, nodes 4103, 4105, 4106, and 4108 are marked transportable, in FIG. 41C, even though they have non-identical component ancestors.

Figure 42A:
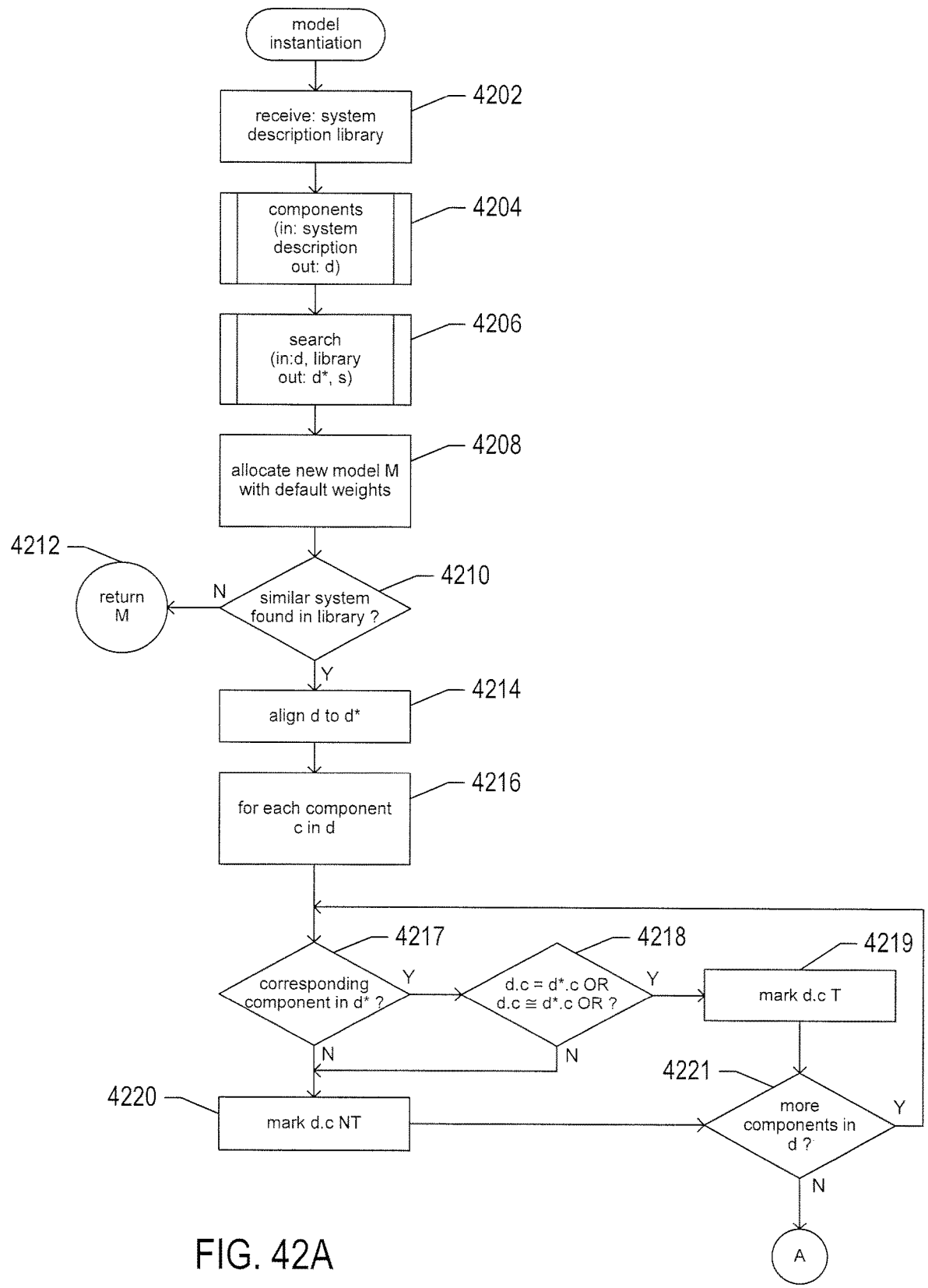
FIGS. 42A-B provide control-flow diagrams for a routine "model instantiation" that represents the process carried out for transporting a learned model from a first system as an initial model to a second system.
Figure 42B:
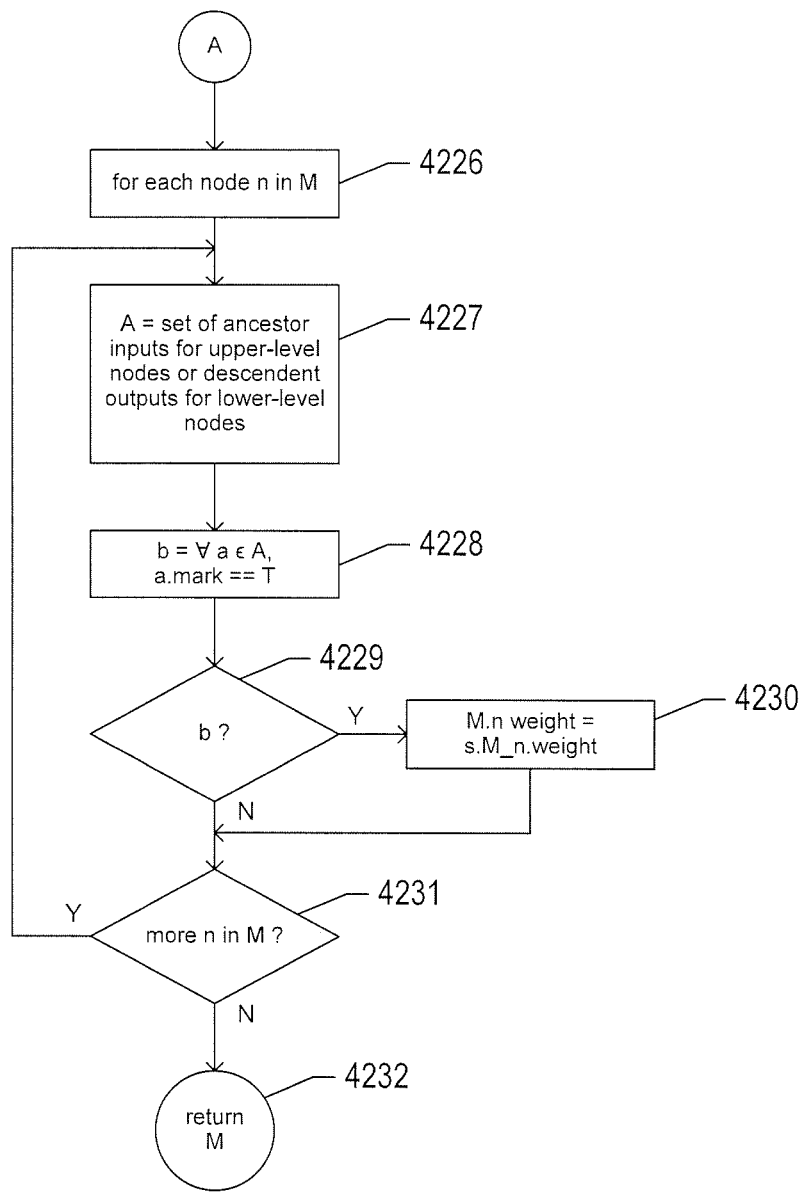

FIGS. 42A-B provide control-flow diagrams for a routine "model instantiation" that represents the process carried out for transporting a learned model from a first system as an initial model to a second system. In step 4202 of FIG. 42A, the routine "model instantiation" receives a description of a system in which a new model is to be instantiated and a reference to a library of systems with already trained models. In step 4204, a routine "components" is called in order to generate a linearized canonical component list from the received system description, as discussed above with reference to FIG. 38. In step 4206, a routine "search" is called in order to find an entry in the library that describes a system with a similar linearized canonical component list. In step 4208, a new model M is allocated with initial, or default, weights. When a similar system was not found by the routine "search," in step 4206, as determined in in step 4210, the model M is returned in step 4212. Otherwise, in step 4214, linearized canonical component lists of the two systems are aligned. Alignment may involve introducing spaces in one or both component lists in the case that the two systems have different numbers of components. In the for-loop of steps 4216-4221, each component in the linearized canonical component list for the new system is considered. When there is a corresponding component in the linearized canonical component list for the system that contains the trained model, as determined in step 4217, and when the two components are identical or equivalent, as determined in step 4218, the currently considered component is marked as transportable in step 4219. Otherwise, the currently considered component is marked as non-transportable, in step 4220. When all of the components have been considered in the for-loop of steps 4216-4221, control flows to step 4226 in FIG. 42B. In the for-loop of steps 4226-4231, each node in the newly allocated model M is considered. In step 4227, the set variable A is set to the ancestor or descendant components of the node, depending on whether the node lies in the upper or lower portion of the nodes. In step 4228, the Boolean variable b is set to indicate whether or not all of the ancestor or descendant components of the node have been marked as transportable. When all of the ancestor components of been marked transportable, as determined in step 4229, the node weight from the previous model is transported to current model M in step 4230. At the completion of the for-loop of steps 4226-4231, the current model M is returned.

Thus, using models with component-associated inputs and outputs, it is possible to transport many of the learned weights associated with model nodes from a learned model to an initial model for a similar system. For every weight transported to the new, initial model, many different training steps may be avoided, as a result of which the newly instantiated automated reinforcement-learning-based application manager that uses the new, initial model can immediately begin controlling the managed system with the experiential insight obtained by the system which learned model from which the weights are transported. Thus, computational overhead is decreased, control efficiency is increased, and an optimal or near-optimal control policy may be learned far more quickly by the newly instantiated automated reinforcement-learning-based application manager. The ability to transfer learned information from one system to another, over the course of the development and instantiation of multiple systems, can represent enormous improvements in the overall efficiency of systems controlled by automated reinforcement-learning-based application managers just as the ability of human beings to pass knowledge from one individual to another and from one generation to another has exponentially accelerated social evolution.

Figure 43:
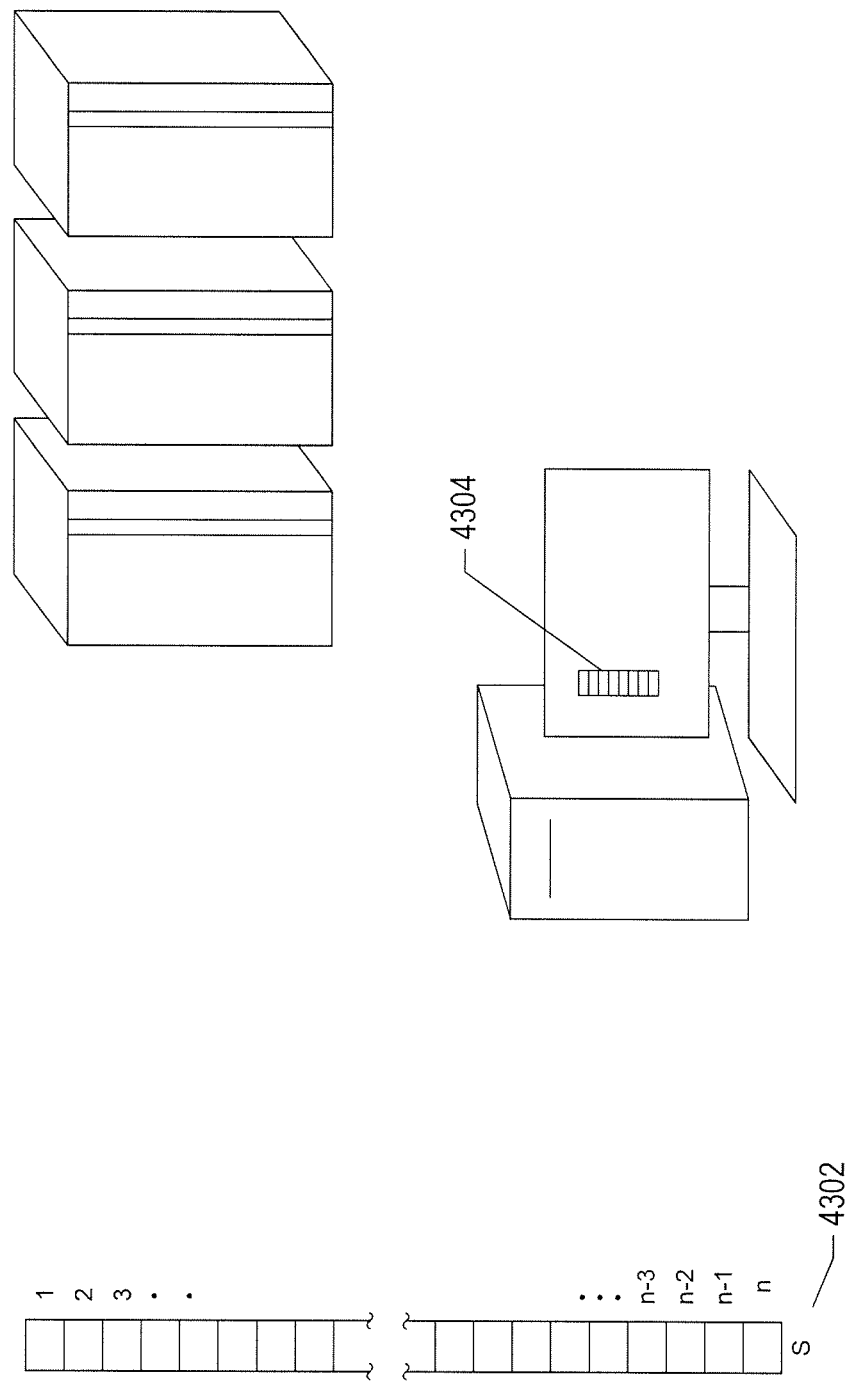
FIG. 43 illustrates one aspect of human-management knowledge, a subset of domain knowledge, that may be obtained by human application managers of distributed applications.

FIG. 43 illustrates one aspect of human-management knowledge, a subset of domain knowledge, that may be obtained by human application managers of distributed applications. As discussed above, a state vector 4302 may comprise a large number of metric values, and may also include additional information, such as configuration information. It is not unusual for a distributed application to be instrumented to produce tens of thousands of different metric values. Generally, human managers of distributed applications cannot possibly manually monitor and consider that many different metrics. Instead, human managers generally identify a very small subset of metrics, on the order of 50 to several hundred metrics 4304, with respect to which they control distributed applications. As discussed above, large computational-efficiency improvements can be obtained by decreasing the number of metrics in the state vector used by an automated reinforcement-learning-based application manager for policy control. However, arbitrarily reducing the dimensionality of the state vector is an extremely poor approach to reducing the number of states, since effective control of a distributed application may depend critically on certain metrics. It would also be possible to develop automated machine-learning techniques for determining weights for the various metrics and to automatically prune the state vector based on those weights, although the complexities and computational overheads involved in such automated state-vector pruning may themselves outweigh the computational-efficiency improvements which they may facilitate. However, because human distributed-application managers have learned, over time, an effective small subset of metrics that can be used to control a distributed application, these subsets of human-determined metrics represent valuable experiential domain knowledge that can be used to immediately and significantly improve the computational efficiency of an automated reinforcement-learning-based application manager. In essence, the automated reinforcement-learning-based application manager can be developed to receive, as input, the human-specified list of metrics needed for effective control of the distributed application and prune the state vectors accordingly, so that control policies, including state and action/state value functions can be learned with respect to pruned state vectors, and greatly decreasing the dimensionality of the overall control problem.

Figure 44A:
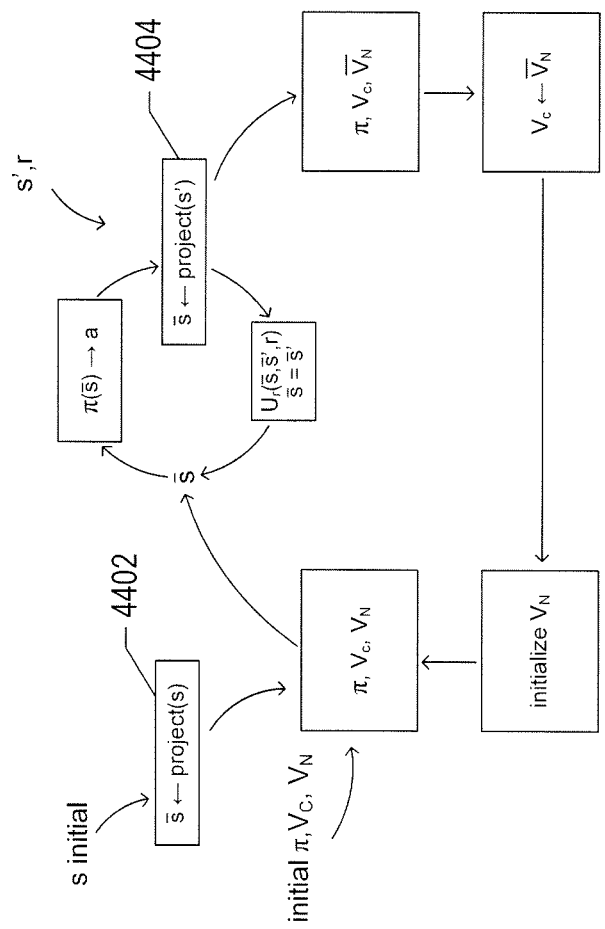
FIGS. 44A-B illustrate how state-vector pruning can be used to obtain significant improvements in the computational efficiencies of distributed-application management by an automated reinforcement-learning-based application manager.
Figure 44B:
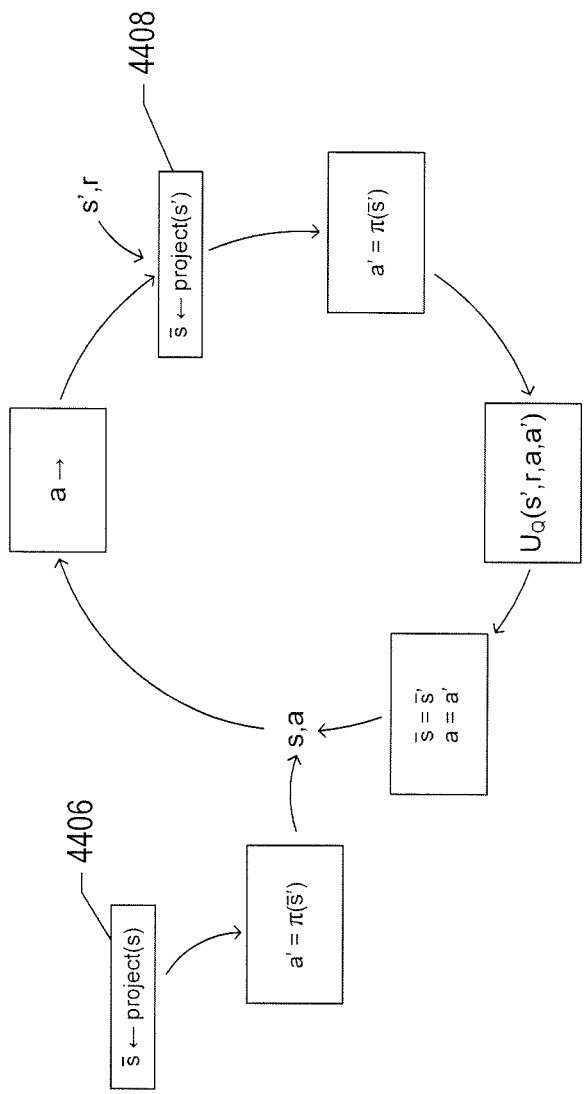

FIGS. 44A-B illustrate how state-vector pruning can be used to obtain significant improvements in the computational efficiencies of distributed-application management by an automated reinforcement-learning-based application manager. FIG. 44A shows the implementation previously shown in FIG. 29A with modifications that provide control based on a small set of human-manager-specified metrics rather than on the full state vector. These modifications include two projection steps 4402 and 4404 that project the full state vector into of the vector subspace that includes the subset of metrics used by human managers. The projected state vectors s are then used by the control policy for selection of the next action and/or the states for which the state-value function is updated. Similarly, FIG. 44 B includes two projections steps 4406 and 4408 that serve the same purpose as the projections steps 4402 and 4404 used to modify the control scheme shown in FIG. 29A to produce a modified control scheme shown in FIG. 44A.

The subset of metrics that can be used, at least initially, as a basis for control policies by automated reinforcement-learning-based application managers can be obtained directly from human managers, through a control interface provided by the automated reinforcement-learning-based application managers, or may introduced via configuration files and even hard coding. Importantly, the metric subset is the product of human-manager experience over significant periods of time, and therefore often represent an optimal or near-optimal balance between decreasing the dimensions of the state vectors while nonetheless effectively controlling the distributed application. Over time, an automated reinforcement-learning-based application manager may incorporate additional metrics into the control policies and state-value and state/action value functions, with continued policy learning based on exploration.

Although the present invention has been described in terms of particular embodiments, it is not intended that the invention be limited to these embodiments. Modification within the spirit of the invention will be apparent to those skilled in the art. For example, any of a variety of different implementations of the currently disclosed computationally efficient reinforcement-learning-based application manager can be obtained by varying any of many different design and implementation parameters, including modular organization, programming language, underlying operating system, control structures, data structures, and other such design and implementation parameters. As discussed above, many different types of approaches for decreasing the computational complexity of reinforcement-learning-based control are made possible by the enhancements of reinforcement-learning-based application managers that allow already-learned models to be partially or completely reused in newly instantiated automated reinforcement-learning-based application managers and that provide for experience-based pruning of the state vectors on which automated control is based. The reduction in dimensionality of the state vectors is applicable to reinforcement-learning-based application managers that infer the states of the managed environment from received observation, to reinforcement-learning-based application managers that receive the current states of the managed environment, and to other types of reinforcement-learning-based application managers.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An automated reinforcement-learning-based application manager that manages a computing environment that includes one or more applications and one or more of a distributed computing system having multiple computer systems interconnected by one or more networks, a stand-alone computer system, and a processor-controlled user device, the reinforcement-learning based application manager comprising:
one or more processors, one or more memories, and one or more communications subsystems;
a set of actions that can be issued to the computing environment;
a set of metrics;
an iterative control process that repeatedly
selects and issues a next action, according to a control policy that uses a dimensionally reduced computational-environment vector that includes metric values and that represents a current state of the computational environment obtained by projecting a computational-environment vector into a vector subspace defined by a subset of metrics used by human application managers to control distributed applications, and
receives a reward and one of an observation and a metric vector from the computing environment, in response to execution of the issued next action, which the control process projects into the vector subspace and uses to attempt to learn an optimal or near-optimal control policy, over time.

2. The automated reinforcement-learning-based application manager of claim 1
wherein each action is represented by a set of values; and
wherein representations of actions are each translated into one or more commands that are directed to computational-entity components of the computing environment.

3. The automated reinforcement-learning-based application manager of claim 2
wherein computational-environment vectors represent states and/or observations and include metric values.

4. The automated reinforcement-learning-based application manager of claim 3 wherein the subset of metrics used by human application managers is specified to the automated reinforcement-learning-based application manager via one or more of:
a manager interface;
a configuration files; and
a hard coding.

5. The automated reinforcement-learning-based application manager of claim 1 projecting a computational-environment vector into a vector subspace defined by a subset of metrics used by human application managers to control distributed applications further comprises removing metric values from the computational-environment vector that do not correspond to metrics in the metric subset used by human application managers to control distributed applications.

6. The automated reinforcement-learning-based application manager of claim 1 wherein the model includes:
a set of computing-environment-component inputs;
a set of computing-environment-component outputs; and
internal components that each includes learned information and that transform the information input to the model through the set of computing-environment-component inputs to outputs from the model through the set of computing-environment-component outputs, each internal component related one of a set of computing-environment-component-input ancestors and a subset of the set of computing-environment-component-input descendants.

7. The automated reinforcement-learning-based application manager of claim 6 wherein the learned information, learned by the different automated reinforcement-learning-based application manager, included in those internal components with identical or equivalent computing-environment-component-input ancestors or computing-environment-component-input descendants in the computing environment and the different computing environment is reused by the automated reinforcement-learning-based application manager.

8. The automated reinforcement-learning-based application manager of claim 7 wherein the computing-environment-component inputs and the computing-environment-component outputs also included stored information that may be reused for those computing-environment-component inputs and the computing-environment-component outputs associated with identical or equivalent components in the computing-environment-component-input descendants in the computing environment and the different computing environment.

9. The method of claim 7 wherein the computing-environment-component inputs and the computing-environment-component outputs also included stored information that may be reused for those computing-environment-component inputs and the computing-environment-component outputs associated with identical or equivalent components in the computing-environment-component-input descendants in the computing environment and the different computing environment.

10. The automated reinforcement-learning-based application manager of claim 6
wherein the model is a neural network;
wherein the computing-environment-component inputs are input nodes;
wherein the computing-environment-component outputs are output nodes;
wherein the internal components are hidden nodes; and
wherein the learned information is weights associated with nodes of the neural network.

11. The method of claim 6
wherein the model is a neural network;
wherein the computing-environment-component inputs are input nodes;
wherein the computing-environment-component outputs are output nodes;
wherein the internal components are hidden nodes; and
wherein the learned information is weights associated with nodes of the neural network.

12. An automated reinforcement-learning-based application manager that manages a computing environment that includes one or more applications and one or more of a distributed computing system having multiple computer systems interconnected by one or more networks, a standalone computer system, and a processor-controlled user device, the reinforcement-learning based application manager comprising:

one or more processors, one or more memories, and one or more communications subsystems;

a set of actions that can be issued to the computing environment;

a set of metrics;

a model partly or completely learned during operation of a different automated reinforcement-learning-based application manager that controls a different computing environment; and an iterative control process that repeatedly
selects and issues a next action, according to a control policy that uses a computational-environment vector that includes metric values and that represents a current state of the computational environment, and receives a reward and one of an observation and a metric vector from the computing environment, in response to execution of the issued next action, which the control process uses to attempt to learn an optimal or near-optimal control policy, over time, by improving the model.

13. The automated reinforcement-learning-based application manager of claim 12
wherein each action is represented by a set of values; and
wherein representations of actions are each translated into one or more commands that are directed to computational-entity components of the computing environment.

14. The automated reinforcement-learning-based application manager of claim 13
wherein computational-environment vectors represent states and/or observations and include metric values.

15. A method that improves the computational efficiency of an automated reinforcement-learning-based application manager having one or more processors, one or more memories, one or more communications subsystems, a set of actions that can be issued by an iterative control process to a computing environment, controlled by the automated reinforcement-learning-based application manager, having a set of metrics, the method comprising:

enhancing the automated reinforcement-learning-based application manager by one or more of
dimensionally reducing the control process and a learning process by which the automated reinforcement-learning-based application manager learns an optimal or near-optimal control policy by projecting computational-environment vectors that represent a current state of the computational environment into a vector subspace, and
reusing a model learned during operation of a different automated reinforcement-learning-based application manager that controls a different computing environment in one or more of the control process and the learning process.

16. The method of claim 15 wherein projecting computational-environment vectors that represent a current state of the computational environment into a vector subspace further comprises:

projecting each computational-environment vector into a vector subspace defined by a subset of metrics used by human application managers to control distributed applications by removing metric values from the computational-environment vector that do not correspond to metrics in the metric subset used by human application managers to control distributed applications.

17. The method of claim 16 wherein the subset of metrics used by human application managers is specified to the automated reinforcement-learning-based application manager via one or more of:

a manager interface;
a configuration files; and
a hard coding.

18. The method of claim 15 wherein the model includes:
a set of computing-environment-component inputs;
a set of computing-environment-component outputs; and
internal components that each includes learned information and that transform the information input to the model through the set of computing-environment-component inputs to outputs from the model through the set of computing-environment-component outputs, each internal component related one of a set of computing-environment-component-input ancestors and a subset of the set of computing-environment-component-input descendants.

19. The method of claim 18 wherein the learned information, learned by the different automated reinforcement-learning-based application manager, included in those internal components with identical or equivalent computing-environment-component-input ancestors or computing-environment-component-input descendants in the computing environment and the different computing environment is reused by the automated reinforcement-learning-based application manager.

20. A physical data-storage device encoded with computer instructions that, when executed by one or more processors of a computer system that implements an automated reinforcement-learning-based application manager having one or more processors, one or more memories, one or more communications subsystems, a set of actions that can be issued by an iterative control process to a computing environment, controlled by the automated reinforcement-learning-based application manager, having a set of metrics, controls the automated reinforcement-learning-based application manager to enhance the automated reinforcement-learning-based application manager by one or more of
dimensionally reducing the control process and a learning process by which the automated reinforcement-learning-based application manager learns an optimal or near-optimal control policy by projecting computational-environment vectors that represent a current state of the computational environment into a vector subspace, and
reusing a model learned during operation of a different automated reinforcement-learning-based application manager that controls a different computing environment in one or more of the control process and the learning process.

* * * * *